US006891838B1

(12) United States Patent
Petite et al.

(10) Patent No.: US 6,891,838 B1
(45) Date of Patent: May 10, 2005

(54) SYSTEM AND METHOD FOR MONITORING AND CONTROLLING RESIDENTIAL DEVICES

(75) Inventors: Thomas D. Petite, Douglasville, GA (US); Richard M. Huff, Convers, GA (US)

(73) Assignee: StatSignal IPC, LLC, Atlanta, GA (US)

( * ) Notice: Subject to any disclaimer, the term of this patent is extended or adjusted under 35 U.S.C. 154(b) by 892 days.

(21) Appl. No.: 09/704,150

(22) Filed: Nov. 1, 2000

Related U.S. Application Data

(63) Continuation-in-part of application No. 09/439,059, filed on Nov. 12, 1999, and a continuation-in-part of application No. 09/412,895, filed on Oct. 5, 1999, and a continuation-in-part of application No. 09/271,517, filed on Mar. 18, 1999, now abandoned, and a continuation-in-part of application No. 09/172,554, filed on Oct. 14, 1998, and a continuation-in-part of application No. 09/102,178, filed on Jun. 22, 1998.

(60) Provisional application No. 60/201,252, filed on May 1, 2000.

(51) Int. Cl.[7] ............................................... H04L 12/28
(52) U.S. Cl. ................................... 370/401; 340/870.02
(58) Field of Search ................................ 370/310, 401, 370/402, 466, 467, 469, 492, 501, 315, 338, 389, 392, 400; 340/870.02, 870.03, 870.11

(56) References Cited

U.S. PATENT DOCUMENTS

| 4,999,607 A | 3/1991 | Evans ......................... 340/539 |
| 5,438,329 A | 8/1995 | Gastouniotis et al. ........ 340/870 |
| 5,544,036 A | 8/1996 | Brown, Jr. et al. .......... 364/145 |
| 5,572,438 A | 11/1996 | Ehlers et al. ............... 364/492 |
| 5,583,850 A | 12/1996 | Snodgrass et al. .......... 370/342 |
| 5,590,179 A | 12/1996 | Shincovich et al. ......... 379/107 |
| 5,619,192 A | 4/1997 | Ayala ..................... 340/870.02 |
| 5,706,191 A | 1/1998 | Bassett et al. .............. 364/138 |
| 5,748,104 A | 5/1998 | Argyroudis et al. ........ 340/870 |
| 5,874,903 A | 2/1999 | Shuey et al. ........... 340/870.02 |

(Continued)

*Primary Examiner*—Phirin Sam
(74) *Attorney, Agent, or Firm*—Troutman Sanders LLP; Ryan A. Schneider; James Hunt Yancey, Jr.

(57) ABSTRACT

The present invention is generally directed to a system and method for monitoring and controlling a host of residential automation systems. The system is implemented by using a plurality of wireless communication devices configured to relay both data and command encoded signals through the wireless network of communication devices interposed between integrated sensors/actuators and a gateway device. In accordance with a preferred embodiment, the gateway translates the data encoded signals and embeds the information in a data packet using terminal control protocol/Internet protocol to communicate the data to a computing device on a wide area network. The computing device may comprise data collection and or control algorithms as desired. The computing device may forward command signals to the gateway device. In response thereto, the gateway may convert the command signals into appropriate command encoded signals for wireless transmission to a designated actuator integrated in a residential system. The present invention can also be viewed as providing a method for monitoring and controlling residential systems. In its broadest terms, the method can be described as: sensing a parameter; generating a wireless signal; traversing a wireless network to a gateway interconnected with a wide area network; communicating the parameter to a computing device on the network; generating a control signal; communicating the control signal to the gateway; converting the control signal; and broadcasting the control signal such that an appropriate actuator is energized.

38 Claims, 16 Drawing Sheets

U.S. PATENT DOCUMENTS

| | | | | |
|---|---|---|---|---|
| 5,892,758 A | * | 4/1999 | Argyroudis | 370/335 |
| 5,897,607 A | | 4/1999 | Jenney et al. | 702/62 |
| 5,914,672 A | | 6/1999 | Glorioso et al. | 340/870.02 |
| 5,949,779 A | | 9/1999 | Mostafa et al. | 370/389 |
| 5,963,650 A | | 10/1999 | Simionescu et al. | 380/49 |
| 5,978,371 A | | 11/1999 | Mason, Jr. et al. | 370/389 |
| 5,986,574 A | | 11/1999 | Colton | 340/870.02 |
| 6,061,604 A | | 5/2000 | Russ et al. | 700/90 |
| 6,073,266 A | | 6/2000 | Ahmed et al. | 714/749 |
| 6,087,957 A | | 7/2000 | Gray | 340/825.54 |
| 6,088,659 A | | 7/2000 | Kelley et al. | 702/62 |
| 6,100,817 A | | 8/2000 | Mason, Jr. et al. | 340/870.2 |
| 6,121,593 A | | 9/2000 | Mansbery et al. | 219/679 |
| 6,133,850 A | * | 10/2000 | Moore | 340/870.02 |
| 6,163,276 A | | 12/2000 | Irving et al. | 340/870.4 |
| 6,215,404 B1 | | 4/2001 | Morales | 340/577 |
| 6,219,409 B1 | | 4/2001 | Smith et al. | 379/106.09 |
| 6,229,439 B1 | | 5/2001 | Tice | 340/506 |
| 6,246,677 B1 | * | 6/2001 | Nap et al. | 370/346 |
| 6,366,217 B1 | | 4/2002 | Cunningham et al. | 340/870.31 |
| 6,396,839 B1 | * | 5/2002 | Ardalan et al. | 370/401 |
| 6,538,577 B1 | * | 3/2003 | Ehrke et al. | 340/870.02 |
| 6,618,709 B1 | * | 9/2003 | Sneeringer | 705/412 |

* cited by examiner

RF TRANSMITTER w/ SENSOR

RF TRANSCEIVER w/ SENSOR

RF TRANSCEIVER w/ SENSOR-ACTUATOR

FIG. 6     MESSAGE STRUCTURE

| To Addr. (1-6) | From Addr. (6) | Pkt. No. (1) | Pkt. Max. (1) | Pkt. Lngth. (1) | Cmd. (1) | Data (0-238) | CkH (1) | CkL (1) |
|---|---|---|---|---|---|---|---|---|

The order of appearance remains fixed although byte position number in each packet may vary due to one or more of the following reasons:

1. Scalability of the "TO ADDRESS" (1 to 6 Bytes).
2. The CMD Byte.
3. Scalability of the Data portion of the message (0 to 238 Bytes).

"To Address" Byte Assignment:

| | |
|---|---|
| MSB - Byte 1<br>Device Type | FF-F0 (16) - Broadcast All Devices (1 Byte Address)<br>EF-1F (224) - Device Type Base (2 to 6 Byte Address)<br>0F-00 (16) - Personal Transceiver Identification (6 Byte Address) |
| Byte 2<br>Mfg./Owner ID | FF-F0 (16) - Broadcast all Devices (Byte 1 Type)<br>(2 Byte Broadcast Address)<br>EF-00 (240) - Mfg./Owner Code Identification Number |
| Byte 3<br>Mfg./Owner<br>Extension ID | FF-F0 (16) - Broadcast all Devices (Byte 1 & Byte 2 Type)<br>(3 Byte Broadcast Address)<br>EF-00 (240) - Device Type/Mfg./Owner Code ID Number |
| Byte 4 | FF-F0 (16) - Broadcast all Devices (Byte 1 & Byte 2 Type)<br>(4 Byte Broadcast Address)<br>EF-00 (240) - ID Number |
| Byte 5 | (FF-00) 256 - Identification Number |
| Byte 6 | (FF-00) 256 - Identification Number |

"From Address" Byte Assignment:

| | |
|---|---|
| From Address | (FF-00) Full "ID" of Originating Device (up to 6 Bytes) |
| Packet Number | (FF-00) Packet Number of Msg. longer than 256 Bytes |
| Packet Max. | (FF-00) Number of Packets in Message over 256 Bytes |
| Packet Length | (FF-00) Length (in Bytes) of Packet/Message Transmission* |
| Command | (FF-00) Command Byte |
| Data | (FF-00) Data as required by specific command |
| ChkH | (FF-00) Packet Checksum, High Byte |
| ChkL | (FF-00) Packet Checksum, Low Byte |

*Packet Length - 13 Bytes (Min.) / 256 Bytes (Max.)

Sample Messages

Central Server to Personal Transceiver - Broadcast Message - FF (Emergency)

Byte Count = 12

| To Addr. (FF) | From Addr. (12345678) | Pkt. No. (00) | Pkt. Max. (00) | Pkt. Lngth. (0C) | Cmd. (FF) | CkH (02) | CkL (9E) |
|---|---|---|---|---|---|---|---|

---

First Transceiver to Repeater (Transceiver)
Broadcast Message - FF (Emergency)

Byte Count = 17

| To Addr. (F0) | From Addr. (12345678) | Pkt. No. (00) | Pkt. Max. (00) | Pkt. Lngth. (11) | Cmd. (FF) | Data (A000123456) | CkH (03) | CkL (A0) |
|---|---|---|---|---|---|---|---|---|

Note: Additional Transceiver Re-Broadcasts do not change the message.
The messages are simply received and re-broadcast.

---

Message to Device "A0" From Device "E1"  Command - "08" (Respond to PING)
Response will reverse "To" and "From" Addresses Byte Count = 17

| To Addr. (A012345678) | From Addr. (E112345678) | P # (00) | P Max. (00) | P Lngth. (11) | Cmd. (08) | Data (A5) | CkH (04) | CkL (67) |
|---|---|---|---|---|---|---|---|---|

*FIG. 7*

SYSTEM AND METHOD FOR MONITORING AND CONTROLLING RESIDENTIAL DEVICES

CROSS-REFERENCE TO RELATED APPLICATIONS

This application is a continuation-in-part of U.S. patent application Ser. No. 09/271,517; filed Mar. 18, 1999 now abandoned, and entitled, "System For Monitoring Conditions in a Residential Living Community;" Ser. No. 09/439,059, filed Nov. 12, 1999, and entitled, "System and Method for Monitoring and Controlling Remote Devices," and Ser. No. 09/102,178; filed Jun. 22, 1998, entitled, "Multi-Function General Purpose Transceiver;" Ser. No. 09/172,554; filed Oct. 14, 1998, entitled, "System for Monitoring the Light Level Around an ATM;" Ser. No. 09/412,895; filed Oct. 5, 1999, entitled, "System and Method for Monitoring the Light Level Around an ATM. Each of the identified U.S. patent applications is incorporated herein by reference in its entirety. This application also claims the benefit of U.S. provisional application Ser. No. 60/201,252, filed May 1, 2000, and entitled "System and Method for Monitoring and Controlling Remote Devices," the contents of which are hereby incorporated by reference.

FIELD OF THE INVENTION

The present invention generally relates to remotely operated residential systems, and more particularly to a computerized system for monitoring, reporting, and controlling residential systems via a multiple access wide area network, a gateway, radio-frequency transceivers and repeaters, and software applications to appropriately process and direct various data and control signals.

BACKGROUND OF THE INVENTION

As is known, there are a variety of systems for monitoring and controlling manufacturing processes, inventory systems, emergency control systems, and the like. Most automated systems use remote sensors and controllers to monitor and respond to various system parameters to reach desired results. A number of control systems utilize computers or dedicated microprocessors in association with appropriate software to process system inputs, model system responses, and control actuators to implement corrections within a system.

One way to classify control systems is by the timing involved between subsequent monitoring occurrences. Control systems can be classified as aperiodic or random, periodic, and real-time. A number of remotely distributed service industries implement the monitoring and controlling process steps through manual inspection and intervention.

Aperiodic manual monitoring systems (those that do not operate on a predetermined cycle) are inherently inefficient as they require a service technician to physically traverse an area to record data, repair out of order equipment, add inventory to a vending machine, and the like. Such service trips are carried out in a number of industries with the associated costs being transferred to the consumers of the service.

Conversely, utility meter monitoring, recording, and client billing are un representative of discrete steps in a periodic monitoring system. In the past, utility providers sent a technician from meter to meter on a periodic basis to verify meter operation and to record utility use. One method of cutting utility meter reading operating expenses involved increasing the period at which manual monitoring and meter data recording was performed. While this modified method decreased the monitoring and recording expense associated with more frequent meter observation and was convenient for consumers who favor the consistent billed amounts associated with "budget billing," the utility provider retained the costs associated with less frequent meter readings and the processing costs associated with reconciling consumer accounts.

Lastly, a number of environmental and safety systems require constant or real-time monitoring. Heating, ventilation, and air-conditioning (HVAC) systems, fire reporting and damage control systems, alarm systems, and access control systems are representative systems that utilize real-time monitoring and often require immediate feedback and control. These real-time systems have been the target of control system theory and application for some time.

Home automation systems may comprise control systems that exemplify all three periodicity variations. For example, a remote command designed to turn on interior lights may be classified as aperiodic or random. Whereas, it may be desirable to send periodic control signals to a landscape lighting system, pet feeders, irrigation systems, etc. Finally, security systems, smoke detectors, and related fire prevention systems exemplify household systems in need of real-time monitoring and control.

Various schemes have been proposed to facilitate inter-device communications between closely located devices, including radio-frequency (RF) transmission, light transmission (including infra-red), and control signal modulation over the local power distribution network. For example, U.S. Pat. No. 4,697,166 to Warnagiris et al. describes a power-line carrier backbone for inter-element communications. As recognized in U.S. Pat. No. 5,471,190 to Zimmerman, there is a growing interest in home automation systems and products that facilitate such systems. One system, critically described in the Zimmerman patent, is the X-10 system. Recognizing that consumers will soon demand interoperability between household systems, appliances, and computing devices, the Electronics Industry Association (EIA) has adopted an industry standard, known as the Consumer Electronics Bus (CEBus). The CEBus is designed to provide reliable communications between suitably configured residential devices through a multi-transmission media approach within a single residence.

One problem with expanding the use of control systems technology to distributed systems is the cost associated with the necessary build-out of the local sensor-actuator infrastructure necessary to interconnect the various devices. A typical approach to implementing control system technology is to install a local network of hard-wired sensors and actuators along with a local controller. Not only is there expense associated with developing and installing appropriate sensors and actuators but the added expense of connecting functional sensors and actuators with the local controller. Another prohibitive cost associated with applying control systems technology to distributed systems is the installation and operational expense associated with programming the local controller.

Accordingly, an alternative solution for implementing a distributed control system suitable for home automation that overcomes the shortcomings of the prior art is desired.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a system and a cost-effective method for monitoring and controlling home automation devices remotely via a distributed wide-area network (WAN). More specifically, the present invention is directed to a computerized system for monitoring, reporting, and controlling household related systems and system information via WAN gateway interfaces. The various user applications may be found on one or more applications servers in communication with the WAN. Each of the input and output signals to and from the various household devices may be communicated via appropriately configured RF transceivers and repeaters (where required) in communication with WAN gateways. In preferred embodiments of the network infrastructure, database servers in communication with the WAN store identification information related to each of the various transceivers along with appropriate codes suitable for a related application. Because the applications server is integrated on a WAN, Web browsers can be used by anyone with WAN access (and the appropriate software access permissions) to view and download the recorded data, as well as, to customize particular home automation applications.

In accordance with a broad aspect of the invention, a system is provided having one or more sensors to be read and/or actuators to be controlled, ultimately through a computing device in communication with the WAN. The sensors and/or actuators are in communication with wireless transceivers that transmit and/or receive encoded data and control signals information to and from the computing device. In this regard, additional wireless repeaters may relay information between transceivers disposed in connection with the sensors and actuators and a gateway to the WAN. It should be appreciated that, a portion of the information communicated includes data that uniquely identifies the sensors and/or actuators. Another portion of the data is a multi-bit code word that may be decipherable through a look-up table within either the WAN gateway or a WAN interconnected computer.

In accordance with one aspect of the invention, a system is configured to monitor and report system parameters. The system is implemented by using a plurality of wireless transceivers. At least one wireless transceiver is interfaced with a sensor, transducer, actuator or some other device associated with an application parameter of interest. In this regard, the term "parameter" is broadly construed and may include, but is not limited to, a system alarm condition, a system process variable, an operational condition, etc. The system also includes a plurality of transceivers that act as signal repeaters that are dispersed throughout the nearby geographic region at defined locations. By defined locations, it is meant only that the general location of each transceiver is "known" by a WAN integrated computer. WAN integrated computers may be informed of transceiver physical locations after permanent installation, as the installation location of the transceivers is not limited. Each transceiver that serves to repeat a previously generated data signal may be further integrated with its own unique sensor or a sensor actuator combination as required. Additional transceivers may be configured as stand-alone devices that serve to simply receive, format, and further transmit system data signals. Further, the system includes a local data formatter that is configured to receive information communicated from the transceivers, format the data, and forward the data via the gateway to one or more software application servers interconnected with the WAN. The application server further includes means for evaluating the received information and identifying the system parameter and the originating location of the parameter. The application server also includes means for updating a database or further processing the reported parameters.

Consistent with the broader concepts of the invention, the "means" for evaluating the received information and the "means" for reporting system parameters are not limited to a particular embodiment or configuration. Preferably, these "means" will be implemented in software that is executed by a processor within an application server integrated with the public access WAN commonly known as the Internet. However, dedicated WANs or Intranets are suitable backbones for implementing defined system data transfer functions consistent with the invention.

In one embodiment, a client retrieves configured system data by accessing an Internet Web site. In such an embodiment, a system consistent with the present invention acts as a data collector and formatter with data being delivered upon client request twenty-four hours a day, seven days a week.

In more robust embodiments, a system can be configured to collect, format, and deliver client application specific information on a periodic basis to predetermined client nodes on the WAN. In these embodiments, client intervention would serve to close the feedback loop in the control system.

In yet another embodiment, a system can be configured to collect, format, and control client application specific processes by replacing a local controller (e.g., a computer) with a WAN interfaced application server and integrating system specific actuators with the aforementioned system transceivers.

It should be further appreciated that the information transmitted and received by the wireless transceivers may be further integrated with other data transmission protocols for transmission across telecommunications and computer networks other than the Internet. In addition, it should be further appreciated that telecommunications and computer networks other than the Internet can function as a transmission path between the networked wireless transceivers, the local gateways, and the central server. For example, a gateway in accordance with the system and method of the present invention may be interconnected with the Internet via the PSTN, a CATV network, or other suitable network to bridge gaps in a distributed system network.

In yet a further embodiment, a system can be configured using the present invention to translate and transmit control signals from an existing local controller via the networked wireless transceivers. In this regard, a system consistent with the teachings of the present invention would require a data translator to tap into the data stream of an existing control system. Distinct control system signals may be mapped to function codes used by the present invention in order to provide customer access to control system data. In this way, the system of the present invention can be integrated with present data collection and system controllers inexpensively, as customers will only have to add a data translator and a wireless transmitter or transceiver as the application demands. By integrating the present invention with a data stream generated by present monitoring and control systems, potential customers enjoy the benefits of the present invention without the difficulties associated with integrating sensors and actuators to monitor individual system parameters.

BRIEF DESCRIPTION OF THE DRAWINGS

The accompanying drawings incorporated in and forming a part of the specification, illustrate several aspects of the present invention, and together with the description serve to explain the principles of the invention. The components in the drawings are not necessarily to scale, emphasis instead being placed upon clearly illustrating the principles of the present invention. Moreover, in the drawings, like reference numerals designate corresponding parts throughout the several views. In the drawings:

FIG. 6 is a table illustrating a message structure that may be used to communicate data and control signals via the various RF communication devices of FIGS. 4A through 4D in the control system of FIG. 2;

FIG. 7 is a diagram illustrating sample messages that may be communicated in the control system of FIG. 2;

DETAILED DESCRIPTION OF THE PREFERRED EMBODIMENTS

Figure 1:
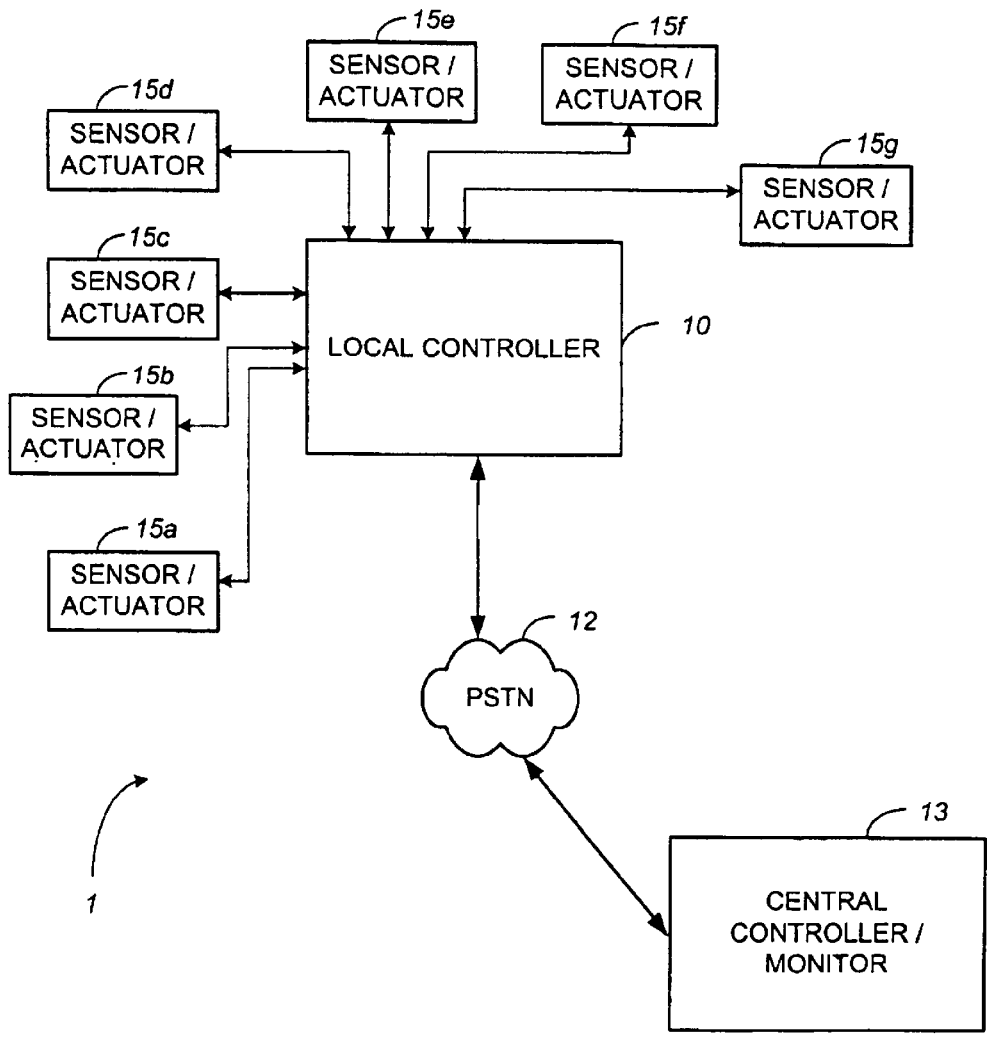
FIG. 1 is a block diagram of a prior art control system.

Having summarized the invention above, reference is now made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Referring now to the drawings, reference is made to FIG. 1, which is a block diagram illustrating fundamental components of a prior art control system generally identified by reference numeral 1. More particularly, a prior art control system 1 includes a local controller 10 in communication with the public-switched telephone network (PSTN) 12 in further communication with a central controller/monitor 13. As is also illustrated in FIG. 1, the local controller may be in communication with a plurality of sensor/actuators 15. In a manner well known in the art of control systems, local controller 10 provides power, formats and applies data signals from each of the sensors to predetermined process control functions, and returns control signals as appropriate to the system actuators via the communicatively coupled sensor/actuators 15. Often, prior art control systems are further integrated via the PSTN 12 to a central controller/monitor 13 as shown. The central controller/monitor 13 can be further configured to serve as a technician monitoring station or to forward alarm conditions via the PSTN 12 to appropriate public safety officers (not shown).

Prior art control systems consistent with the design of FIG. 1 require the development and installation of an application-specific local system controller, as well as, the routing of electrical conductors to each sensor and actuator as the application requires. Such prior art control systems are typically augmented with a central controller/monitor 13 that may be networked to the local controller 10 via a modem (not shown) and the PSTN 12. As a result, prior art control systems often consist of a relatively heavy design and are subject to a single point of failure should the local controller 10 go out of service. In addition, these systems require electrical coupling between the local controller 10 and system sensor/actuators 15. As a result, appropriately wiring an existing residential home can be an expensive proposition.

Figure 2:
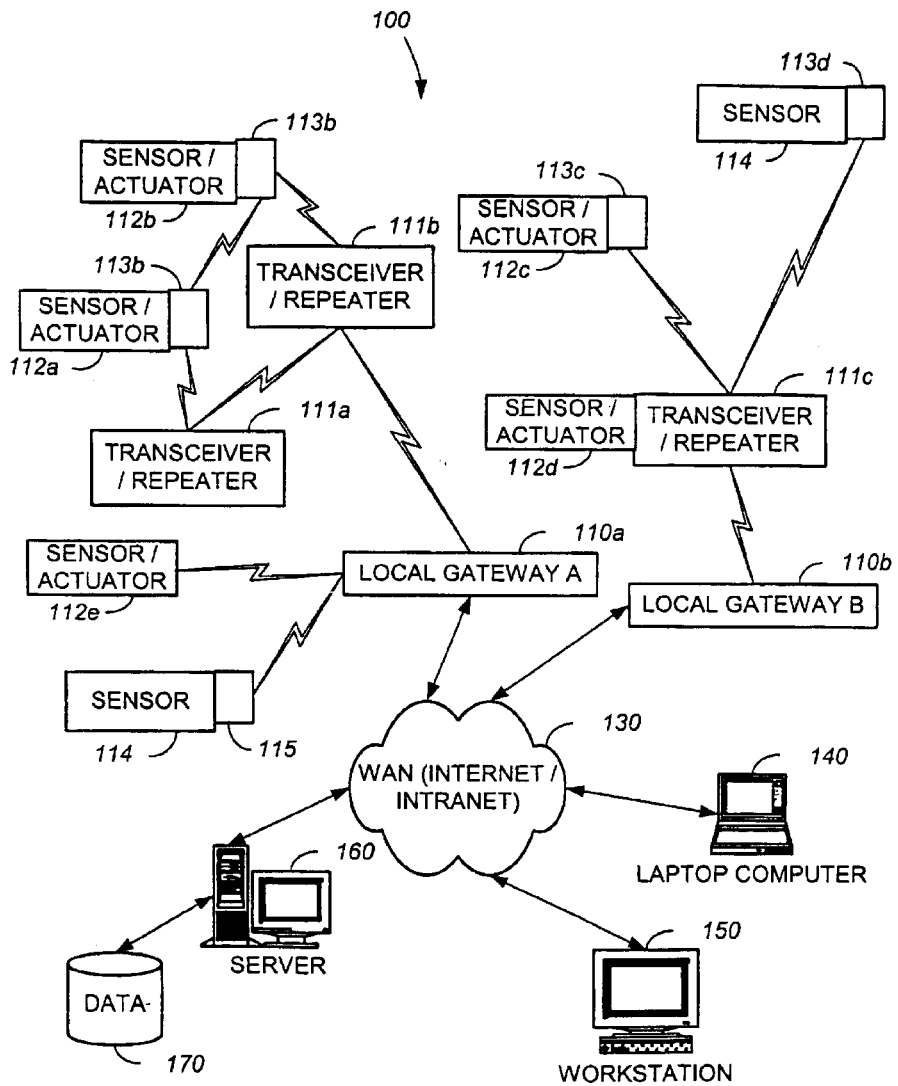
FIG. 2 is a schematic diagram illustrating a distributed data monitoring/control system suitable for home automation applications in accordance with the present invention.

Reference is now made to FIG. 2, which is a schematic diagram illustrating a distributed data monitoring/control system suitable for home automation applications in accordance with the present invention. As illustrated in FIG. 2, a distributed data monitoring/control system (DDMCS) in accordance with the present invention is identified generally by reference numeral 100. The DDMCS 100 may comprise one or more application servers 160 (one shown for simplicity of illustration), one or more data base servers 170, a WAN 130, a plurality of transceiver/repeaters 111, sensor/actuators 112, transceivers 113, sensors 114, transmitters 115, and at least one local gateway 110. As is further illustrated in FIG. 2, each of the sensor/actuators 112 and sensors 114 is integrated such that it is communicatively coupled with a suitably configured RF transceiver/repeater 111, a RF transceiver 113, or a RF transmitter 115. Hereinafter, the group including a RF transceiver/repeater 111, a RF transceiver 113, and a RF transmitter 115 will be referred to as RF communication devices. Those skilled in the art will appreciate the application of the various devices deployed in a wireless network interface between a plurality of residential system sensors 114 and sensor/actuators 112 and various computing devices in communication with a WAN 130 in a distributed home automation control system.

Each of the aforementioned RF communication devices is preferably small in size and may be configured to transmit a relatively low-power RF signal. As a result, in some applications, the transmission range of a given RF communication device may be relatively limited. As will be appreciated from the description that follows, this relatively limited transmission range of the RF communication devices is an advantageous and desirable characteristic of the DDMCS 100. Although the RF communication devices are depicted without a user interface such as a keypad, in certain embodiments the RF communication devices may be configured with user selectable pushbuttons, switches, or an alphanumeric keypad suitably configured with software and or firmware to accept operator input. Often, the RF communication devices will be electrically interfaced with a sensor 114 or with a combination sensor/actuator 112, such as with a smoke detector, a thermostat, a security system, etc., where user selectable inputs may not be needed.

As illustrated in FIG. 2, one or more sensors 114 may be communicatively coupled to at least one local gateway 10 via a RF transmitter 115, a RF transceiver 113, or in the alternative, a RF transceiver/repeater 111. Furthermore, one or more sensor/actuators 112 may be communicatively coupled to at least one local gateway 110 via a RF transceiver 113 or alternatively a RF transceiver/repeater 111. Those skilled in the art will appreciate that in order to send a command from the server 160 to a sensor/actuator 112, the RF device in communication with the sensor/actuator 112 should be a two-way communication device. It will also be appreciated that one or more sensor/actuators 112e may be in direct communication with one or more local gateways 110a, 110b. It will be further appreciated that the communication medium between the one or more sensor/actuators 112e and the one or more local gateways 110a, 110b may be wireless or for relatively closely located configurations a wired communication medium may be used.

As is further illustrated in FIG. 2, a DDMCS 100 in accordance with the teachings of the present invention may comprise a plurality of stand-alone RF transceiver/repeaters 111. Each stand-alone RF transceiver/repeater 111 as well as each RF transceiver 113 may be configured to receive one or more incoming RF transmissions (transmitted by a remote transmitter 115 or transceiver 113) and to transmit an outgoing signal. This outgoing signal may be another low-power RF transmission signal, a higher-power RF transmission signal, or alternatively may be transmitted over a conductive wire, fiber optic cable, or other transmission media. The internal architecture of the various RF communication devices will be discussed in more detail in connection with FIGS. 4A through 4D. It will be appreciated by those skilled in the art that integrated RF transceivers 113 can be replaced by RF transmitters 115 for client specific applications that require data collection only.

One or more local gateways 110a and 110b are configured and disposed to receive remote data transmissions from the various stand-alone RF transceiver/repeaters 111, integrated RF transmitters 115, or the integrated RF transceivers 113. The local gateways 110a and 110b may be configured to analyze the transmissions received, convert the transmissions into TCP/IP format and further communicate the remote data signal transmissions via WAN 130 to one or more application servers 160 or other WAN 130 interconnected computing devices. In this regard, and as will be further described below, local gateways 110a and 110b may communicate information in the form of data and control signals to remote sensor/actuators 112 and remote sensors 114 from application server 160, laptop computer 140, and workstation 150 across WAN 130. The application server 160 can be further associated with a database server 170 to record client specific data or to assist the application server 160 in deciphering a particular data transmission from a particular sensor 114.

It will be appreciated by those skilled in the art that if an integrated RF communication device (e.g., a RF transmitter 115, a RF transceiver 113, or a RF transceiver/repeater 111) is located sufficiently close to local gateways 110a or 1110b such that its RF output signal can be received by one or more local gateways 110, the data transmission signal need not be processed and repeated through either a RF transceiver/repeater 111 or a RF transceivers 113.

It will be further appreciated that a DDMCS 100 may be used in conjunction with a variety of residential systems to permit remote data access and control via a plurality of distributed computing devices in communication with a suitable WAN 130. As will be further appreciated from the discussion herein, each of the RF communication devices may have substantially identical construction (particularly with regard to their internal electronics), which provides a cost-effective implementation at the system level. Furthermore, a plurality of stand-alone RF transceiver/repeaters 111, which may be identical to one another, may be disposed in such a way that adequate coverage throughout a residence and or a residential community is provided. Preferably, stand-alone RF transceiver/repeaters 111 may be located such that only one stand-alone RF transceiver/repeater 111 will pick up a data transmission from a given integrated RF transceiver 113 and or RF transmitter 115. However, in certain instances two or more stand-alone RF transceiver/repeaters 111 may pick up a single data transmission. Thus, the local gateways 110a and 110b may receive multiple versions of the same data transmission signal from an integrated RF transceiver 113, but from different stand-alone RF transceiver/repeaters 111. As will be further explained in association with the preferred data transmission protocol, duplicative transmissions (e.g., data transmissions received at more than one local gateway 110 originating from a single RF communication device) may be appropriately handled.

Significantly, the local gateways 10 may communicate with all DDMCS 100 RF communication devices. Since the local gateways 10 are permanently integrated with the WAN 130, the application server 160 can host application specific software which was typically hosted in an application specific local controller 10 as shown in FIG. 1. Of further significance, the data monitoring and control devices of the present invention need not be disposed in a permanent location as long as they remain within signal range of a system compatible RF communication device that subsequently is within signal range of a local gateway 110 interconnected through one or more networks to the application server 160. In this regard, small application specific transmitters compatible with the DDMCS 100 can be worn or carried about one's person or may be integrated into position detecting sensors as will be further described below. Of still further significance, the DDMCS 100 as illustrated in FIG. 2, provides a flexible access and control solution through virtually any suitably configured computing device in communication with the WAN 130. As by way of example, a laptop computer 140 and/or a computer workstation 150 appropriately configured with suitable software may provide remote operator access to data collected via the DDMCS 100. In more robust embodiments, the laptop computer 140 and the computer workstation 150 may permit user entry of remote operative commands.

In one preferred embodiment of the DDCMS 100, an application server 160 collects, formats, and stores client specific data from each of the integrated RF transmitters 115, RF transceivers 113, and or RF transceiver/repeaters 111 for later retrieval or access from workstation 150 or laptop 140. In this regard, workstation 150 or laptop 140 can be used to access the stored information via a Web browser in a manner that is well known in the art. In another embodiment, the application server 160 may host application specific control system functions and replace the local controller 10 (see FIG. 1) by generating required control signals for appropriate distribution via WAN 130 and local gateways 110 to the system sensor/actuators 112. In a third embodiment, clients may elect for proprietary reasons to host control applications on their own WAN 130 connected workstation 150. In this regard, database 170 and application server 160 may act solely as data collection and reporting devices with the client workstation 150 generating control signals for the system.

It will be appreciated by those skilled in the art that the information transmitted and received by the RF communication devices of the present invention may be further integrated with other data transmission protocols for transmission across telecommunications and computer networks other than the WAN 130. In addition, it should be further appreciated that telecommunications and computer networks other than the WAN 130 can function as a transmission path between the communicatively coupled RF communication devices, the local gateways 110, and the application server 160.

Figure 3:
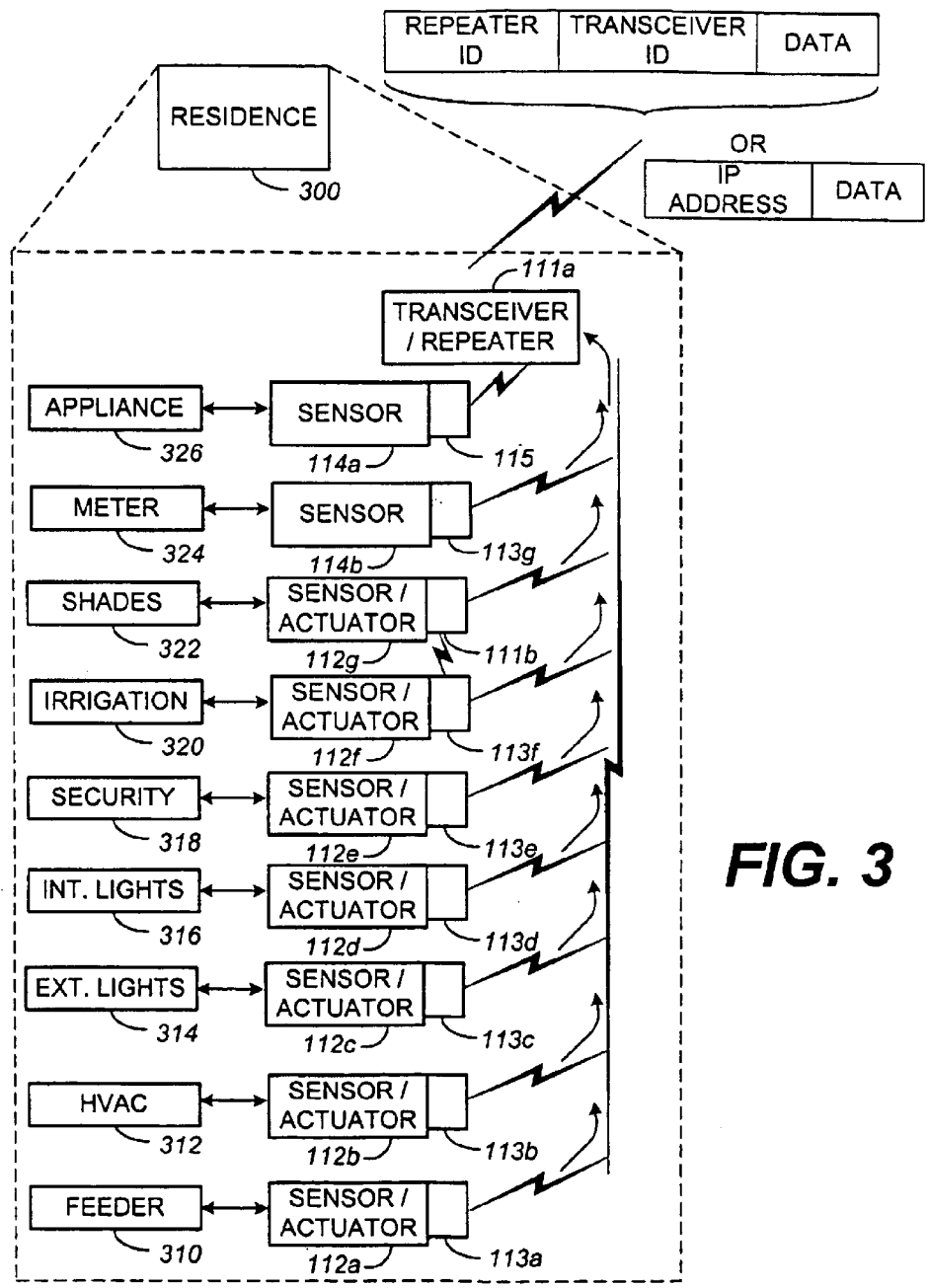
FIG. 3 is a schematic illustrating multiple interface devices that can be used in a home automation control system application of FIG. 2.

Having generally described the architecture and operation of a DDCMS 100 in accordance with the present invention with regard to FIG. 2, reference is now made to FIG. 3, which presents a schematic diagram illustrating multiple residential systems that may be coupled to the RF communication devices of the DDCMS 100 of FIG. 2. In this regard, a residence 300 may be configured with a plurality of exemplary systems and devices, such as but not limited to, a pet feeder 310, a HVAC system 312, an exterior lighting system 314, an interior lighting system 316, a security system 318, an irrigation system 320, a plurality of motorized window shades 322, a plurality of utility meters 324, as well as, a plurality of home appliances 326. As is illustrated in FIG. 3, each of the aforementioned systems and or devices may be integrated with one or more sensors 114 or alternatively one or more sensor/actuators 112, wherein each of the sensors 114 or sensor/actuators 112 are communicatively coupled with a RF communication device to permit data transmissions to and from the DDCMS 100 of FIG. 2.

As previously described and further illustrated in FIG. 2, a sensor 114 in configuration with a household appliance 326 may be configured to monitor one or more appliance related status parameters. The household appliance 326 related data may be communicated via a sensor 114a to a RF transmitter 115, which may be configured to receive the status parameter, encode the information, generate, and transmit a data signal transmission comprising the encoded status parameter and a transmitter identification. It will be appreciated that the appliance status parameters may include any or all of the following examples: an on/off status, a cycle selected status, a temperature, a time remaining for a particular cycle, etc. As illustrated in FIG. 3, a suitably situated and configured RF transceiver/repeater 111a within range of the RF transmitter 115 may be configured to receive a plurality of data signal transmissions from a plurality of compatibly configured RF communication devices. As illustrated in FIG. 3, the RF transceiver/repeater 111a may be a stand-alone device situated to receive data transmissions from throughout the residence 300. The RF transceiver/repeater 111a may be configured to receive the data signal transmission originating from the appliance 326. In accordance with a preferred data transmission protocol, the RF transceiver/repeater 111a may be configured to concatenate a repeater identification with the previous data signal information. In this way, a suitably configured application server 160 (FIG. 2) in communication with the WAN 130 (FIG. 2) may be provided RF transceiver/repeater 111 identification information, RF transmitter 115 identification information, and application specific data via the DDCMS 100.

By way of further example, a utility meter 324 (e.g., a natural gas meter, an electric power meter, or a water meter) may be communicatively coupled with a sensor 114b to a RF transceiver 113g, which may be configured to receive at least one status parameter, encode the information, generate, and transmit a data signal transmission comprising the encoded status parameter and a transceiver identification. It will be appreciated that the utility meter status parameter may include a digital representation of the current usage of the related commodity (e.g., kilowatt-hours in the case of an electric utility meter). As illustrated in FIG. 3, a suitably situated and configured RF transceiver/repeater 111a within range of the RF transceiver 113g may be configured to receive a plurality of data signal transmissions from a plurality of compatibly configured RF communication devices. The RF transceiver/repeater 111a may be configured to receive the data signal transmission originating from the utility meter 324. In accordance with a preferred data transmission protocol, the RF transceiver/repeater 111a may be configured to concatenate a repeater identification with the previous data signal information. In this way, a suitably configured application server 160 (FIG. 2) in communication with the WAN 130 (FIG. 2) may be provided RF transceiver/repeater 111a identification information, RF transceiver 113g identification information, and the current usage of the related commodity from the utility meter 324 via the DDCMS 100.

As is also illustrated in FIG. 3, one or more window shades 322 configured with a motorized mechanism for extending/retracting the shade(s) may be communicatively coupled with a sensor/actuator 112g to a RF transceiver/repeater 111b, which may be configured to receive at least one status parameter, encode the information, generate, and transmit a data signal transmission comprising the encoded status parameter and a transceiver identification in a monitoring or data collection mode. It will be appreciated that the window shade 322 status parameter may include a digital representation of the current position of the furthest panel of a multi-panel shade from a motorized mechanism. As illustrated in FIG. 3, a suitably situated and configured RF transceiver/repeater 111a within range of the RF transceiver/repeater 111b may be configured to receive a plurality of data signal transmissions from a plurality of compatibly configured RF communication devices. The RF transceiver/repeater 111a may be configured to receive the data signal transmission originating from the window shades 322. In accordance with a preferred data transmission protocol, the RF transceiver/repeater 111a may be configured to concatenate a repeater identification with the previous data signal information. In this way, a suitably configured application server 160 (FIG. 2) in communication with the WAN 130 (FIG. 2) may be provided RF transceiver/repeater 111a identification information, RF transceiver/repeater 111b identification information, and the current usage of the related commodity from the utility meter 324 via the DDCMS 100.

It is significant to note that the transceiver/repeater 111b in communication with at least one sensor/actuator 112g may receive and communicate one or more command signal transmissions from a suitably configured computing device connected to the WAN 130 (e.g., the application server 160, a laptop computer 140, a workstation computer 150, etc.) via the local gateway 110 (FIG. 2). In this way, appropriately configured software in a WAN 130 interconnected computing device can be used to remotely configure a plurality of appropriately integrated window shades 322.

As further illustrated in FIG. 3, an irrigation system controller 320 and or one or more individual sprinkler heads (not shown) may be communicatively coupled with a sensor/actuator 112f that is in further communication with a RF transceiver 113f. This combination may be configured to both send and receive a plurality of data signal and command signal transmissions via the DCCMS 100 of FIG. 2. It is significant to note that the diagram of FIG. 3 highlights the inherent flexibility of the signal path in a preferred architecture of the DCCMS 100. In this regard, the RF transceiver 113f may communicate and receive data and command signal transmissions via RF transceiver/repeater 111b or a stand-alone RF transceiver/repeater 111a. As with the previously introduced devices, the transceiver/repeater 113f may be configured to receive at least one status parameter from the associated sensor/actuator 112f, encode the information, and generate and transmit a data signal transmission comprising the encoded status parameter and a transceiver identification in a monitoring or data collection mode. It will be appreciated that the irrigation system 320 status parameter may include a digital representation of the rainwater in a rain gauge. As illustrated in FIG. 3, a suitably situated and configured RF transceiver/repeater 111a and/or a suitably situated RF transceiver/repeater 111b within range of the RF transceiver 113f may be configured to receive a plurality of data signal transmissions from a plurality of compatibly configured RF communication devices. The RF transceiver/repeater 111b may be configured to receive the data signal transmission originating from the irrigation system 320. In accordance with a preferred data transmission protocol, the RF transceiver/repeater 111b may be configured to concatenate a repeater identification with the previous data signal information before forwarding the data signal transmission on to the stand-alone RF transceiver/repeater 111a.

It will be appreciated that either the stand-alone RF transceiver/repeater 11a or a local gateway 10 within the data transmission signal path may be configured to truncate a duplicative data transmission and/or a duplicative command signal transmission. In this way, both data signal transmissions and command signal transmissions may traverse the wireless infrastructure of the DDCMS 100 (FIG. 2) to implement a remote monitoring/control solution for home automation applications.

As also illustrated in FIG. 3, a security system 318, an interior lighting system 316, a HVAC system 312, and a pet feeder 310 may be associated via a sensor/actuator 112 in further communication with an associated RF transceiver 113, to the DCCMS 100. As is further illustrated in FIG. 3, any of the RF transceivers 113 or the RF transceiver/repeaters 111 may be configured such that the data transmission comprises a portion that identifies an Internet protocol (IP) address of a destination device. Those skilled in the art will appreciate that a local gateway 110 (FIG. 2) may be configured to simply forward the IP address or in the alternative, insert an appropriate IP address for the designated destination computing device. It is significant to note that the various systems and items enumerated in FIG. 3 are offered by way of example only.

Having described a number of exemplary residential applications in accordance with the present invention in FIG. 3, reference is now directed to FIGS. 4A through 4D, which present functional block diagrams of various exemplary sensor, sensor/actuator, and RF communication device combinations that may be used to implement the DCCMS 100 of FIG. 2. In this regard, reference is directed to FIG. 4A, which illustrates a RF transmitter 115 in association with a sensor 114 in a combination generally denoted by reference numeral 400.

Figure 4A:
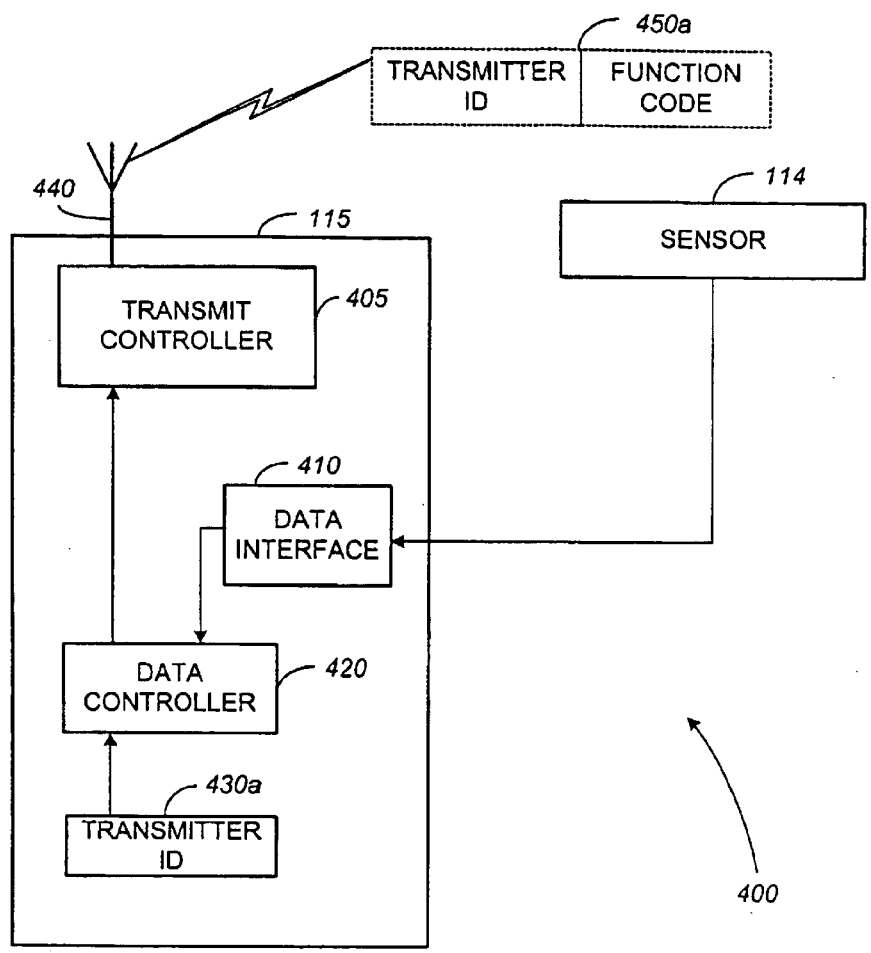
FIGS. 4A through 4D are functional block diagrams illustrating various combinations of sensors, actuators, transmitters, and transceiver/repeaters that may be used with the home automation control system of FIGS. 2 and 3.

As illustrated in FIG. 4A sensor 114 may be communicatively coupled with the RF transmitter 115. The RF transmitter 115 may comprise a transmit controller 405, a data interface 410, a data controller 420, a transmitter identification 430a, and an antenna 440. As is shown in FIG. 4A, a data signal forwarded from the sensor 114 may be received at an input port of the data interface 410. The data interface 410 may be configured to receive the data signal. In those situations where the data interface has received an analog data signal, the data interface 410 may be configured to convert the analog signal into a digital signal before forwarding a digital representation of the data signal to the data controller 420.

Each transmitter unit in a DCCMS 100 (FIG. 2) may be configured with a unique identification code (e.g., a transmitter identification number) 430a, that uniquely identifies the RF transmitter 15 to the various other devices within the DCCMS 100 (FIG. 2). The transmitter identification number 430a may be programmable, and implemented in the form of, for example, an EPROM. Alternatively, the transmitter identification number 430a may be set/configured through a series of dual inline package (DIP) switches. Additional implementations of the transmitter identification number 430a, whereby the number may be set/configured as desired, may be implemented consistent with the broad concepts of the present invention.

As illustrated in FIG. 4A, the data controller may be configured to receive both a data signal from the data interface 410 and the transmitter identification number 430a. As previously described, the data controller 410 may be configured to format (e.g., concatenate) both data portions into a composite information signal. The composite information signal may be forwarded to a transmit controller 405 which may be configured to use any of a number of various data modulation schemes to transmit the encoded RF signal from the sensor 114. It will be appreciated that the transmit controller 405 may convert information from digital electronic form into a format, frequency, and voltage level suitable for transmission from antenna 440. As previously mentioned, the transmitter identification number is set for a given transmitter 320. When received by the application server 160 (FIG. 2), the transmitter identification number 430a may be used to access a look-up table that identifies, for example, the residence, the system, and the particular parameter assigned to that particular transmitter. Additional information about the related system may also be provided within the lookup table, with particular functional codes associated with a corresponding condition or parameter, such as but not limited to, an appliance operating cycle, a power on/off status, a temperature, a position, and/or any other information that may be deemed appropriate or useful under the circumstances or implementation of the particular system.

Figure 4B:
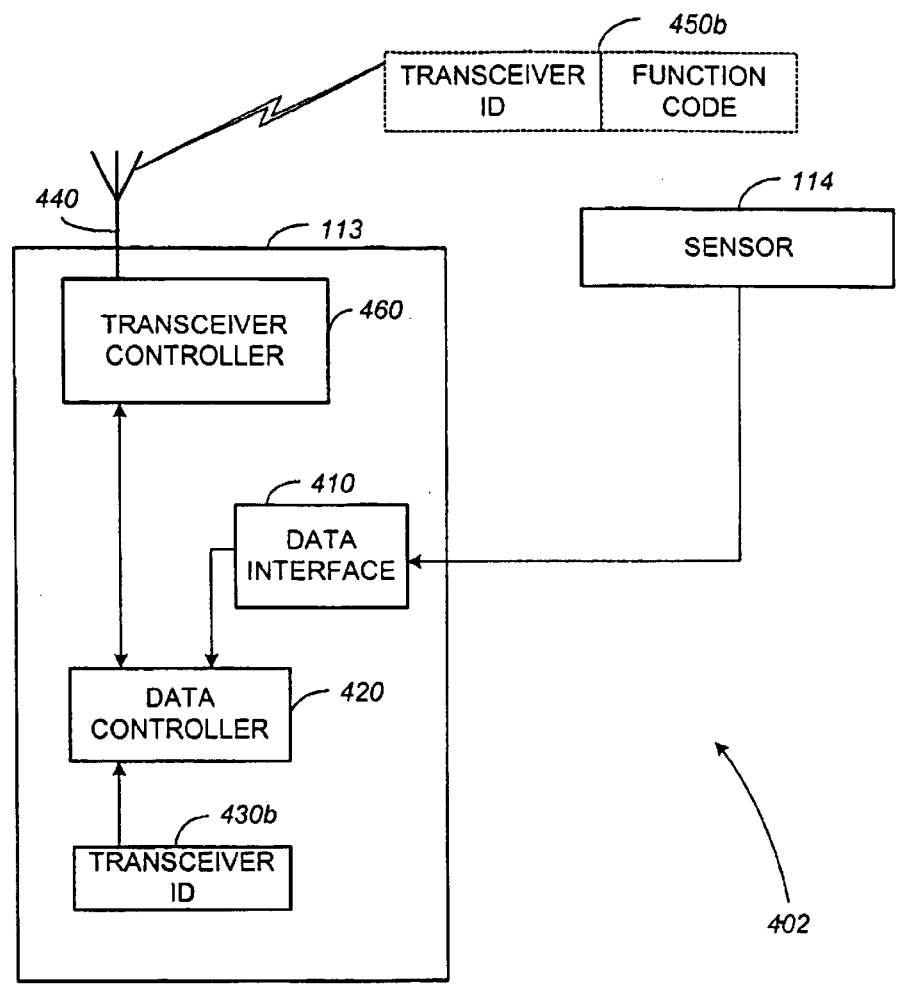

Reference is directed to FIG. 4B, which illustrates a RF transceiver 113 in association with a sensor 114 in a combination generally denoted by reference numeral 402. As illustrated in FIG. 4B sensor 114 may be communicatively coupled with the RF transceiver 113. The RF transceiver 113 may comprise a transceiver controller 460, a data interface 410, a data controller 420, a transceiver identification 430b, and an antenna 440. As is shown in FIG. 4B, a data signal forwarded from the sensor 114 may be received at an input port of the data interface 410. The data interface 410 may be configured to receive the data signal. In those situations where the data interface has received an analog data signal, the data interface 410 may be configured to convert the analog signal into a digital signal before forwarding a digital representation of the data signal to the data controller 420.

In accordance with a preferred embodiment, each transceiver 113 unit in a DCCMS 100 (FIG. 2) may be configured with a unique identification code (e.g., a transceiver identification number) 430b, that uniquely identifies the RF transceiver 113 to the various devices within the DCCMS 100 (FIG. 2). The transceiver identification number 430b may be programmable, and implemented in the form of, for example, an EPROM. Alternatively, the transceiver identification number 430b may be set/configured through a series of dual inline package (DIP) switches. Additional implementations of the transceiver identification number 430b, whereby the number may be set/configured as desired, may be implemented consistent with the broad concepts of the present invention.

As illustrated in FIG. 4B, the data controller 420 may be configured to receive both a data signal from the data interface 410 and the transceiver identification number 430b. As is also illustrated in FIG. 4B, the data controller 420 may also receive one or more data signals from other RF communication devices. As previously described, the data controller 410 may be configured to format (e.g., concatenate) both data signal portions originating at the transceiver 113 into a composite information signal which may also include data information from other closely located RF communication devices used in the DCCMS 100. The composite information signal may be forwarded to a transceiver controller 460 which may be configured to use any of a number of various data modulation schemes to transmit the encoded RF data signal from the sensor(s) 114 and/or the closely located sensor/actuators 112 (FIG. 2). It will be appreciated that the transceiver controller 460 may convert information from digital electronic form into a format, frequency, and voltage level suitable for transmission from the antenna 440. As previously mentioned with respect to the RF transmitter of FIG. 4A, the transceiver identification number 430b is set for a given transceiver 1113. When received by the application server 160 (FIG. 2), the transceiver identification number 430b may be used to access a look-up table that identifies, for example, the residence, the system, and the particular parameter assigned to that particular transceiver. Additional information about the related system may also be provided within the lookup table, with particular functional codes associated with a corresponding condition or parameter, such as but not limited to, an appliance operating cycle, a power on/off status, a temperature, a position, and/or any other information that may be deemed appropriate or useful under the circumstances or implementation of the particular system. As will be explained in association with the RF transceiver/repeater 111 of FIG. 4D, the transceiver 113 may be configured to receive an forward command information either using a unique RF or in the preferred embodiment a time interleaved packet based communication technique.

Figure 4C:
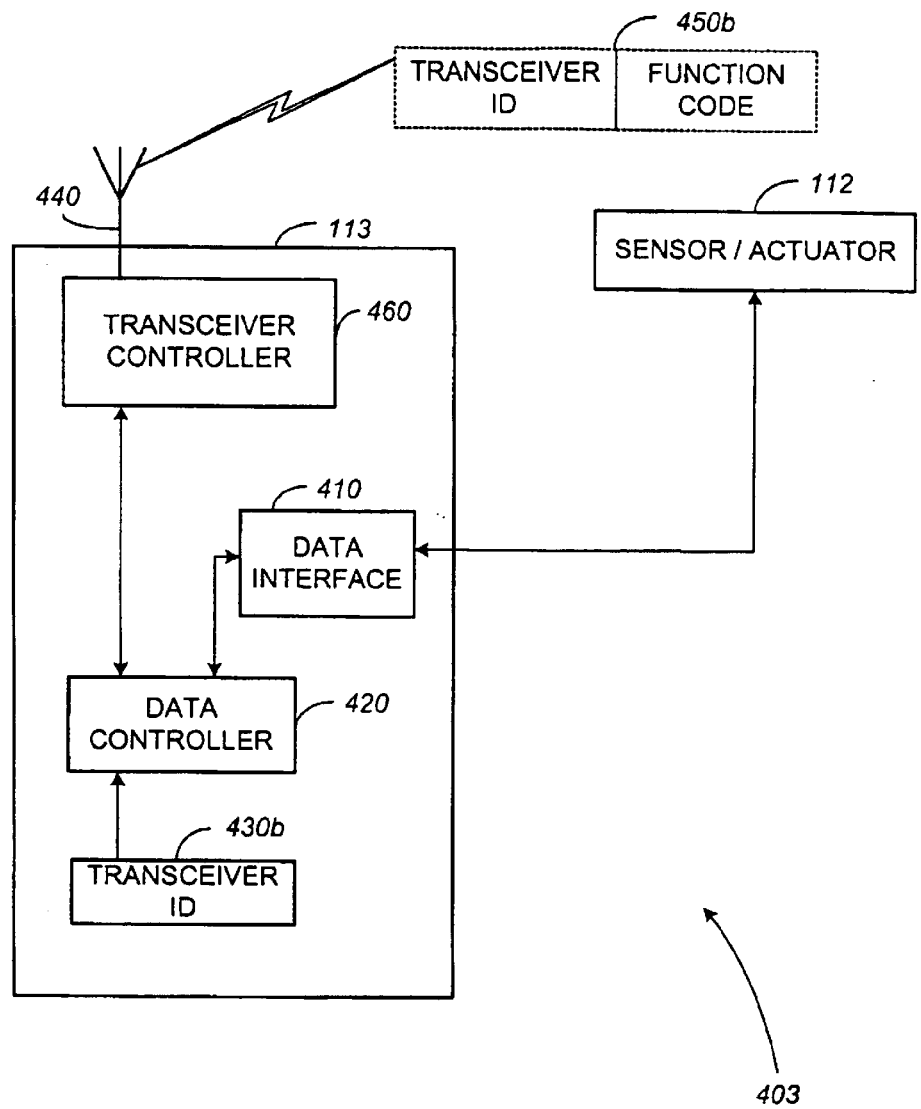

Having generally described the architecture and operation of the combination of a RF transceiver 113 and a sensor 114 in a DCCMS 100 (FIG. 2) in accordance with the present invention as illustrated in FIG. 4B, reference is directed to FIG. 4C, which presents a functional block diagram of a RF transceiver 113 in association with a sensor/actuator 112. As illustrated in FIG. 4C sensor/actuator 112 may be communicatively coupled with the RF transceiver 113. The RF transceiver 113 may comprise a transceiver controller 460, a data interface 410, a data controller 420, a transceiver identification 430b, and an antenna 440. As is shown in FIG. 4C, a data signal forwarded from the sensor/actuator 112 may be received at an input/output port of the data interface 410. The data interface 410 may be configured to receive the data signal and transmit a command signal. In those situations where the data interface has received an analog data signal, the data interface 410 may be configured to convert the analog signal into a digital signal before forwarding a digital representation of the data signal to the data controller 420. Similarly, when the data controller 420 forwards a digital representation of a command signal, the data interface 410 may be configured to translate the digital command signal into an analog voltage suitable to drive the actuator portion of the sensor actuator 112.

In accordance with a preferred embodiment, each RF transceiver 113 unit in a DCCMS 100 (FIG. 2) may be configured with a unique identification code (e.g., a transceiver identification number) 430b, that uniquely identifies the RF transceiver 113 to the various devices within the DCCMS 100 (FIG. 2). As previously described with respect to the device combinations of FIGS. 4A and 4B, the transceiver identification number 430b may be set/configured as desired within the broad concepts of the present invention.

As illustrated in FIG. 4C, the data controller 420 may be configured to receive both a data signal from the data interface 410 and the transceiver identification number 430b. As is also illustrated in FIG. 4C, the data controller 420 may also receive one or more data signals from other RF communication devices. As previously described, the data controller 410 may be configured to format (e.g., concatenate) both data signal portions originating at the RF transceiver 113 into a composite information signal which may also include data information from other closely located RF communication devices used in the DCCMS 100. The composite information signal may be forwarded to a transceiver controller 460 which may be configured to use any of a number of various data modulation schemes to transmit the encoded RF data signal from the sensor/actuator 112 and or the closely located sensor/actuators 112 or sensors 114 of nearby systems (FIG. 2). It will be appreciated that the transceiver controller 460 may convert information from digital electronic form into a format, frequency, and voltage level suitable for transmission from the antenna 440. As previously described with respect to the RF transmitter of FIG. 4A and the RF transceiver of FIG. 4B, the transceiver identification number 430b is set for a given transceiver 113 and may be used to identify a host of information particularized to the respective RF transceiver 113. As will be explained in association with the RF transceiver/repeater 111 of FIG. 4D, the RF transceiver 113 may be configured to receive and forward command information either using a unique RF or in the preferred embodiment a time interleaved packet based communication technique.

Figure 4D:
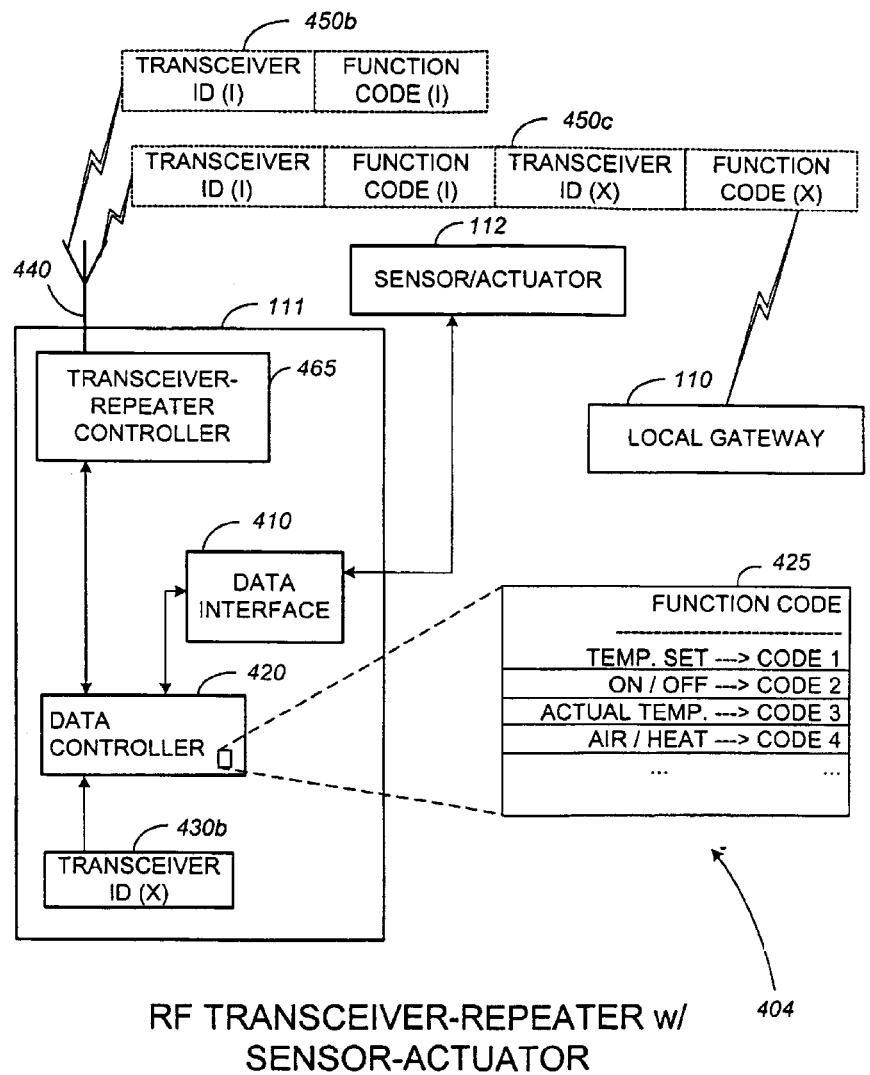

Having generally described the architecture and operation of the combination of a RF transceiver 113 and a sensor/actuator 112 as may be used in a DCCMS 100 (FIG. 2) as illustrated in FIG. 4C, reference is directed to FIG. 4D, which presents a functional block diagram of a RF transceiver/repeater 111 in association with a sensor/actuator 112. Reference is now made to FIG. 4D, which is a block diagram similar to that illustrated in FIGS. 4A through 4C, but illustrating a RF transceiver/repeater 111 that is integrated with a sensor/actuator 112. In this illustration, the data interface 410 is shown with a single input from sensor/actuator 112. It is easy to envision a system that may include multiple sensor inputs. By way of example, a common home heating and cooling (i.e., a HVAC) system 312 (FIG. 3) might be integrated with the present invention. The HVAC system 312 (FIG. 3) may include multiple data interface inputs from multiple sensors. A home thermostat control connected with the HVAC system 312 could be integrated with a sensor 114 that reports the position of a manually adjusted temperature control (i.e., a temperature set value), as well as, a sensor 114 integrated with a thermister to report an ambient temperature. The condition of related parameters can be input to the data interface 410 along with the condition of the HVAC system 312 on/off switch, and the climate control mode selected (i.e., heat, fan, or AC). In addition, depending upon the specific implementation, other system parameters may be provided to the data interface 410 as well.

The addition of the sensor/actuator 112 to the assembly permits the data controller 420 to apply particularized and encoded control signals to the manual temperature control for the temperature set point, the climate control mode switch, and the system on/off switch. In this way, a remote workstation 150 or laptop 140 with WAN 130 access (see FIG. 2) could control a home heating system from a remote location. Furthermore, an application server 160 in accordance with the DCCMS 100 of FIG. 2 may be suitably configured to automatically control the HVAC system 312 (FIG. 3).

Again, each of these various input signals are routed to the data interface 410, which provides the information to a data controller 420. The data controller 420 may utilize a look-up table 425 to access unique function codes that are communicated in data packet 450c, along with a transceiver identification code 430b via RF, to a local gateway 110 and further onto a WAN 130 (FIG. 2). In general, the operation of the RF transceiver/repeater 111 will be similar to that described for a RF transmitter 115 and a RF transceiver 113, as previously illustrated in FIGS. 4A through 4C. It is significant to note that data packet 450c will include a concatenation of the individual function codes selected for each of the aforementioned input parameters, as well as, a data stream 450b that may be received from other closely located RF transmitters 115 and RF transceivers 113. As previously described, the RF transceiver/repeater 111 may comprise a data controller 420 configured to generate a composite data stream in a transmit mode, as well as, a composite command stream in a receive mode that may be suitably processed and transmitted. As by way of example, the application server 160 may provide the client workstation 150 with a Web page display that models a common home thermostat. As previously described, either the application server 160 or the client workstation 150 may include application software that would permit a user with access to the computing devices via the WAN 130 to remotely adjust the controls on a residential HVAC system 312 by adjusting related functional controls on a graphical user interface (GUI) updated with feedback from the DCCMS 100 (FIG. 2).

More specifically, RF transceiver/repeater 111 is shown with four specific parameters related to four specific function codes as illustrated in look-up table 425. In this regard, the sensor/actuator 112 (one sensor shown for simplicity) inputs a data signal to the data interface 410. The data controller 420 receives an input from the data interface 410 that it may associate with a specific function code as shown in look-up table 425. The data controller 420 may assemble a data packet 450c by concatenating received data packet 450b with its own transceiver identification code 430b and its own specific function codes. The data packet 450c may then be converted by the transceiver/repeater controller 465 for transmission via antenna 440 to either a stand-alone RF transceiver/repeater 111 as shown in FIG. 2, or alternatively, to a suitably configured local gateway 110.

It will be appreciated by persons skilled in the art that the data interface 410 and the data controller 420 may be uniquely configured to interface with specialized sensor/actuator(s) 112. These circuits, therefore, may differ from RF transceiver/repeater 111 to RF transceiver/repeater 111, depending upon the remote system that is monitored and the related actuators to be controlled. However, in the preferred embodiment, the data interface 410 and the data controller 420 are pre-configured such that function code interpretation may be performed via a configuration smart application server 160 or a database server 170 in communication with the RF transceiver/repeater 111 via the DCCMS 100 of FIG. 2. In this regard, the implementation of the data interface 410 and the data controller 420 will be understood by persons skilled in the art, and need not be described herein to appreciate the concepts and teachings of the present invention.

In addition, to the RF communication device-sensor/actuator combinations illustrated and described hereinabove with respect to FIGS. 4A through 4D, a mobile transceiver (not shown) in accordance with the present invention is also contemplated. The mobile transceiver may take the shape of a commonly recognized transmitter associated with automobile access functions. For example, a personal mobile transceiver may comprise a plurality of transmit pushbuttons with each assigned to a particular functional code associated with the party assigned to the personal mobile transceiver. By way of example, an emergency call function may be assigned to a first transmit pushbutton. As previously described, the personal mobile transceiver may be configured to transmit an encoded message identifying the party assigned to the transceiver. Upon receiving the incoming message, an application server 160 in communication with the personal mobile transceiver via a DCCMS 100 of FIG. 2 may identify the party and that the first transmit pushbutton has been depressed. The application server 160 may prompt its own look-up table or an associated database server 170 for an interpretive match for the first pushbutton on that particular party's personal mobile transceiver. Furthermore, additional codes may be provided as necessary to accommodate additional functions or features for a given transceiver. Thus, in operation, a user may depress the emergency pushbutton, which is detected by the data interface 410. The data interface 410 may communicate the input to a data controller 420 which may then use the information pertaining to the emergency pushbutton to access a look-up table 425 to retrieve a code that is uniquely assigned to the pushbutton for that particular individual. The data formatter 420 may also retrieve the pre-configured transceiver identification number 430b in configuring a data packet 450c for communication via RF signals to a nearby RF transceiver 113.

It will be appreciated by persons skilled in the art that the various RF communication devices illustrated and described in relation to the functional block diagrams of FIGS. 4A through 4D may be configured with a number of optional power supply configurations. For example, a personal mobile transceiver may be powered by a replaceable battery. Similarly, a stand-alone RF transceiver/repeater 111 may be powered by a replaceable battery that may be supplemented and or periodically charged via a solar panel. These power supply circuits, therefore, may differ from RF communication device to RF communication device depending upon the remote system monitored, the related actuators to be controlled, the environment, and the quality of service level required. Those skilled in the art will appreciate and understand how to meet the power requirements of the various RF communication devices associated with the DCCMS 100 of the present invention. As a result, it is not necessary to further describe a power supply suitable for each RF communication device and each application in order to appreciate the concepts and teachings of the present invention.

Figure 5:
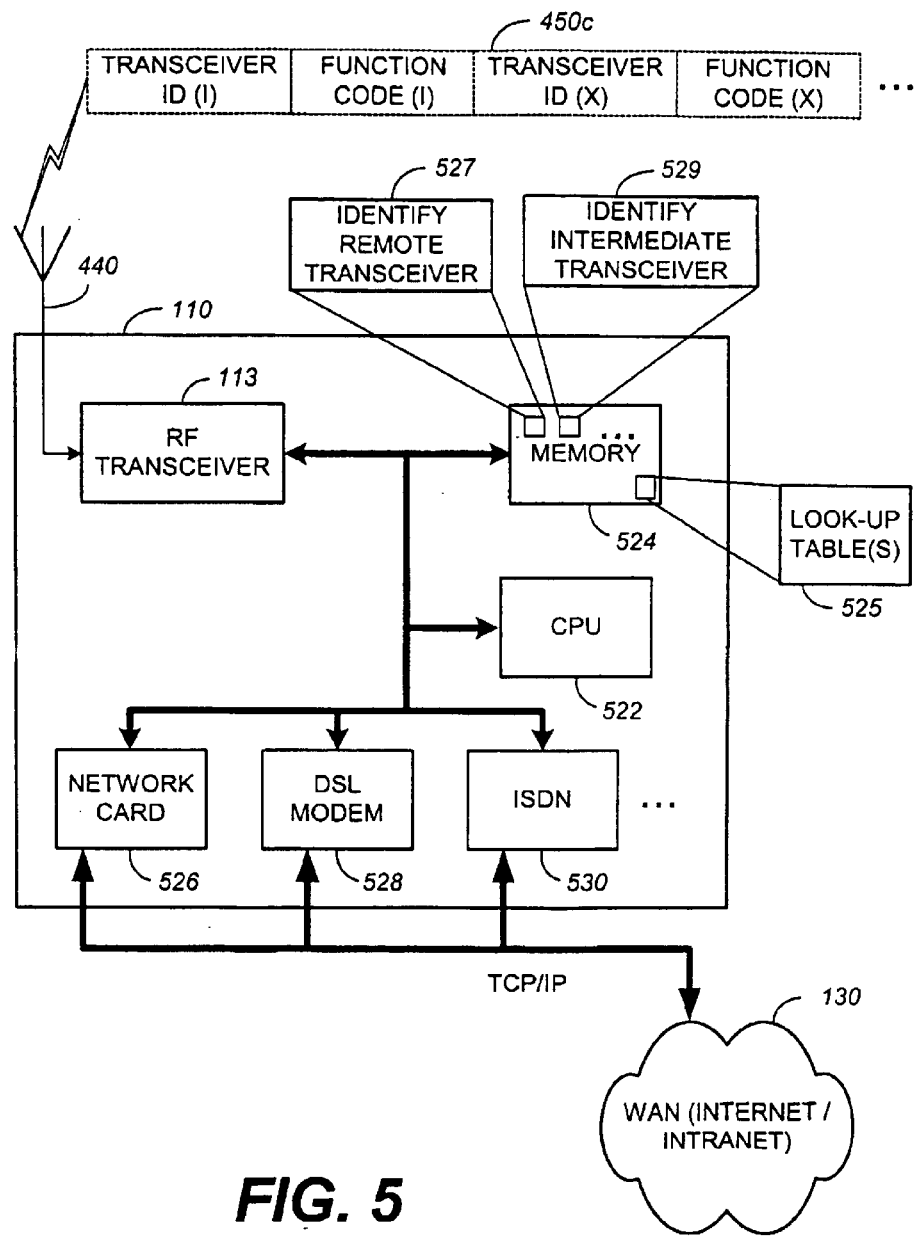
FIG. 5 is a functional block diagram that further illustrates the local WAN gateway of the control system of FIG. 2.

Having illustrated and described the operation of the various combinations of RF communication devices with the various sensors 114 and sensor/actuators 112 consistent with the present invention, reference is now made to FIG. 5, which is a block diagram further illustrating a local gateway 110 within the DCCMS 100 of FIG. 2. As illustrated in FIG. 5, a local gateway 10 may comprise an antenna 440, a RF transceiver 113, a central processing unit (CPU) 522, a memory 524, a network card 526, a digital subscriber line (DSL) modem 528, an integrated services digital network (ISDN) interface card 530, as well as other components not illustrated in FIG. 5, capable of enabling a terminal control protocol/Internet protocol (TCP/IP) connection to the WAN 130.

As illustrated in FIG. 5, the RF transceiver 113 may be configured to receive incoming RF signal transmissions via the antenna 440. Each of the incoming RF signal transmissions may be consistently formatted in the convention previously described. The local gateway 10 may be configured such that the memory 524 includes a look-up table 525 that may assist in identifying the various remote and intermediate RF communication devices used in generating and transmitting the received data transmission as illustrated in memory sectors 527 and 529 herein labeled, "Identify Remote Transceiver" and "Identify Intermediate Transceiver," respectively. Programmed or recognized codes within the memory 524 may also be provided and configured for controlling the operation of a CPU 522 to carry out the various functions that are orchestrated and/or controlled by the local gateway 110. For example, the memory 524 may include program code for controlling the operation of the CPU 522 to evaluate an incoming data packet to determine what action needs to be taken. In this regard, one or more look-up tables 525 may also be stored within the memory 524 to assist in this process. Furthermore, the memory 524 may be configured with program code configured to identify a remote RF transceiver 527 or identify an intermediate RF transceiver 529. Function codes, RF transmitter and or RF transceiver identification numbers 430a, 430b, may all be stored with associated information within the look-up tables 525.

Thus, one look-up table 525 may be provided to associate transceiver identification numbers 430b (FIGS. 4C, 4D) with a particular user. Another look-up table 525 may be used to associate function codes 425 (FIG. 4D) with the interpretation thereof. For example, a unique code may be associated by a look-up table 525 to identify functions such as test, temperature, smoke alarm active, security system breach, etc. In connection with the lookup table(s) 525, the memory 524 may also include a plurality of code segments that are executed by the CPU 522, which may in large part control operation of the gateway 110. For example, a first data packet segment 450c may be provided to access a first lookup table to determine the identity of the RF transceiver 113, which transmitted the received message. A second code segment 450c' (not shown) may be provided to access a second lookup table to determine the proximate location of the message generating RF transceiver 113, by identifying the RF transceiver 113 that relayed the message. A third code segment 450c" (not shown) may be provided to identify the content of the message transmitted. Namely, is it a fire alarm, a security alarm, an emergency request by a person, a temperature control setting, etc. Consistent with the invention, additional, fewer, or different code segments may be provided to carryout different functional operations and data signal transfers throughout the DCCMS 100 (FIG. 2) of the present invention.

The local gateway 110 may also include one or more mechanisms to facilitate network based communication with remote computing devices. For example, the gateway 110 may include a network card 526, which may allow the gateway 110 to communicate across a local area network to a network server, which in turn may contain a backup gateway 110 (not shown) to the WAN 130 (FIG. 2). Alternatively, the local gateway 110 may contain a DSL modem 528, which may be configured to provide a link to a remote computing system, by way of the PSTN 12 (FIG. 1). In yet another alternative, the local gateway 110 may include an ISDN card 530 configured to communicate via an ISDN connection with a remote system. Other communication interfaces may be provided as well to serve as primary and or backup links to the WAN 130 or to local area networks that might serve to permit local monitoring of gateway 110 health and data packet control.

Having described the physical layer of a DCCMS 100 (FIG. 2) consistent with the present invention, reference is now made to FIG. 6, which describes a data structure of messages that may be sent and received via the DCCMS 100. In this regard, a standard message may comprise a "to" address; a "from" address; a packet number; a maximum packet number, a packet length; a command portion; a data portion; a packet check sum (high byte); and a packet check sum (low byte). As illustrated in the message structure table of FIG. 6, the "to" address or message destination may comprise from 1 to 6 bytes. The "from" address or message source device may be coded in a full 6 byte designator. Bytes 11 through 13 may be used by the system to concatenate messages of packet lengths greater than 256 bytes. Byte 14 may comprise a command byte. Byte 14 may be used in conjunction with bytes 15 through 30 to communicate information as required by DCCMS 100 specific commands. Bytes 31 and 32 may comprise packet check sum bytes. The packet check sum bytes may be used by the system to indicate when system messages are received with errors. It is significant to note that bytes 31 and 32 may be shifted in the message to replace bytes 15 and 16 for commands that require only one byte. The order of appearance of specific information within the message protocol of FIG. 6 generally remains fixed although the byte position number in individual message transmissions may vary due to scalability of the "to" address, the command byte, and scalability of the data portion of the message structure.

Having described the general message structure of a message that may be sent via the DCCMS 100 of the present invention, reference is directed to FIG. 7, which illustrates three sample messages. The first message illustrates the broadcast of an emergency message "FF" from a central server with an address "0012345678" to a personal transceiver with an address of "FF."

The second message reveals how the first message might be sent to a RF transceiver that functions as a repeater. In this manner, emergency message "FF" from a central server with address "0012345678" is first sent to transceiver "F0." The second message, further contains additional command data "A000123456" that may be used by the system to identify further transceivers to send the signal through on the way to the destination device.

The third message illustrated on FIG. 7 reveals how the message protocol of the present invention may be used to "ping" a remote RF transceiver 113 (FIG. 2) in order to determine transceiver health. In this manner, source unit "E112345678" originates a ping request by sending command "08" to a transceiver identified as "A012345678." The response to the ping request can be as simple as reversing the "to address" and the "from address" of the command, such that, a healthy transceiver will send a ping message back to the originating device. The system of the present invention may be configured to expect a return ping within a specific time period. Operators of the present invention could use the delay between the ping request and the ping response to model system loads and to determine if specific DCCMS 100 parameters might be adequately monitored and controlled with the expected feedback transmission delay of the system.

Figure 8:
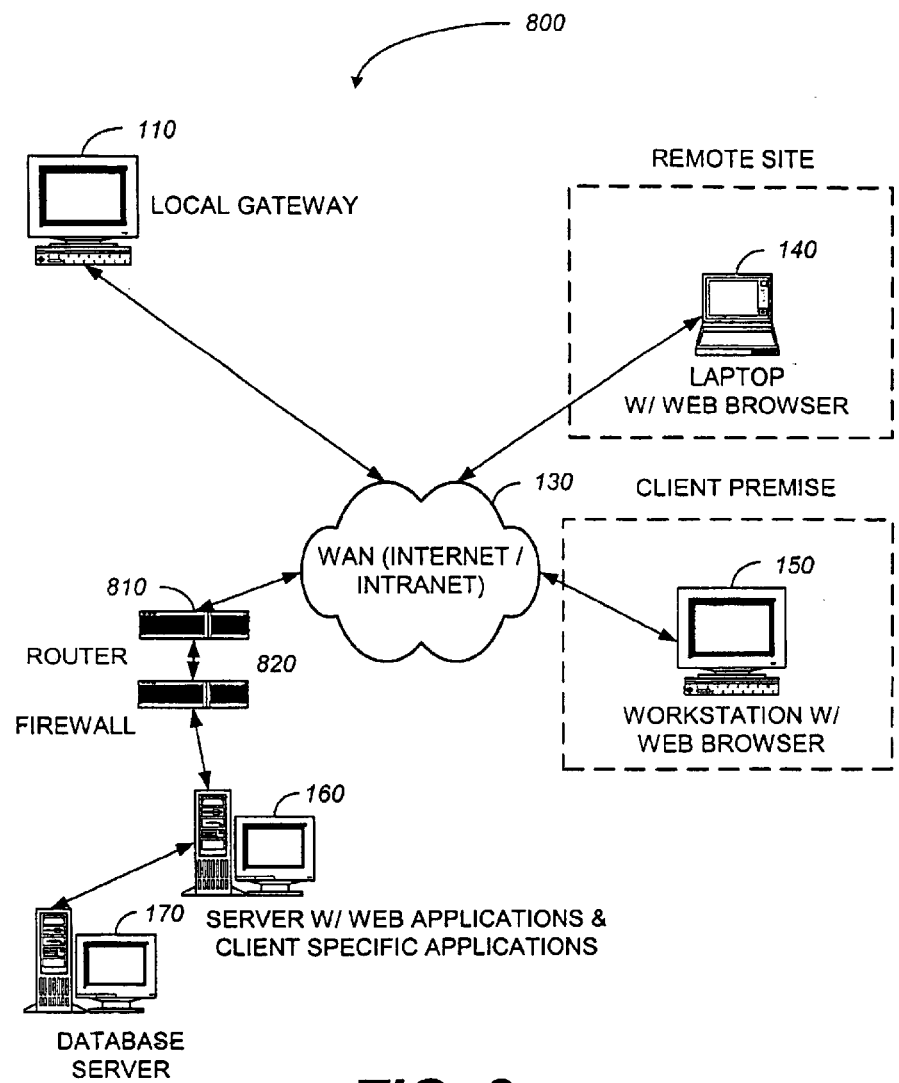
FIG. 8 is a schematic diagram further illustrating the various WAN interconnected devices of the control system of FIG. 2.

Reference is now made to FIG. 8, which is a diagram illustrating WAN 130 connectivity in a DCCMS 100 (FIG. 2) constructed in accordance with the invention. In this regard, the local gateway 110 may be configured to transmit control signals and receive data signals using the open data packet protocol as previously described. The local gateway 110 is preferably interconnected permanently on the WAN 130 and configured to translate received data signals for WAN 130 transfer via TCP/IP. An application server 160 configured with web applications and client specific applications as required may be communicatively coupled to the WAN 130 via router 810 and further protected and buffered by firewall 820. Consistent with the concepts and teachings of the present invention, the application server 160 may be assisted in its task of storing and making available client specific data by a database server 170.

As further illustrated in FIG. 8, a client workstation 150 configured with a Web browser may be connected to the WAN 130 at a client premise. Alternatively, clients may access the WAN 130 via a remote laptop 140 or other computing devices (not shown) configured with a compatible Web browser or other user interface. In this way, the application server 160 may provide client specific data upon demand.

Figure 9:
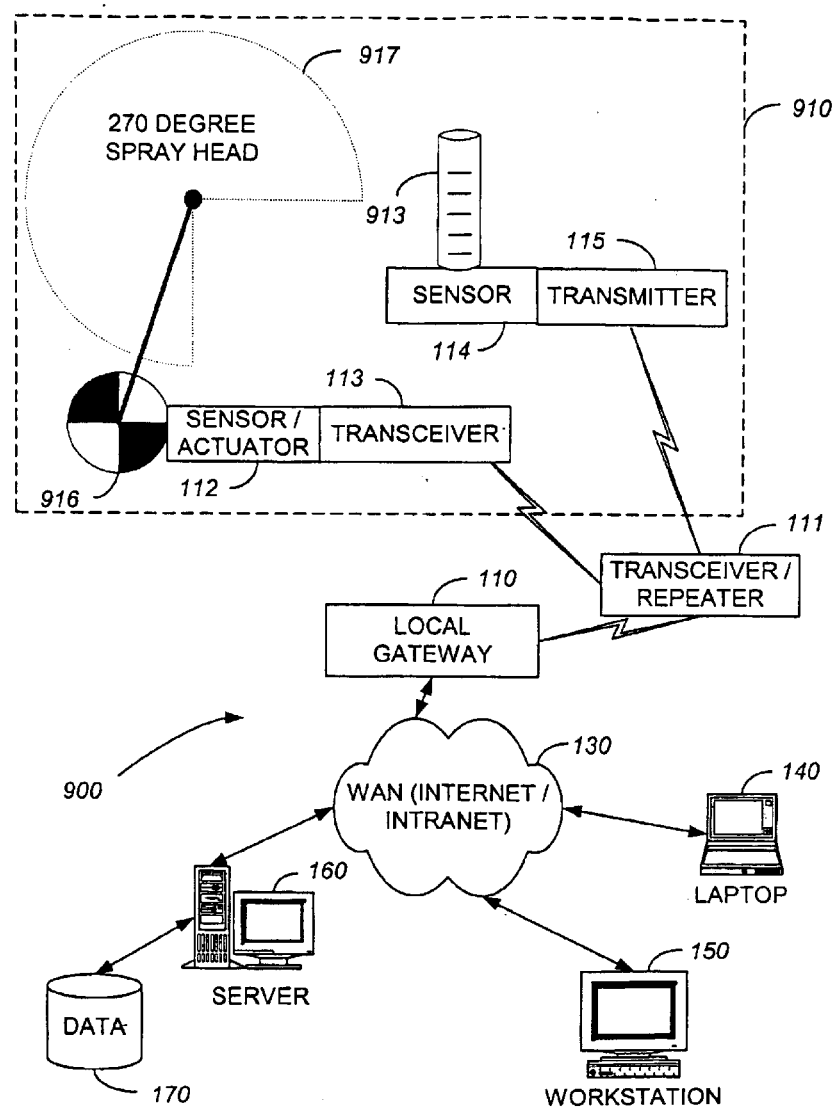
FIG. 9 is a schematic diagram illustrating the implementation of a first client specific application using the control system of FIG. 2.

Having described the DCCMS 100 of the present invention with regard to FIG. 2 and further described WAN 130 connectivity with regard to FIG. 8, reference is now made to FIG. 9, which illustrates a specific home automation application consistent with application of the invention. More specifically, FIG. 9 illustrates the integration of the DCCMS 100 with an irrigation control system 900. For simplicity, controlled area 910 is represented by a single rain gauge 913 and a single related sprinkler head 917. It is easy to see that such a system could be modified and expanded to monitor and control any of a number of separate irrigation systems, irrigation sprinkler heads, or a multiple zone irrigation system controller integrated with the DCCMS 100 of the present invention.

As illustrated in FIG. 9, the controlled area 910 is configured with a rain gauge 913 integrated with sensor 114 wherein a measure of rainfall and applied water to the adjacent area may be converted to a voltage signal that may be transmitted via functional codes by RF transmitter 115 along with a related transmitter identification code 430a (FIG. 4A) in a manner previously described. As further illustrated in FIG. 9, a stand-alone RF transceiver/repeater 111 may further process and transmit the encoded data to the local gateway 110, which may translate the data packet information into TCP/IP format for transfer across the WAN 130 to the various computing devices associated with the WAN 130. The application server 130 may collect and format the rain gauge 913 data for viewing or retrieval upon client request in a manner previously described. Additionally, the application server 160 may be configured to communicate a command signal to operate sprinkler head 917 by opening water supply valve 916 integrated with a sensor/actuator 112 by sending a control signal to RF transceiver 113, per a client directed water application control schedule. Alternatively, a customer workstation 150 or a laptop 140 associated with the WAN 130 may periodically download and review the rain gauge 913 data and may initiate an operator directed control signal. It is significant to note that the customer workstation 150 could initiate a change in its own application software, or with the proper access capabilities may modify various system parameters associated with the irrigation system 900. The general operation and interconnectivity of the application server 160 and an associated database server 170 function as previously illustrated and described with regard to FIGS. 2 and 8. It is significant to note however that the application server 160 may contain a suitably configured software interface (not shown) along with associated applications necessary to support a remote access and controllable residential irrigation system 900. Those skilled in the art will appreciate how to develop and implement software interfaces and modules to enable the various desired functions associated with each particular residential application. Specific software interfaces and other applications need not be described herein to appreciate the concepts and teachings of the DCCMS 100 of the present invention and the integration thereof with a particular home automation system.

Figure 10:
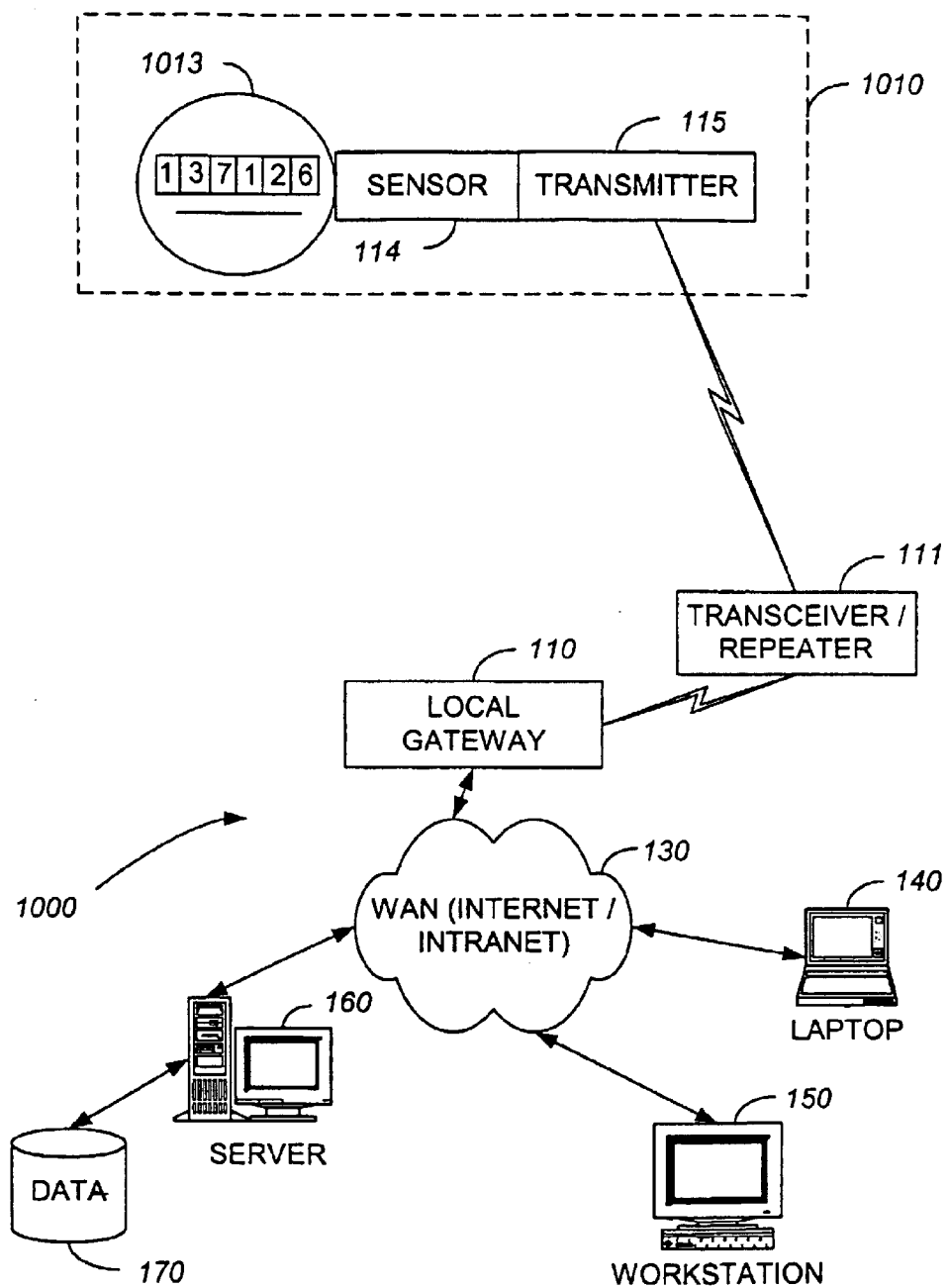
FIG. 10 is a schematic diagram illustrating a second client specific application using the control system of FIG. 2.

Having described the integration of a DCCMS 100 of the present invention with a residential irrigation system 900 with regard to FIG. 9, reference is now made to FIG. 10, which illustrates a second specific home automation application consistent with the present invention. As illustrated FIG. 10, a remote utility meter monitoring system 1000 may be integrated with the DCCMS 100 of FIG. 2. The remote utility monitoring system 1000 may comprise the DCCMS 100 infrastructure as described hereinabove with regard to FIG. 2 and a utility meter subsystem 1010. As further illustrated in FIG. 10, the utility meter subsystem 1010 may comprise a utility meter 1013, an appropriately integrated sensor 114 wherein the utility meter 1013 operational status and current utility meter usage total is transmitted via functional codes to a RF transmitter 115. The RF transmitter 115, as previously introduced and described hereinabove, may be configured to forward the related functional codes along with a transmitter identification code 430a in a formatted data packet. As also illustrated in FIG. 10, a stand-alone RF transceiver/repeater 111 may receive, process, and transmit the encoded data and the RF communication device identifiers to the local gateway 110 which translates the data packet information into TCP/IP format for transfer across the WAN 130 to the application server 160. The application server 160 may be configured to collect and format the utility meter information for viewing and or retrieval upon client request in a manner previously described.

Figure 11:
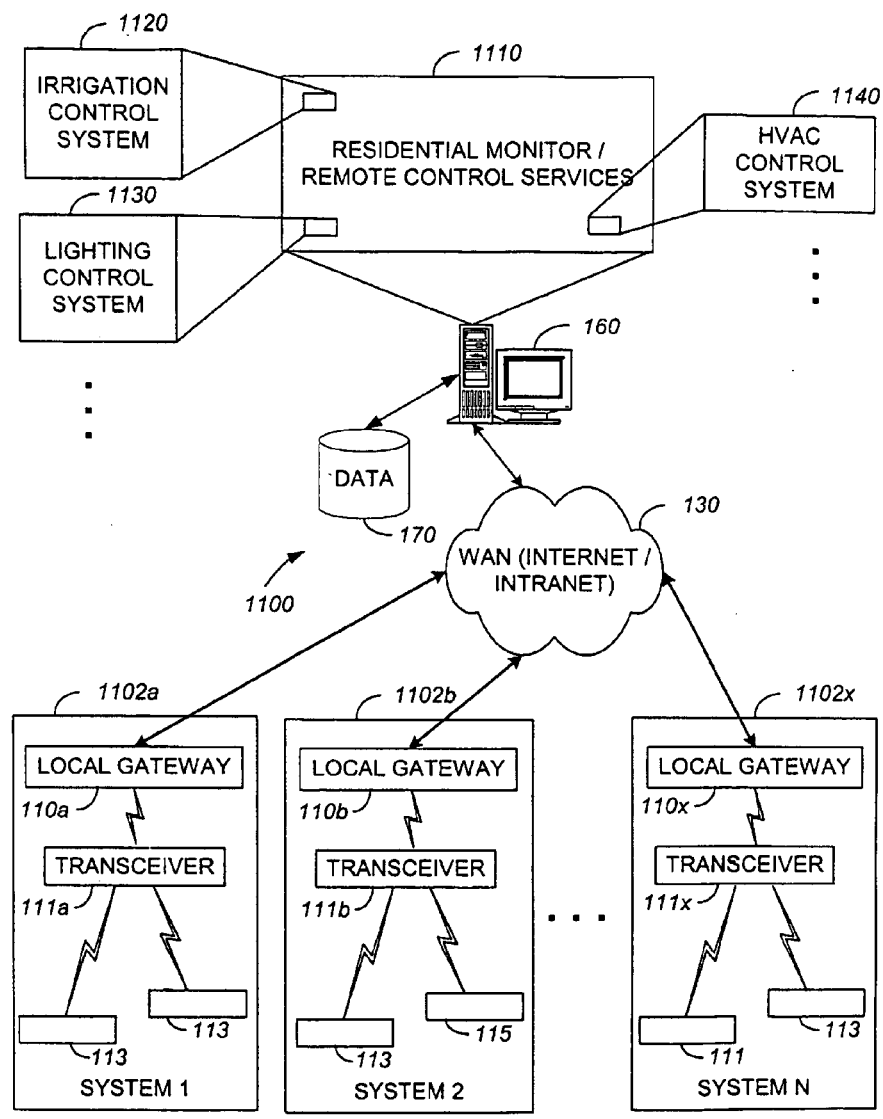
FIG. 11 is a block diagram illustrating how a WAN connected application server of FIG. 2 can be used to service multiple client residences.

Having illustrated specific applications using the DCCMS 100 of the present invention in exemplary home automation systems, reference is now made to FIG. 11 which illustrates a residential monitoring and control service system 1100. In accordance with a preferred embodiment, the residential monitoring and control service system 1100 may monitor and control remote data points associated with a plurality of home automation systems. As illustrated in FIG. 11, a plurality of home automation applications herein identified by way of non-limiting examples as an irrigation control application 1120, a lighting control application 1130, and a HVAC control application 1140 may be packaged as by way of one or more software applications to provide a residential monitor/remote control service 1110.

As further illustrated in FIG. 11, an application server 160 along with an associated database server 170 may be in communication with a plurality of systems 1102 via the DCCMS 100 infrastructure. Each of the plurality of systems 1102a, 1102b, 1102x may be associated with a residential automation application such as those previously identified with regard to FIG. 3. As shown in FIG. 11, one or more clients of the residential monitor/remote control service 1110 may elect to subscribe to a plurality of services associated with appropriately integrated sensors 114, sensor/actuators 112, and RF communication devices as previously described.

For example, the controlled area 910 of the irrigation control system 900 shown in FIG. 9, the remote utility meter subsystem 1010 illustrated in FIG. 10, and other home automation systems and or subsystems as desired may be monitored and remotely controlled (where required) by an appropriately configured application server 160. In a manner previously described herein, the application server 160 collects and processes data information transferred and sent over the WAN 130 by local gateways 110 coupled via RF communication devices associated with a plurality of sensors 114 and sensor/actuators 112 appropriately integrated as required to monitor and or control the various systems 1102a, 1102b, . . . , 1102x. For simplicity, FIG. 11 shows each of the systems operated by a singular application server 130 with its own dedicated local gateway 110. It will be appreciated by those skilled in the art that small-scale systems jointly located within a geographic area served by a DCCMS 100 in accordance with the present invention may be configured to share the RF transceiver/repeater 111 and local gateway 110 infrastructure of a previously installed local system.

Figure 12A:
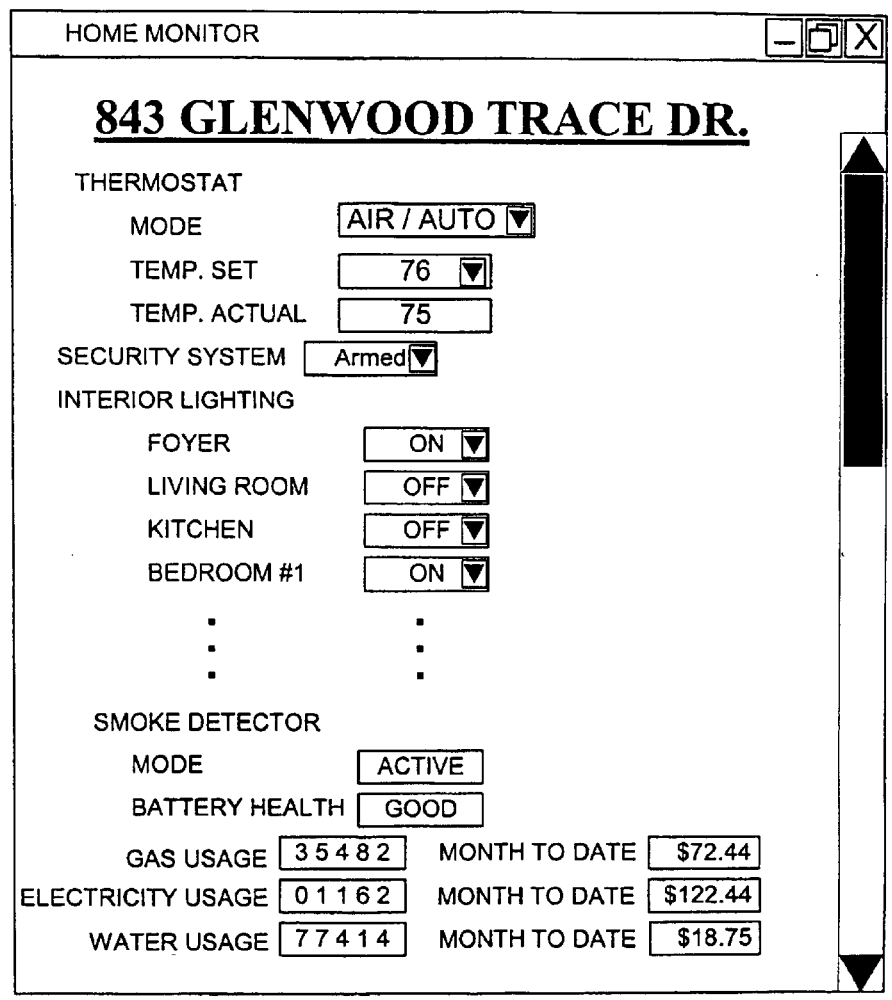
FIGS. 12A and 12B are exemplary diagrams illustrating a software interface that may be resident of the application server of FIG. 2.
Figure 12B:
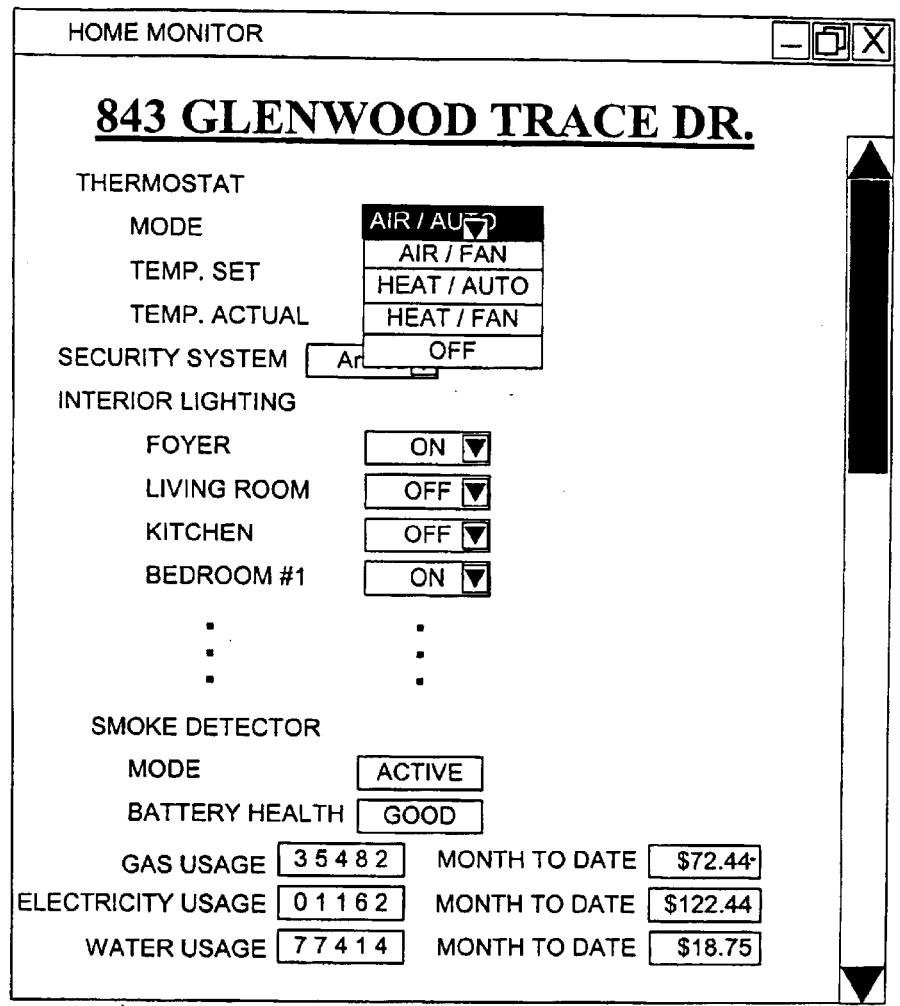

Although there will necessarily be some initial configuration to such a system, ultimately, data may be displayed to a client operator accessing the information over the WAN 130 in a variety of manners. Referring to FIG. 12A, one possible GUI display is illustrated. Specifically, for a given client household which may be indicated by an address, alphanumeric titles for the various systems, devices, and appliances that have RF communication devices and appropriately configured sensors and actuators associated with them may be displayed. Likewise, an appropriate status, parameter reading, or operational control setting may be displayed next to the device identifier. By way of illustration, HVAC system 312 (FIG. 3) settings may be displayed such as an operating mode, a temperature setting, and a temperature reading (denoted as temperature actual). For any identifier that may be user controlled, a drop down menu may be provided to allow ready access and control. For example, consider a user wishing to change the mode of a thermostat. The user may initiate this change by clicking on an arrow. The screen may then present a drop down menu as illustrated in FIG. 12B. This menu may list all the options available to the user, such as air/auto, air/fan, heat/auto, heat/fan, and off. The user may simply select the setting of choice by using a mouse or other input device. This information may then be taken and routed to the appropriate thermostat at the appropriate client household as previously described hereinabove.

As further illustrated in the sample GUIs illustrated in FIGS. 12A and 12B, multiple home automation systems may be displayed simultaneously in accordance with a client driven package of home automation services. Those skilled in the art will appreciate that alternative methods and arrangements of the various data information and controls may be provided without varying from the teachings and concepts of the present invention. For example, each specific home automation application may correspond to an associated graphical user interface. In a related manner, individual clients may have a need or a desire to customize the look and feel of a personal interface.

It will be further appreciated that what has been described herein is a very top-level illustration of a system constructed in accordance with the DCCMS 100 of the present invention. In accordance with the invention, a variety of household devices and appliances may be monitored and controlled from a remote location via WAN 130 interconnected computing devices. It is significant to note that the WAN 130 may take the form of a private Intranet or as in the preferred embodiment may comprise the public access network commonly known as the Internet. The data and command transmissions may be transmitted and received at a WAN 130 interconnected local gateway 110, which may be in communication with a series of RF communication devices. The data and command transmissions may be relayed via the various RF communication devices as required until they reach a designated residential destination or the local gateway 110.

It is significant to note that one or more specific types of RF transceivers may be integrated within the DCCMS 100 of the present invention. For example, one RF transceiver that may be used is the TR1000, manufactured by RF Monolithics, Inc.

As is known, the TR1000 hybrid transceiver is well suited for short range, wireless data applications where robust operation, small size, low power consumption, and low-cost are desired. All critical RF functions are contained within the single hybrid chip, simplifying circuit design and accelerating the design-in process. The receiver section of the TRI1000 is sensitive and stable. A wide dynamic range log detector, in combination with digital automatic gain control (AGC) provide robust performance in the presence of channel noise or interference. Two stages of surface acoustic wave (SAW) filtering provide excellent receiver out-of-band rejection. The transmitter includes provisions for both on-off keyed (OOK) and amplitude-shift key (ASK) modulation. The transmitter employs SAW filtering to suppress output harmonics, for compliance with FCC and other regulations.

Additional details of the TR1000 transceiver need not be described herein, because the present invention is not limited by the particular choice of transceiver. Indeed, numerous RF transceivers may be implemented in accordance with the teachings of the present invention. Such other transceivers may include other 900 MHz transceivers, as well as transceivers at other frequencies. In addition, infrared, ultrasonic, and other types of transceivers may be employed, consistent with the broad scope of the present invention. Further details of the TR1000 transceiver may be obtained through data sheets, application notes, design guides (e.g., the "ASH Transceiver Designers Guide"), and other publications known those skilled in the art.

In addition to the information described above, it will be appreciated that the transceivers and repeaters may also relay digitized voice information. That is, digitized voice information may comprise a portion of the data payload. Thus, certain devices may be configured to be operated from voice (e.g., speech recognition), and can receive the necessary speech data from the data payload. Furthermore, both pre-recorded and real-time public safety broadcasts, such as but not limited to, weather related warnings, public emergency notices, local law enforcement announcements, and the like, may be broadcast via a DCCMS 100 in accordance with the present invention. For example, a pre-recorded hurricane evacuation message may be triggered by a suitable command broadcast via the DCCMS 100 and received at a residential device suitable configured to play an associated copy of the message. In more robust configurations, a local law enforcement/public interest message may be sent in an encoded format via the DCCMS 100 and reassembled in an appropriately configured residential device whereby the message may be reconstructed in near real-time. The one or more residential devices may be configured to override current intercoms and or other residential devices configured with audio capability. It will be appreciated that each of the various types of messages may be identified with an associated priority level. It will be further appreciated that the corresponding public service message may be handled in a different manner in accordance with the designated priority level.

The foregoing description has illustrated certain fundamental concepts of the invention as they relate to the specific home automation applications referenced by example hereinabove. It is significant to note that other additions and/or modifications may be made consistent with the inventive concepts. For example, the RF transmitters 115 illustrated in FIGS. 2 and 4A and implemented in a control system as illustrated in FIG. 10 may be adapted to monitor the current status of an electric, water, or natural gas utility meter. RF transmitters 115 might further be used to monitor and report actual operational hours on motorized equipment or any other apparatus that must be serviced or monitored based on an actual run-time schedule.

The RF transceivers 113 of the current invention may be adapted to monitor and apply control signals in an unlimited number of applications. By way of example only, RF transceivers 113 consistent with the teachings and concepts of the DCCMS 100 of the present invention can be adapted for use with consumer electronics, as well as, for use with a host of residential appliances and devices to provide a flexible home automation and security system.

In a geographic area appropriately networked with permanently located RF transceiver/repeaters 111 consistent with the invention, personal mobile transmitters consistent with the invention can be used to initiate communication with family members, neighbors, and or emergency response personnel.

The foregoing description has been presented for purposes of illustration and description. It is not intended to be exhaustive or to limit the invention to the precise forms disclosed. Obvious modifications or variations are possible in light of the above teachings. For example, it should be appreciated that, in some implementations, the transceiver identification number 430b is not necessary to identify the location of the transceiver. Indeed, in implementations where the transceiver is permanently integrated into an alarm sensor other stationary device within a system, then the control system application server 160 and or the local gateway 110 may be configured to identify the transmitter location by the transmitter identification number alone. It will be appreciated that, in embodiments that do not utilize RF transceiver/repeaters 111, the RF transmitters 115 and/or RF transceivers 113 may be configured to transmit at a higher power level, in order to effectively communicate with the local gateway 110.

The embodiment or embodiments discussed were chosen and described to illustrate the principles of the invention and its practical application to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

Therefore, having thus described the invention, at least the following is claimed:

1. A distributed data monitoring and control system suitable for residential automation applications, comprising:
   at least one sensor suitably integrated with a residential system configured to provide a sensor data signal;
   at least one wireless communication device communicatively coupled with the at least one sensor configured to receive the sensor data signal and format a first encoded data signal comprising a communication device identifier and a predetermined function code responsive to the received sensor data signal wherein the wireless communication device broadcasts the first encoded data signal over a wireless transmission media to a gateway communicatively coupled to a wide area network configured to receive and translate the first encoded data signal into a wide area network data transfer protocol for transmission to a computing device configured to collect, process, and store, the received sensor data signal.

2. The system of claim 1, wherein the at least one wireless communication device is configured to broadcast the first encoded data signal via a transmission medium selected from the group consisting of radio-frequency (RF), infra-red (IR), and ultrasound.

3. The system of claim 1, wherein the at least one wireless communication device broadcasts the first encoded data signal to a computing device configured to execute a computer program having a first segment for evaluating the first encoded data signal to identify the at least one wireless communication device.

4. The system of claim 1, wherein the at least one wireless communication device broadcasts the first encoded data signal to a computing device configured to execute a computer program having a second segment for evaluating the first encoded data signal to identify a parameter value associated with the sensor.

5. The system of claim 1, wherein the at least one wireless communication device is configured to receive a second encoded data signal via a transmission medium selected from the group consisting of radio-frequency (RF), infra-red (IR), and ultrasound.

6. The system of claim 1, wherein the gateway is configured to insert timing information into the first encoded data signal.

7. The system of claim 1, wherein the gateway is configured to translate the first encoded data signal into TCP/IP for communication over the wide area network.

8. The system of claim 1, wherein the wide area network is the Internet.

9. The system of claim 1, wherein the wide area network is an Intranet.

10. The system of claim 4, wherein the computer program uses a look-up table that associates at least one parameter value associated with the sensor to a data input.

11. The system of claim 4, wherein the at least one wireless communication device broadcasts the first encoded data signal to a computing device configured to execute a computer program having a third segment for evaluating the relative health of the at least one wireless communication device.

12. The system of claim 5, wherein the second encoded data signal originates from a closely located second wireless communication device associated with at least one sensor and identifies a parameter value associated with the associated sensor.

13. The system of claim 5, wherein the at least one wireless communication device is configured to generate and broadcast a composite encoded data signal comprising information from the first and second encoded data signals.

14. The system of claim 11, wherein the computer program evaluates the relative health of the at least one wireless communication device based on an algorithm that monitors elapsed time between received first encoded data signals.

15. The system of claim 13, wherein the at least one wireless communication device is in communication with an actuator and is configured to receive an encoded command signal generated by a computing device configured to execute a computer program responsive to the received sensor data signal.

16. The system of claim 15, wherein encoded command signals are routed in response to the previously identified wireless communication device(s) responsible for generating and forwarding an associated received sensor data signal.

17. The system of claim 15, wherein the actuator is responsive to a received command signal.

18. The system of claim 15, wherein encoded command signals are routed periodically to the at least one wireless communication device to initiate a sensor data signal.

19. The system of claim 15, wherein encoded command signals are routed periodically to the at least one wireless communication device to initiate a wireless communication device health check response signal.

20. The system of claim 15, wherein encoded command signals contain encoded audio broadcast messages.

21. A method for monitoring residential systems, comprising:
 providing at least one gateway device in communication with a wide area network wherein the gateway device is configured to receive an encoded broadcast signal having a first portion that identifies an originating wireless communication device and a second portion that contains a function code responsive to a sensed parameter;
 using the gateway device to translate and embed the received broadcast signal within a data packet with a network data transfer protocol;
 using the gateway device to transmit the data packet over the wide area network to a designated computing device;
 receiving the data packet at the designated computing device; and
 using the designated computing device to identify the originating wireless communication device and the associated function code contained within the data packet.

22. The method of claim 21, wherein the step of providing the at least one gateway device is accomplished by communicatively associating the gateway with the Internet.

23. The method of claim 21, wherein the step of providing the at least one gateway device is accomplished by communicatively associating the gateway with a dedicated Intranet.

24. The method of claim 21, wherein the step of using the gateway device to translate and embed the received broadcast signal in a data packet is accomplished with terminal control protocol/Internet protocol (TCP/IP).

25. The method of claim 21, wherein the step of providing the at least one gateway device is accomplished with a gateway device in communication with at least one wireless communication device configured to broadcast an encoded broadcast signal via a transmission medium selected from the group consisting of radio-frequency (RF), infra-red (IR), and ultrasound.

26. The method of claim 21, further comprising:
 using the designated computing device to associate timing information responsive to the received broadcast signal;
 storing parameter information derived from the function code; and
 providing access to the stored parameter information upon client request.

27. The method of claim 21, wherein the step of providing access to the stored parameter information is accomplished using a web browser.

28. The method of claim 27, wherein the step of providing access to the stored parameter information is accomplished using hypertext mark-up language (HTML).

29. The method of claim 27, wherein the step of providing access to the stored parameter information is accomplished using at least one graphical user interface.

30. A method for monitoring and controlling residential systems, comprising:
 providing at least one gateway device in communication with a wide area network wherein the gateway device is configured to receive a first encoded signal having a first portion that identifies an originating wireless communication device and a second portion that contains a function code responsive to a sensed parameter and wherein the gateway device is configured to broadcast a second encoded signal that identifies at least one wireless communication device to traverse ending at a destination wireless communication device and wherein the second encoded signal contains a command;
 using the gateway device to translate and embed the received broadcast signal within a data packet with a network data transfer protocol;
 using the gateway device to transmit the data packet over the wide area network to a designated computing device;
 receiving the data packet at the designated computing device;
 using the designated computing device to identify the originating wireless communication device and the associated function code contained within the data packet;
 deriving parameter information from the function code;
 generating at least one command in response to the derived parameter information;
 embedding the command information and appropriate wireless communication device routing information in a data packet;
 transmitting the data packet to the appropriate gateway; and
 using the gateway to construct an appropriate second encoded signal responsive to the data packet.

31. The method of claim 30, wherein the step of providing the at least one gateway device is accomplished by communicatively associating the gateway with the Internet.

32. The method of claim 31, wherein the step of providing the at least one gateway device is accomplished by communicatively associating the gateway with a dedicated Intranet.

33. The method of claim 31, wherein the step of using the gateway device to translate and embed the received broadcast signal in a data packet is accomplished with terminal control protocol/Internet protocol (TCP/IP).

34. The method of claim 31, wherein the step of providing the at least one gateway device is accomplished with a gateway device in communication with at least one wireless communication device configured to broadcast an encoded signal via a transmission medium selected from the group consisting of radio-frequency (RF), infra-red (IR), and ultra-sound.

35. The method of claim 31, further comprising:
   using the designated computing device to associate timing information responsive to both the first and second encoded signals;
   deriving parameter information from the function code;
   using the parameter information in a control algorithm to derive system outputs;
   providing the system outputs upon client request.

36. The method of claim 31, wherein the step of providing system outputs is accomplished using a web browser.

37. The method of claim 36, wherein the web browser uses hypertext mark-up language (HTML).

38. The method of claim 36, wherein the web browser uses at least one graphical user interface.

* * * * *

(12) EX PARTE REEXAMINATION CERTIFICATE (8515th)

United States Patent
Petite et al.

(10) Number: US 6,891,838 C1
(45) Certificate Issued: Sep. 6, 2011

(54) SYSTEM AND METHOD FOR MONITORING AND CONTROLLING RESIDENTIAL DEVICES

(75) Inventors: Thomas D. Petite, Douglasville, GA (US); Richard M. Huff, Convers, GA (US)

(73) Assignee: Sipco, LLC, Atlanta, GA (US)

Reexamination Request:
No. 90/010,301, Oct. 3, 2008
No. 90/010,510, May 14, 2009
No. 90/010,512, May 15, 2009
No. 90/010,511, May 15, 2009

Reexamination Certificate for:
Patent No.: 6,891,838
Issued: May 10, 2005
Appl. No.: 09/704,150
Filed: Nov. 1, 2000

Related U.S. Application Data

(63) Continuation-in-part of application No. 09/439,059, filed on Nov. 12, 1999, and a continuation-in-part of application No. 09/412,895, filed on Oct. 5, 1999, and a continuation-in-part of application No. 09/271,517, filed on Mar. 18, 1999, now abandoned, and a continuation-in-part of application No. 09/172,554, filed on Oct. 14, 1998, and a continuation-in-part of application No. 09/102,178, filed on Jun. 22, 1998.

(60) Provisional application No. 60/201,252, filed on May 1, 2000.

(51) Int. Cl.
*H04L 12/28* (2006.01)

(52) U.S. Cl. .................................. 370/401; 340/870.02
(58) Field of Classification Search ........................ None
See application file for complete search history.

(56) References Cited

U.S. PATENT DOCUMENTS 3,575,558 A  4/1971  Leyburn et al.
3,665,475 A  5/1972  Gram
3,705,385 A  12/1972  Batz (Continued)

FOREIGN PATENT DOCUMENTS

EP  0 483 547 A1  5/1992

(Continued)

OTHER PUBLICATIONS

IEE Std 802.11–1997, published Jun. 26, 1997 by the Institute of Electrical and Electronics Engineers, Inc. 345 East 47th Street, New York, NY 10017–2394, USA. (available at www.ieee.org).

(Continued)

*Primary Examiner*—Zoila E Cabrera

(57) ABSTRACT

The present invention is generally directed to a system and method for monitoring and controlling a host of residential automation systems. The system is implemented by using a plurality of wireless communication devices configured to relay both data and command encoded signals through the wireless network of communication devices interposed between integrated sensors/actuators and a gateway device. In accordance with a preferred embodiment, the gateway translates the data encoded signals and embeds the information in a data packet using terminal control protocol/Internet protocol to communicate the data to a computing device on a wide area network. The computing device may comprise data collection and or control algorithms as desired. The computing device may forward command signals to the gateway device. In response thereto, the gateway may convert the command signals into appropiate command encoded signals for wireless transmission to a designated actuator integrated in a residential system. The present invention can also be viewed as providing a method for monitoring and controlling residential systems. In its broadest terms, the method can be described as: sensing a parameter; generating a wireless signal; traversing a wireless network to a gateway interconnected with a wide area network; communicating the parameter to a computing device on the network; generating a control signal; communicating the control signal to the gateway; converting the control signal; and broadcasting the control signal such that an appropriate actuator is energized.

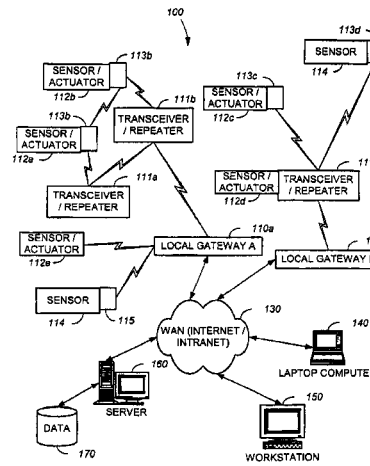

U.S. PATENT DOCUMENTS

| | | |
|---|---|---|
| 3,723,876 A | 3/1973 | Seaborn, Jr. |
| 3,742,142 A | 6/1973 | Martin |
| 3,848,231 A | 11/1974 | Wootton |
| 3,892,948 A | 7/1975 | Constable |
| 3,906,460 A | 9/1975 | Halpern |
| 3,914,692 A | 10/1975 | Seaborn, Jr. |
| 3,922,492 A | 11/1975 | Lumsden |
| 3,925,763 A | 12/1975 | Wadhwani et al. |
| 4,025,315 A | 5/1977 | Mazelli |
| 4,056,684 A | 11/1977 | Lindstrom |
| 4,058,672 A | 11/1977 | Crager et al. |
| 4,083,003 A | 4/1978 | Haemmig |
| 4,120,452 A | 10/1978 | Kimura et al. |
| 4,124,839 A | 11/1978 | Cohen |
| 4,135,181 A | 1/1979 | Bogacki et al. |
| 4,204,195 A | 5/1980 | Bogacki |
| 4,213,119 A | 7/1980 | Ward et al. |
| 4,277,837 A | 7/1981 | Stuckert |
| 4,278,975 A | 7/1981 | Kimura et al. |
| 4,284,852 A | 8/1981 | Szybicki et al. |
| 4,336,524 A | 6/1982 | Levine |
| 4,345,116 A | 8/1982 | Ash et al. |
| 4,354,181 A | 10/1982 | Spletzer |
| 4,396,910 A | 8/1983 | Enemark et al. |
| 4,396,915 A | 8/1983 | Farnsworth et al. |
| 4,399,531 A | 8/1983 | Grande et al. |
| 4,406,016 A | 9/1983 | Abrams et al. |
| 4,417,450 A | 11/1983 | Morgan, Jr. et al. |
| 4,436,957 A | 3/1984 | Mazza et al. |
| 4,446,454 A | 5/1984 | Pyle |
| 4,446,458 A | 5/1984 | Cook |
| 4,454,414 A | 6/1984 | Benton |
| 4,468,656 A | 8/1984 | Clifford et al. |
| 4,488,152 A | 12/1984 | Arnason et al. |
| 4,495,496 A | 1/1985 | Miller, III |
| 4,551,719 A | 11/1985 | Carlin et al. |
| 4,611,198 A | 9/1986 | Levinson et al. |
| 4,621,263 A | 11/1986 | Takenaka et al. |
| 4,630,035 A | 12/1986 | Stahl et al. |
| 4,631,357 A | 12/1986 | Grunig |
| 4,669,113 A | 5/1987 | Ash et al. |
| 4,670,739 A | 6/1987 | Kelly, Jr. |
| 4,704,724 A | 11/1987 | Krishnan et al. |
| 4,707,852 A | 11/1987 | Jahr et al. |
| 4,731,810 A | 3/1988 | Watkins |
| 4,742,296 A | 5/1988 | Petr et al. |
| 4,757,185 A | 7/1988 | Onishi |
| 4,788,721 A | 11/1988 | Krishnan et al. |
| 4,792,946 A | 12/1988 | Mayo |
| 4,800,543 A | 1/1989 | Lyndon-James et al. |
| 4,814,763 A | 3/1989 | Nelson et al. |
| 4,825,457 A | 4/1989 | Lebowitz |
| 4,829,561 A | 5/1989 | Matheny |
| 4,833,618 A | 5/1989 | Verma et al. |
| 4,849,815 A | 7/1989 | Streck |
| 4,851,654 A | 7/1989 | Nitta |
| 4,856,046 A | 8/1989 | Streck et al. |
| 4,857,912 A | 8/1989 | Everett, Jr. et al. |
| 4,864,559 A | 9/1989 | Perlman |
| 4,875,231 A | 10/1989 | Hara et al. |
| 4,884,132 A | 11/1989 | Morris et al. |
| 4,897,644 A | 1/1990 | Hirano |
| 4,906,828 A | 3/1990 | Halpern |
| 4,908,769 A | 3/1990 | Vaughan et al. |
| 4,912,656 A | 3/1990 | Cain et al. |
| 4,918,432 A | 4/1990 | Pauley et al. |
| 4,918,690 A | 4/1990 | Markkula, Jr. et al. |
| 4,918,995 A | 4/1990 | Pearman et al. |
| 4,924,462 A | 5/1990 | Sojka |
| 4,928,299 A | 5/1990 | Tansky et al. |
| 4,939,726 A | 7/1990 | Flammer et al. |
| 4,940,976 A | 7/1990 | Gastouniotis et al. |
| 4,949,077 A | 8/1990 | Mbuthia |
| 4,952,928 A | 8/1990 | Carroll et al. |
| 4,962,496 A | 10/1990 | Vercellotti et al. |
| 4,967,366 A | 10/1990 | Kaehler |
| 4,968,970 A | 11/1990 | LaPorte |
| 4,968,978 A | 11/1990 | Stolarczyk |
| 4,972,504 A | 11/1990 | Daniel, Jr. et al. |
| 4,973,957 A | 11/1990 | Shimizu et al. |
| 4,973,970 A | 11/1990 | Reeser |
| 4,977,612 A | 12/1990 | Wilson |
| 4,980,907 A | 12/1990 | Raith et al. |
| 4,987,536 A | 1/1991 | Humblet |
| 4,989,230 A | 1/1991 | Gillig et al. |
| 4,993,059 A | 2/1991 | Smith et al. |
| 5,007,052 A | 4/1991 | Flammer |
| 5,079,768 A | 1/1992 | Flammer |
| 5,088,032 A | 2/1992 | Bosack |
| 5,115,433 A | 5/1992 | Baran et al. |
| 5,117,422 A | 5/1992 | Hauptschein et al. |
| 5,130,987 A | 7/1992 | Flammer |
| 5,138,615 A | 8/1992 | Lamport et al. |
| 5,142,694 A | 8/1992 | Jackson et al. |
| 5,159,592 A | 10/1992 | Perkins |
| 5,170,393 A | 12/1992 | Peterson et al. |
| 5,216,502 A | 6/1993 | Katz |
| 5,221,838 A | 6/1993 | Gutman et al. |
| 5,223,844 A | 6/1993 | Mansell et al. |
| 5,231,658 A | 7/1993 | Eftechiou |
| 5,235,630 A | 8/1993 | Moody et al. |
| 5,239,294 A | 8/1993 | Flanders et al. |
| 5,239,575 A | 8/1993 | White et al. |
| 5,241,410 A | 8/1993 | Streck et al. |
| 5,243,338 A | 9/1993 | Brennan, Jr. et al. |
| 5,245,633 A | 9/1993 | Schwartz et al. |
| 5,252,967 A | 10/1993 | Brennan et al. |
| 5,253,167 A | 10/1993 | Yoshida et al. |
| 5,265,150 A | 11/1993 | Helmkamp et al. |
| 5,265,162 A | 11/1993 | Bush et al. |
| 5,266,782 A | 11/1993 | Alanara et al. |
| 5,272,747 A | 12/1993 | Meads |
| 5,276,680 A | 1/1994 | Messenger |
| 5,282,204 A | 1/1994 | Shpancer et al. |
| 5,282,250 A | 1/1994 | Dent et al. |
| 5,289,165 A | 2/1994 | Belin |
| 5,289,362 A | 2/1994 | Liebl et al. |
| 5,291,516 A | 3/1994 | Dixon et al. |
| 5,295,154 A | 3/1994 | Meier et al. |
| 5,305,370 A | 4/1994 | Kearns et al. |
| 5,309,501 A | 5/1994 | Kozik et al. |
| 5,315,645 A | 5/1994 | Matheny |
| 5,317,309 A | 5/1994 | Vercellotti et al. |
| 5,319,364 A | 6/1994 | Waraksa et al. |
| 5,319,698 A | 6/1994 | Glidewell et al. |
| 5,319,711 A | 6/1994 | Servi |
| 5,323,384 A | 6/1994 | Norwood et al. |
| 5,325,429 A | 6/1994 | Kurgan |
| 5,329,394 A | 7/1994 | Calvani et al. |
| 5,331,318 A | 7/1994 | Montgomery |
| 5,334,974 A | 8/1994 | Simms et al. |
| 5,335,265 A | 8/1994 | Cooper et al. |
| 5,343,493 A | 8/1994 | Karimullah |
| 5,345,231 A | 9/1994 | Koo et al. |
| 5,345,595 A | 9/1994 | Johnson et al. |
| 5,347,263 A | 9/1994 | Carroll et al. |
| 5,352,278 A | 10/1994 | Korver et al. |
| 5,354,974 A | 10/1994 | Eisenberg |
| 5,355,513 A | 10/1994 | Clarke et al. |
| 5,365,217 A | 11/1994 | Toner |
| 5,371,736 A | 12/1994 | Evan |

| Patent No. | Date | Name |
|---|---|---|
| 5,382,778 A | 1/1995 | Takahira et al. |
| 5,383,134 A | 1/1995 | Wrzesinski |
| 5,390,206 A | 2/1995 | Rein et al. |
| 5,406,619 A | 4/1995 | Akhteruzzaman et al. |
| 5,412,192 A | 5/1995 | Hoss |
| 5,412,654 A | 5/1995 | Perkins |
| 5,412,760 A | 5/1995 | Peitz |
| 5,416,475 A | 5/1995 | Tolbert et al. |
| 5,418,812 A | 5/1995 | Reyes et al. |
| 5,420,910 A | 5/1995 | Rudokas et al. |
| 5,424,708 A | 6/1995 | Ballesty et al. |
| 5,430,729 A | 7/1995 | Rahnema |
| 5,432,507 A | 7/1995 | Mussino et al. |
| 5,438,329 A | 8/1995 | Gastouniotis et al. |
| 5,439,414 A | 8/1995 | Jacob |
| 5,440,545 A | 8/1995 | Buchholz et al. |
| 5,442,553 A | 8/1995 | Parrillo |
| 5,442,633 A | 8/1995 | Perkins et al. |
| 5,445,287 A | 8/1995 | Center et al. |
| 5,445,347 A | 8/1995 | Ng |
| 5,451,929 A | 9/1995 | Adelman et al. |
| 5,451,938 A | 9/1995 | Brennan, Jr. |
| 5,452,344 A | 9/1995 | Larson |
| 5,454,024 A | 9/1995 | Lebowitz |
| 5,455,569 A | 10/1995 | Sherman et al. |
| 5,465,401 A | 11/1995 | Thompson |
| 5,467,074 A | 11/1995 | Pedtke |
| 5,467,082 A | 11/1995 | Sanderson |
| 5,467,345 A | 11/1995 | Cutler, Jr. et al. |
| 5,468,948 A | 11/1995 | Koenck et al. |
| 5,471,201 A | 11/1995 | Cerami et al. |
| 5,473,322 A | 12/1995 | Carney |
| 5,475,689 A | 12/1995 | Kay et al. |
| 5,479,400 A | 12/1995 | Dilworth et al. |
| 5,481,259 A | 1/1996 | Bane |
| 5,481,532 A | 1/1996 | Hassan et al. |
| 5,484,997 A | 1/1996 | Haynes |
| 5,488,608 A | 1/1996 | Flammer, III |
| 5,493,273 A | 2/1996 | Smurlo et al. |
| 5,493,287 A | 2/1996 | Bane |
| 5,502,726 A | 3/1996 | Fischer |
| 5,504,746 A | 4/1996 | Meier |
| 5,506,837 A | 4/1996 | Sollner et al. |
| 5,509,073 A | 4/1996 | Monnin |
| 5,513,244 A | 4/1996 | Joao et al. |
| 5,515,419 A | 5/1996 | Sheffer |
| 5,517,188 A | 5/1996 | Carroll et al. |
| 5,522,089 A | 5/1996 | Kikinis et al. |
| 5,528,215 A | 6/1996 | Siu et al. |
| 5,528,507 A | 6/1996 | McNamara et al. |
| 5,539,825 A | 7/1996 | Akiyama et al. |
| 5,541,938 A | 7/1996 | Di Zenzo et al. |
| 5,542,100 A | 7/1996 | Hatakeyama |
| 5,544,784 A | 8/1996 | Malaspina |
| 5,548,632 A | 8/1996 | Walsh et al. |
| 5,550,358 A | 8/1996 | Tait et al. |
| 5,550,359 A | 8/1996 | Bennett |
| 5,550,535 A | 8/1996 | Park |
| 5,553,094 A | 9/1996 | Johnson et al. |
| 5,555,258 A | 9/1996 | Snelling et al. |
| 5,555,286 A | 9/1996 | Tendler |
| 5,557,320 A | 9/1996 | Krebs |
| 5,557,748 A | 9/1996 | Norris |
| 5,562,537 A | 10/1996 | Zver et al. |
| 5,565,857 A | 10/1996 | Lee |
| 5,568,535 A | 10/1996 | Sheffer et al. |
| 5,570,084 A | 10/1996 | Ritter et al. |
| 5,572,528 A | 11/1996 | Shuen |
| 5,573,181 A | 11/1996 | Ahmed |
| 5,574,111 A | 11/1996 | Brichta et al. |
| 5,583,914 A | 12/1996 | Chang et al. |
| 5,589,878 A | 12/1996 | Cortjens et al. |
| 5,590,038 A | 12/1996 | Pitroda |
| 5,592,491 A | 1/1997 | Dinkins |
| 5,596,719 A | 1/1997 | Ramakrishnan et al. |
| 5,596,722 A | 1/1997 | Rahnema |
| 5,602,843 A | 2/1997 | Gray |
| 5,604,414 A | 2/1997 | Milligan et al. |
| 5,604,869 A | 2/1997 | Mincher et al. |
| 5,606,361 A | 2/1997 | Davidsohn et al. |
| 5,608,721 A | 3/1997 | Natarajan et al. |
| 5,608,786 A | 3/1997 | Gordon |
| 5,613,620 A | 3/1997 | Center et al. |
| 5,615,227 A | 3/1997 | Schumacher, Jr. et al. |
| 5,617,084 A | 4/1997 | Sears |
| 5,623,495 A | 4/1997 | Eng et al. |
| 5,625,410 A | 4/1997 | Washino et al. |
| 5,628,050 A | 5/1997 | McGraw et al. |
| 5,629,687 A | 5/1997 | Sutton et al. |
| 5,629,875 A | 5/1997 | Adair, Jr. |
| 5,630,209 A | 5/1997 | Wizgall et al. |
| 5,631,554 A | 5/1997 | Briese et al. |
| 5,636,216 A | 6/1997 | Fox et al. |
| 5,640,002 A | 6/1997 | Ruppert et al. |
| 5,644,294 A | 7/1997 | Ness |
| 5,657,389 A | 8/1997 | Houvener |
| 5,659,300 A | 8/1997 | Dresselhuys et al. |
| 5,659,303 A | 8/1997 | Adair, Jr. |
| 5,668,876 A | 9/1997 | Falk et al. |
| 5,673,252 A | 9/1997 | Johnson et al. |
| 5,673,304 A | 9/1997 | Connor et al. |
| 5,673,305 A | 9/1997 | Ross |
| 5,682,139 A | 10/1997 | Pradeep et al. |
| 5,682,476 A | 10/1997 | Tapperson et al. |
| 5,689,229 A | 11/1997 | Chaco et al. |
| 5,696,695 A | 12/1997 | Ehlers et al. |
| 5,699,328 A | 12/1997 | Ishizaki et al. |
| 5,701,002 A | 12/1997 | Oishi et al. |
| 5,702,059 A | 12/1997 | Chu et al. |
| 5,704,046 A | 12/1997 | Hogan |
| 5,704,517 A | 1/1998 | Lancaster, Jr. |
| 5,706,976 A | 1/1998 | Purkey |
| 5,708,223 A | 1/1998 | Wyss |
| 5,708,655 A | 1/1998 | Toth et al. |
| 5,712,619 A | 1/1998 | Simkin |
| 5,712,980 A | 1/1998 | Beeler et al. |
| 5,714,931 A | 2/1998 | Petite et al. |
| 5,717,718 A | 2/1998 | Rowsell et al. |
| 5,726,534 A | 3/1998 | Seo |
| 5,726,544 A | 3/1998 | Lee |
| 5,726,644 A | 3/1998 | Jednacz et al. |
| 5,726,984 A | 3/1998 | Kubler et al. |
| 5,732,074 A | 3/1998 | Spaur et al. |
| 5,732,078 A | 3/1998 | Arango |
| 5,736,965 A | 4/1998 | Mosebrook et al. |
| 5,737,318 A | 4/1998 | Melnik |
| 5,740,232 A | 4/1998 | Pailles et al. |
| 5,740,366 A | 4/1998 | Mahany et al. |
| 5,742,509 A | 4/1998 | Goldberg et al. |
| 5,745,849 A | 4/1998 | Britton |
| 5,748,619 A | 5/1998 | Meier |
| 5,754,111 A | 5/1998 | Garcia |
| 5,754,227 A | 5/1998 | Fukuoka |
| 5,757,783 A | 5/1998 | Eng et al. |
| 5,757,788 A | 5/1998 | Tatsumi et al. |
| 5,760,742 A | 6/1998 | Branch et al. |
| 5,761,083 A | 6/1998 | Brown, Jr. et al. |
| 5,764,742 A | 6/1998 | Howard et al. |
| 5,767,791 A | 6/1998 | Stoop et al. |
| 5,771,274 A | 6/1998 | Harris |
| 5,774,052 A | 6/1998 | Hamm et al. |
| 5,781,143 A | 7/1998 | Rossin |

| Patent | Date | Inventor |
|---|---|---|
| 5,790,644 A | 8/1998 | Kikinis |
| 5,790,662 A | 8/1998 | Valerij et al. |
| 5,790,938 A | 8/1998 | Talarmo |
| 5,796,727 A | 8/1998 | Harrison et al. |
| 5,798,964 A | 8/1998 | Shimizu et al. |
| 5,801,643 A | 9/1998 | Williams et al. |
| 5,812,531 A | 9/1998 | Cheung et al. |
| 5,815,505 A | 9/1998 | Mills |
| 5,818,822 A | 10/1998 | Thomas et al. |
| 5,822,273 A | 10/1998 | Bary et al. |
| 5,822,309 A | 10/1998 | Ayanoglu et al. |
| 5,822,544 A | 10/1998 | Chaco et al. |
| 5,825,772 A | 10/1998 | Dobbins et al. |
| 5,826,195 A | 10/1998 | Westerlage et al. |
| 5,828,044 A | 10/1998 | Jun et al. |
| 5,832,057 A | 11/1998 | Furman |
| 5,838,223 A | 11/1998 | Gallant et al. |
| 5,838,237 A | 11/1998 | Revell et al. |
| 5,838,812 A | 11/1998 | Pare, Jr. et al. |
| 5,841,118 A | 11/1998 | East et al. |
| 5,841,764 A | 11/1998 | Roderique et al. |
| 5,842,976 A | 12/1998 | Williamson |
| 5,844,808 A | 12/1998 | Konsmo et al. |
| 5,845,230 A | 12/1998 | Lamberson |
| 5,848,054 A | 12/1998 | Mosebrook et al. |
| 5,852,658 A | 12/1998 | Knight et al. |
| 5,854,994 A | 12/1998 | Canada et al. |
| 5,856,974 A | 1/1999 | Gervais et al. |
| 5,862,201 A | 1/1999 | Sands |
| 5,864,772 A | 1/1999 | Alvarado et al. |
| 5,870,686 A | 2/1999 | Monson |
| 5,872,773 A | 2/1999 | Katzela et al. |
| 5,873,043 A | 2/1999 | Comer |
| 5,874,903 A | 2/1999 | Shuey et al. |
| 5,875,185 A | 2/1999 | Wang et al. |
| 5,880,677 A | 3/1999 | Lestician |
| 5,884,184 A | 3/1999 | Sheffer |
| 5,884,271 A | 3/1999 | Pitroda |
| 5,886,333 A | 3/1999 | Miyake |
| 5,889,468 A | 3/1999 | Banga |
| 5,892,690 A | 4/1999 | Boatman et al. |
| 5,892,924 A | 4/1999 | Lyon et al. |
| 5,896,097 A | 4/1999 | Cardozo |
| 5,898,369 A | 4/1999 | Godwin |
| 5,898,733 A | 4/1999 | Satyanarayana |
| 5,905,438 A | 5/1999 | Weiss et al. |
| 5,905,442 A | 5/1999 | Mosebrook et al. |
| 5,907,291 A | 5/1999 | Chen et al. |
| 5,907,491 A | 5/1999 | Canada et al. |
| 5,907,540 A | 5/1999 | Hayashi |
| 5,907,807 A | 5/1999 | Chavez, Jr. et al. |
| 5,909,429 A | 6/1999 | Satyanarayana et al. |
| 5,914,673 A | 6/1999 | Jennings et al. |
| 5,917,405 A | 6/1999 | Joao |
| 5,917,629 A | 6/1999 | Hortensius et al. |
| 5,923,269 A | 7/1999 | Shuey et al. |
| 5,926,101 A | 7/1999 | Dasgupta |
| 5,926,103 A | 7/1999 | Petite |
| 5,926,529 A | 7/1999 | Hache et al. |
| 5,926,531 A | 7/1999 | Petite |
| 5,933,073 A | 8/1999 | Shuey |
| 5,940,771 A | 8/1999 | Gollnick et al. |
| 5,941,363 A | 8/1999 | Partyka et al. |
| 5,941,955 A | 8/1999 | Wilby et al. |
| 5,948,040 A | 9/1999 | DeLorme et al. |
| 5,949,799 A | 9/1999 | Grivna et al. |
| 5,953,319 A | 9/1999 | Dutta et al. |
| 5,953,371 A | 9/1999 | Rowsell et al. |
| 5,953,507 A | 9/1999 | Cheung et al. |
| 5,957,718 A | 9/1999 | Cheng et al. |
| 5,960,074 A | 9/1999 | Clark |
| 5,963,146 A | 10/1999 | Johnson et al. |
| 5,963,452 A | 10/1999 | Etoh et al. |
| 5,966,658 A | 10/1999 | Kennedy, III et al. |
| 5,969,608 A | 10/1999 | Sojdehei et al. |
| 5,973,756 A | 10/1999 | Erlin |
| 5,974,236 A | 10/1999 | Sherman |
| 5,978,364 A | 11/1999 | Melnik |
| 5,978,578 A | 11/1999 | Azarya et al. |
| 5,987,011 A | 11/1999 | Toh |
| 5,987,421 A | 11/1999 | Chuang |
| 5,991,625 A | 11/1999 | Vanderpool |
| 5,991,639 A | 11/1999 | Rautiola et al. |
| 5,995,022 A | 11/1999 | Plis et al. |
| 5,995,592 A | 11/1999 | Shirai et al. |
| 5,995,593 A | 11/1999 | Cho |
| 5,997,170 A | 12/1999 | Brodbeck |
| 5,999,094 A | 12/1999 | Nilssen |
| 6,005,759 A | 12/1999 | Hart et al. |
| 6,005,963 A | 12/1999 | Bolle et al. |
| 6,018,659 A | 1/2000 | Ayyagari et al. |
| 6,021,664 A | 2/2000 | Granato et al. |
| 6,023,223 A | 2/2000 | Baxter, Jr. |
| 6,028,522 A | 2/2000 | Petite |
| 6,028,857 A | 2/2000 | Poor |
| 6,031,455 A | 2/2000 | Grube et al. |
| 6,032,197 A | 2/2000 | Birdwell et al. |
| 6,035,213 A | 3/2000 | Tokuda et al. |
| 6,035,266 A | 3/2000 | Williams et al. |
| 6,036,086 A | 3/2000 | Sizer, II et al. |
| 6,038,491 A | 3/2000 | McGarry et al. |
| 6,044,062 A | 3/2000 | Brownrigg et al. |
| 6,054,920 A | 4/2000 | Smith et al. |
| 6,055,561 A | 4/2000 | Feldman et al. |
| 6,060,994 A | 5/2000 | Chen |
| 6,064,318 A | 5/2000 | Kirchner et al. |
| 6,067,017 A | 5/2000 | Stewart et al. |
| 6,067,030 A | 5/2000 | Burnett et al. |
| 6,069,886 A | 5/2000 | Ayerst et al. |
| 6,073,169 A | 6/2000 | Shuey |
| 6,073,840 A | 6/2000 | Marion |
| 6,075,451 A | 6/2000 | Lebowitz et al. |
| 6,078,251 A | 6/2000 | Landt et al. |
| 6,084,867 A | 7/2000 | Meier |
| 6,094,622 A | 7/2000 | Hubbard et al. |
| 6,097,703 A | 8/2000 | Larsen et al. |
| 6,100,817 A | 8/2000 | Mason, Jr. et al. |
| 6,101,427 A | 8/2000 | Yang |
| 6,101,455 A | 8/2000 | Davis |
| 6,112,983 A | 9/2000 | D'Anniballe et al. |
| 6,115,393 A | 9/2000 | Engel et al. |
| 6,115,580 A | 9/2000 | Chuprun et al. |
| 6,119,076 A | 9/2000 | Williams et al. |
| 6,121,885 A | 9/2000 | Masone et al. |
| 6,122,759 A | 9/2000 | Ayanoglu et al. |
| 6,124,806 A | 9/2000 | Cunningham et al. |
| 6,127,917 A | 10/2000 | Tuttle |
| 6,128,551 A | 10/2000 | Davis et al. |
| 6,130,622 A | 10/2000 | Hussey et al. |
| 6,137,423 A | 10/2000 | Glorioso et al. |
| 6,140,975 A | 10/2000 | Cohen |
| 6,141,347 A | 10/2000 | Shaughnessy et al. |
| 6,150,936 A | 11/2000 | Addy |
| 6,150,955 A | 11/2000 | Tracy et al. |
| 6,157,464 A | 12/2000 | Bloomfield et al. |
| 6,157,824 A | 12/2000 | Bailey |
| 6,172,616 B1 | 1/2001 | Johnson et al. |
| 6,174,205 B1 | 1/2001 | Madsen et al. |
| 6,175,922 B1 | 1/2001 | Wang |
| 6,177,883 B1 | 1/2001 | Jennetti et al. |
| 6,181,255 B1 | 1/2001 | Crimmins et al. |
| 6,181,284 B1 | 1/2001 | Madsen et al. |

| | | | | | | |
|---|---|---|---|---|---|---|
| 6,181,981 B1 | 1/2001 | Varga et al. | 6,445,291 B2 | 9/2002 | Addy et al. |
| 6,188,354 B1 | 2/2001 | Soliman et al. | 6,456,960 B1 | 9/2002 | Williams et al. |
| 6,188,675 B1 | 2/2001 | Casper et al. | 6,457,038 B1 | 9/2002 | Defosse |
| 6,192,282 B1 | 2/2001 | Smith et al. | 6,462,644 B1 | 10/2002 | Howell et al. |
| 6,192,390 B1 | 2/2001 | Berger et al. | 6,462,672 B1 | 10/2002 | Besson |
| 6,195,018 B1 | 2/2001 | Ragle et al. | 6,477,558 B1 | 11/2002 | Irving et al. |
| 6,198,390 B1 | 3/2001 | Schlager et al. | 6,483,290 B1 | 11/2002 | Hemminger et al. |
| 6,199,068 B1 | 3/2001 | Carpenter | 6,484,939 B1 | 11/2002 | Blaeuer |
| 6,201,962 B1 | 3/2001 | Sturniolo et al. | 6,489,884 B1 | 12/2002 | Lamberson et al. |
| 6,208,247 B1 | 3/2001 | Agre et al. | 6,491,828 B1 | 12/2002 | Sivavec et al. |
| 6,208,266 B1 | 3/2001 | Lyons et al. | 6,492,910 B1 | 12/2002 | Ragle et al. |
| 6,212,175 B1 | 4/2001 | Harsch | 6,504,357 B1 | 1/2003 | Hemminger et al. |
| 6,218,953 B1 | 4/2001 | Petite | 6,504,834 B1 | 1/2003 | Fifield |
| 6,218,958 B1 | 4/2001 | Eichstaedt et al. | 6,507,794 B1 | 1/2003 | Hubbard et al. |
| 6,218,983 B1 | 4/2001 | Kerry et al. | 6,509,722 B2 | 1/2003 | Lopata |
| 6,233,327 B1 | 5/2001 | Petite | 6,513,060 B1 | 1/2003 | Nixon et al. |
| 6,234,111 B1 | 5/2001 | Ulman et al. | 6,515,586 B1 | 2/2003 | Wymore |
| 6,236,332 B1 | 5/2001 | Conkright et al. | 6,519,568 B1 | 2/2003 | Harvey et al. |
| 6,243,010 B1 | 6/2001 | Addy et al. | 6,542,076 B1 | 4/2003 | Joao |
| 6,246,677 B1 | 6/2001 | Nap | 6,542,077 B2 | 4/2003 | Joao |
| 6,246,886 B1 | 6/2001 | Oliva | 6,543,690 B2 | 4/2003 | Leydier et al. |
| 6,249,516 B1 | 6/2001 | Brownrigg et al. | 6,560,223 B1 | 5/2003 | Egan et al. |
| 6,259,369 B1 | 7/2001 | Monico | 6,574,234 B1 | 6/2003 | Myer et al. |
| 6,271,752 B1 | 8/2001 | Vaios | 6,574,603 B1 | 6/2003 | Dickson et al. |
| 6,275,707 B1 | 8/2001 | Reed et al. | 6,584,080 B1 | 6/2003 | Ganz et al. |
| 6,286,050 B1 | 9/2001 | Pullen et al. | 6,600,726 B1 | 7/2003 | Nevo et al. |
| 6,286,756 B1 | 9/2001 | Stinson et al. | 6,608,551 B1 | 8/2003 | Anderson et al. |
| 6,288,634 B1 | 9/2001 | Weiss et al. | 6,618,578 B1 | 9/2003 | Petite |
| 6,288,641 B1 | 9/2001 | Casais | 6,618,709 B1 | 9/2003 | Sneeringer |
| 6,295,291 B1 | 9/2001 | Larkins | 6,628,764 B1 | 9/2003 | Petite |
| 6,301,514 B1 | 10/2001 | Canada et al. | 6,628,965 B1 | 9/2003 | LaRosa et al. |
| 6,304,556 B1 | 10/2001 | Haas | 6,653,945 B2 | 11/2003 | Johnson et al. |
| 6,305,602 B1 | 10/2001 | Grabowski et al. | 6,665,278 B2 | 12/2003 | Grayson |
| 6,307,843 B1 | 10/2001 | Okanoue | 6,671,586 B2 | 12/2003 | Davis et al. |
| 6,308,111 B1 | 10/2001 | Koga | 6,674,403 B2 | 1/2004 | Gray et al. |
| 6,311,167 B1 | 10/2001 | Davis et al. | 6,678,255 B1 | 1/2004 | Kuriyan |
| 6,314,169 B1 | 11/2001 | Schelberg, Jr. et al. | 6,678,285 B1 | 1/2004 | Garg |
| 6,317,029 B1 | 11/2001 | Fleeter | 6,691,173 B2 | 2/2004 | Morris et al. |
| 6,329,902 B1 | 12/2001 | Lee et al. | 6,731,201 B1 | 5/2004 | Bailey et al. |
| 6,334,117 B1 | 12/2001 | Covert et al. | 6,735,630 B1 | 5/2004 | Gelvin et al. |
| 6,351,223 B1 | 2/2002 | DeWeerd et al. | 6,747,557 B1 | 6/2004 | Petite et al. |
| 6,356,205 B1 | 3/2002 | Salvo et al. | 6,771,981 B1 | 8/2004 | Zalewski et al. |
| 6,357,034 B1 | 3/2002 | Muller et al. | 6,775,258 B1 | 8/2004 | van Valkenburg et al. |
| 6,362,745 B1 | 3/2002 | Davis | 6,804,532 B1 | 10/2004 | Moon et al. |
| 6,363,057 B1 | 3/2002 | Ardalan et al. | 6,826,607 B1 | 11/2004 | Gelvin et al. |
| 6,366,217 B1 | 4/2002 | Cunningham et al. | 6,832,251 B1 | 12/2004 | Gelvin et al. |
| 6,366,622 B1 | 4/2002 | Brown et al. | 6,842,430 B1 | 1/2005 | Melnik |
| 6,369,769 B1 | 4/2002 | Nap et al. | 6,859,831 B1 | 2/2005 | Gelvin et al. |
| 6,370,489 B1 | 4/2002 | Williams et al. | 6,891,838 B1 | 5/2005 | Petite et al. |
| 6,373,399 B1 | 4/2002 | Johnson et al. | 6,900,737 B1 | 5/2005 | Ardalan et al. |
| 6,380,851 B1 | 4/2002 | Gilbert et al. | 6,914,533 B2 | 7/2005 | Petite |
| 6,384,722 B1 | 5/2002 | Williams | 6,914,893 B2 | 7/2005 | Petite |
| 6,392,692 B1 | 5/2002 | Monroe | 6,922,558 B2 | 7/2005 | Delp et al. |
| 6,393,341 B1 | 5/2002 | Lawrence et al. | 6,959,550 B2 | 11/2005 | Freeman et al. |
| 6,393,381 B1 | 5/2002 | Williams et al. | 6,970,434 B1 | 11/2005 | Mahany et al. |
| 6,393,382 B1 | 5/2002 | Williams et al. | 7,020,701 B1 | 3/2006 | Gelvin et al. |
| 6,396,839 B1 | 5/2002 | Ardalan | 7,027,416 B1 | 4/2006 | Kriz |
| 6,400,819 B1 | 6/2002 | Nakano et al. | 7,054,271 B2 | 5/2006 | Brownrigg et al. |
| 6,401,081 B1 | 6/2002 | Montgomery et al. | 7,064,679 B2 | 6/2006 | Ehrke et al. |
| 6,405,018 B1 | 6/2002 | Reudink et al. | 7,103,511 B2 | 9/2006 | Petite |
| 6,411,889 B1 | 6/2002 | Mizunuma et al. | 7,137,550 B1 | 11/2006 | Petite |
| 6,415,245 B2 | 7/2002 | Williams et al. | 7,349,682 B1 | 3/2008 | Bennett, III et al. |
| 6,421,354 B1 | 7/2002 | Godlewski | 7,468,661 B2 | 12/2008 | Petite et al. |
| 6,421,731 B1 | 7/2002 | Ciotti, Jr. et al. | 7,484,008 B1 | 1/2009 | Gelvin et al. |
| 6,422,464 B1 | 7/2002 | Terranova | 2001/0002210 A1 | 5/2001 | Petite |
| 6,424,270 B1 | 7/2002 | Ali | 2001/0003479 A1 | 6/2001 | Fujiwara |
| 6,424,931 B1 | 7/2002 | Sigmar et al. | 2001/0021646 A1 | 9/2001 | Antonucci et al. |
| 6,430,268 B1 | 8/2002 | Petite | 2001/0024163 A1 | 9/2001 | Petite |
| 6,431,439 B1 | 8/2002 | Suer et al. | 2001/0034223 A1 | 10/2001 | Rieser et al. |
| 6,437,692 B1 | 8/2002 | Petite et al. | 2001/0038343 A1 | 11/2001 | Meyer et al. |
| 6,438,575 B1 | 8/2002 | Khan et al. | 2002/0002444 A1 | 1/2002 | Williams et al. |

| | | | | | | |
|---|---|---|---|---|---|---|
| 2002/0012323 | A1 | 1/2002 | Petite et al. | JP | 2001088401 A | 4/2001 |
| 2002/0013679 | A1 | 1/2002 | Petite | JP | 2001309069 A | 11/2001 |
| 2002/0019725 | A1 | 2/2002 | Petite | JP | 2001319284 A | 11/2001 |
| 2002/0027504 | A1 | 3/2002 | Davis et al. | JP | 2001357483 A | 12/2001 |
| 2002/0031101 | A1 | 3/2002 | Petite et al. | JP | 2002007672 A | 1/2002 |
| 2002/0032746 | A1 | 3/2002 | Lazaridis | JP | 2002/2007826 | 1/2002 |
| 2002/0061031 | A1 | 5/2002 | Sugar et al. | JP | 2002085354 A | 3/2002 |
| 2002/0072348 | A1 | 6/2002 | Wheeler et al. | JP | 2002171354 A | 6/2002 |
| 2002/0089428 | A1 | 7/2002 | Walden et al. | KR | 2001025431 A | 4/2001 |
| 2002/0095399 | A1 | 7/2002 | Devine et al. | WO | WO 90/13197 | 11/1990 |
| 2002/0098858 | A1 | 7/2002 | Struhsaker | WO | WO 95/12942 | 5/1995 |
| 2002/0109607 | A1 | 8/2002 | Cumeralto et al. | WO | WO 95/24177 | 9/1995 |
| 2002/0136233 | A1 | 9/2002 | Chen et al. | WO | WO 95/34177 | 12/1995 |
| 2002/0158774 | A1 | 10/2002 | Johnson et al. | WO | WO 96/10307 | 4/1996 |
| 2002/0163442 | A1 | 11/2002 | Fischer | WO | WO 98/00056 | 1/1998 |
| 2002/0169643 | A1 | 11/2002 | Petite et al. | WO | WO 98/37528 | 8/1998 |
| 2002/0193144 | A1 | 12/2002 | Belski et al. | WO | WO 99/13426 | 3/1999 |
| 2003/0001754 | A1 | 1/2003 | Johnson et al. | WO | WO 00/23956 | 4/2000 |
| 2003/0028632 | A1 | 2/2003 | Davis | WO | WO 01/15114 | 3/2001 |
| 2003/0030926 | A1 | 2/2003 | Aguren et al. | WO | WO 01/24109 | 4/2001 |
| 2003/0034900 | A1 | 2/2003 | Han | WO | WO 02/08866 | 1/2002 |
| 2003/0036822 | A1 | 2/2003 | Davis et al. | WO | WO 02/052521 | 7/2002 |
| 2003/0046377 | A1 | 3/2003 | Daum et al. | WO | WO 03/007264 | 1/2003 |
| 2003/0058818 | A1 | 3/2003 | Wilkes et al. | WO | WO 03/021877 | 3/2003 |
| 2003/0069002 | A1 | 4/2003 | Hunter et al. | WO | WO 02/08725 | 12/2003 |
| 2003/0073406 | A1 | 4/2003 | Benjamin et al. | WO | WO 04/002014 | 12/2004 |
| 2003/0093484 | A1 | 5/2003 | Petite | | | |
| 2003/0133473 | A1 | 7/2003 | Manis et al. | | | |
| 2003/0169710 | A1 | 9/2003 | Fan et al. | | | |
| 2003/0185204 | A1 | 10/2003 | Murdock | | | |
| 2003/0210638 | A1 | 11/2003 | Yoo et al. | | | |
| 2004/0047324 | A1 | 3/2004 | Diener | | | |
| 2004/0053639 | A1 | 3/2004 | Petite et al. | | | |
| 2004/0131125 | A1 | 7/2004 | Sanderford et al. | | | |
| 2004/0183687 | A1 | 9/2004 | Petite et al. | | | |
| 2004/0228330 | A1 | 11/2004 | Kubler et al. | | | |
| 2005/0190055 | A1 | 9/2005 | Petite | | | |
| 2005/0195768 | A1 | 9/2005 | Petite | | | |
| 2005/0195775 | A1 | 9/2005 | Petite et al. | | | |
| 2005/0201397 | A1 | 9/2005 | Petite | | | |
| 2005/0243867 | A1 | 11/2005 | Petite | | | |
| 2006/0095876 | A1 | 5/2006 | Chandra et al. | | | |

FOREIGN PATENT DOCUMENTS

| | | |
|---|---|---|
| EP | 0 578 041 B1 | 1/1994 |
| EP | 0 663 746 B1 | 7/1995 |
| EP | 0718954 A1 | 6/1996 |
| EP | 0 740 873 B1 | 11/1996 |
| EP | 0 749 259 A2 | 12/1996 |
| EP | 0 749 260 A2 | 12/1996 |
| EP | 0 766 489 A2 | 4/1997 |
| EP | 0 768 777 A2 | 4/1997 |
| EP | 0 812 502 B1 | 12/1997 |
| EP | 0825577 A1 | 2/1998 |
| EP | 0 999 717 A2 | 5/2000 |
| EP | 1096454 A2 | 5/2001 |
| FR | 2817110 A1 | 5/2002 |
| GB | 2229302 A | 9/1990 |
| GB | 2247761 A | 3/1992 |
| GB | 2262683 A | 6/1993 |
| GB | 2297663 A | 8/1996 |
| GB | 2310779 A | 9/1997 |
| GB | 2326002 A | 12/1998 |
| GB | 2336272 A | 10/1999 |
| GB | 2352004 A | 1/2001 |
| GB | 2352590 A | 1/2001 |
| JP | 60261288 A | 12/1985 |
| JP | 01255100 A | 10/1989 |
| JP | 11353573 A | 12/1999 |
| JP | 2000113590 A | 4/2000 |
| JP | 2001063425 A | 3/2001 |

OTHER PUBLICATIONS

*ABB Kent–Taylor Interfacing*, Author: unknown, *Engineering Report*, No. 93–011, Jun. 18, 1996, pp. 1–9.

Abbott et al., *Wireless Product Applications for Utilities*, Electric Power Research Institute, Feb. 1996, pp. 1–137.

*Allen–Bradley Interfacing*, Author unknown, *Engineering Report*, No. 90–023, Jul. 21, 1999, pp. 1–11.

American National Standards Institute, Inc., *ANSI C12.18, 1996: Protocol Specification for ANSI Type 2 Optical Port*, national electrical Manufactures Association, 1996.

American National Standards Institute, Inc., *ANSI C12.19–1997: Utility Industry End Device Data Tables*, National Electrical manufactures Association, 1997.

Amir, *The Ricochet System Architecture*, available at http://www.lariat.org/Berkeley/node2.html, on May 1996, pp. 1–5.

*AN/TSQ–129 Position Location Reporting System(PLRS)*, Author: unknown, available at http://www.fas.org/man/dod–101/sys/land/plrs.htm on Feb. 22, 2010, pp. 1–3.

Asada et al., *Wireless Integrated Network Sensors: Low Power Systems on a Chip*, UCLA, 1998, pp. 1–16.

*Barrington Interface*, Author: unknown, *Engineering Report*, No. 90–013, Revised: Oct. 1994, p. 1.

Beech et al., *AX.25 Link Access Protocol for Amateur Packet Radio*, Version 2.2, *American Relay & Amateur Packet Radio Corporation*, Jul. 1993, Revised Jul. 1998, pp. 1–143.

Brain, *How Motes Work: Ad hoc Networks*, available at http://computer.howstuffworks.com/mote3.htm on Feb. 25, 2010, pp. 1–3.

Brain, *How Motes Work*, available at http://computer.howstuffworks.com/mote.htm, on Feb. 25, 2010, pp. 1–2.

Brain, *How Motes Work: The Basic Idea*, available at http://computer.howstuffworks.com/mote1.htm, on Feb. 25, 2010, pp. 1–2.

Brain, *How Motes Work: Typical Applications*, available at http://computer.howstuffworks.com/mote2.htm, on Feb. 25, 2010, pp. 1–2.

Brain, *How Motes Work: A Typical Mote*, available at http://computer.howstuffworks.com/mote4.htm, on Feb. 25, 2010, pp. 1–2.

*Bristol Babcock Interfacing*, Author: unknown, *Engineering Report*, No. 95–001, Revised: Apr. 17, 1996, pp. 1–4.

Bult et al., *A Distributed, Wireless MEMS Technology for Condition Based Maintenance*, Publisher: unknown; Nov. 1997, pp. 1–8.

Bult et al., *Low Power Systems for Wireless Microsensors, ILSPEAD*, 1996, pp. 1–5.

Carlisle, *Edison's NetCom Project*, Proceedings of the 33rd Annual Rural Electric Power Conference, IEEE, Apr. 1989, pp. B5/1–B5/4.

Clement, Scada System Using Packet Radios Helps to Lower Cincinnati's Telemetry Costs, *Water/ Engineering& Management*, Aug. 1996, pp. 18–20.

*Clever Solution—Metricom offers wireless data networks —includes related articles on Metricom's technology and the SONeTech company—Company Profile*, available at http://findarticles.com/p/articles/mi_moREL/is_n11_v93/ai_147 70465/?tag=content;coll, on Nov. 22, 1993 (3 pages).

Corcoran et al., *CEBus Network Access via the World–Wide–Web*, IEEE, 1996.

Deering et al., *Internet Protocol, Version 6(IPv6)Specification*, RFC 2460, The Internet Security, Dec. 1998 (40 pages).

*DSC–3500 Meeting the Control and Conservation Challenge, Johnson Controls*, 1984, pp. 1–6.

*Enhanced Position Location Reporting System(EPLRS)*, Author: unknown, available at http://www.globalsecurity.org/military/systems/ground/eplrs.htm on Feb. 22, 2010, pp. 1–3.

Holtsville et al., *Symbol Technologies, Telxon and Aironet Commit to Future Interoperability of Their Wireless Local Area Networks Based on the IEEE 802.11 Specification*, Business Wire, Jun. 24, 1996, available at http://www.thefreelibrary.com/_/print/PrintArticle.aspx?id+18414624, pp. 1–3.

Hsu et al., *Wireless Communications for Smart Dust*, Berkeley: UCLA, Jan. 30, 1998, pp. 1–20.

Humpal, *Extended Timers for Fort Riley*, Publisher: unknown; Mar. 1993.

Humpal, *Modified Download Files for Fort Riley*, Publisher: unknown; Apr. 1994.

*IIS—Contract Detail, Project Name: Fort Riley Radio Expansion*, Author: unknown, Johnson Controls, Sep. 1998.

*Industrial Communications*, Author: unknown, available at http://web.archive.org/web/19990222162354/www.metricom.com/industrial/ on May 10, 2010, pp. 1–3.

*Information Technology—Telecommunications and Information Exchange Between Systems—Local and Metropolitan Areas Networks—Specific Requirements—Part II: Wireless LAN Medium Access Control(MAC) and Physical Layer(PHY)Specifications*, Author: unknown, IEEE, Std. 802.11–1997, 1997, pp. 1–445.

Information Sciences Institute (UCLA), *Internet Protocol(IPv4), Defense Advanced Research Projects Agency*, Sep. 1981.

*ESTeem Engineering Report, Johnson Controls Interface No. 91–102*, Author: unknown, Publisher: unknown, Nov. 1994.

*ESTeem Model 96F*, Author: unknown, *ESTeem Radios*; Sep. 6, 1996 ( 2pages).

*Foxboro Interfacing*, Author: unknown, *Engineering Report*, No. 91–023, Revised: Jun. 19, 1996, pp. 1–5.

*GE Fanuc Interfacing*, Author: unknown, *Engineering Report*, No. 91–010, Revised: Apr. 11, 1996, pp. 1–8.

*General PLC/RTU Interfacing*, Author: unknown, *Engineering Report*, No. 92–010, Revised: Jun. 18, 1996, pp. 1–5.

Goldman et al., *Impact of Information and Communications Technologies on Residential Customer Energy Services*, paper, Berkeley: UCLA, Oct. 1996, pp. 1–89.

Grady et al., *Telemetry Options for Small Water Systems*, Special Report SR14–1999, Publisher: unknown, Sep. 1999, pp. 1–23.

Haartsen, Bluetooth—*The Universal Radio Interface for Ad Hoc, Wireless Connectivity*, Ericsson Review, No. 3, 1998, pp. 110–117.

*JC/83RF System: Multiple Facility Management by Radio Network*, Johnson Controls, Publication No. 2161, 1983, pp. 1–4.

*Johnson Controls Interface*, Author: unknown, *Engineering Report*, No. 91–012, Revised: Nov. 1994, pp. 1–14.

Lacoss, *Distributed Sensor Networks*, Final Report, *Lincoln Laboratory at Massachusetts Institute of Technology*, Sep. 30, 1986, pp. 1–225.

Leiner et al., *Goals and Challenges of the Darpa GloMo Program*, IEEE Personal Communications, Dec. 1996, pp. 34–43.

*M100 Series Motor Actuator*, Author: unknown, *Johnson Controls, Inc.*, Apr. 1993, pp. 1–20.

*M100C Series Actuator with Digital Control Signal Input and R81CAA–2 Interface Board*, Installation Bulletin, *Johnson Controls*, 2000, pp. 1–12.

Mak et al., *Design Considerations for Implementation of Large Scale Automatic Meter Reading Systems*, IEEE Transactions of Power Delivery, vol. 10, No. 1, Jan. 1995, pp. 97–103.

Maltz et al., *Experiences Designing and Building a Multi–Hop Wireless Ad hoc Network Testbed*, Publisher: unknown; Mar. 5, 1999, pp. 1–20.

*Man–Portable Networked Sensor System*(1997–), Author: unknown, available at http://www/spawar.navy.mil/depts/d30/d37/d371/mpnss/mpnss.html on May 20, 2010, pp. 1–4.

*March of the Motes*, Author: unknown, *New Scientist*, vol. 179, issue 2409, Aug. 23, 2003, p. 26.

*Metasys Compatible Products*, Author: unknown; *Johnson Controls, Inc.*, 1997 (9 pages).

*Metasys Extended System Architecture, vol. II*, Author: unknown, Publisher: unknown, Sep. 1999.

*Metasys N2 System Protocol Specification for Vendors*, Author: unknown, Publisher: unknown, Jun. 1996.

*Modicon Interfacing*, Author: unknown, *Engineering Report*, No. 90–022, Revised: Apr. 12, 1996, pp. 1–9.

*Moore Products—Hart Protocol Interfacing*, Author: unknown, *Engineering Report*, No. 94–007, Revised: Mar. 1, 1996, pp. 1–3.

Moorman, *Packet Radio Used in a Cost–Effective Automated Weather Meso–Net*, available at http://www.wrh.noaa.gov/wrh/96TAs/TA9631/ta96–31.html, Dec. 3, 1996 (5 pages).

Network Working Groupo, *Internet Protocol(IPv6), Internet Engineering Task Force*, 1998.

*Omron Interfacing*, Author: unknown, *Engineering Report*, No. 95–003, Revised: Apr. 17, 1996, pp. 1–4.

Ondo, *PLRS/JTIDS Hybrid*, Filled Artillery Journal, Jan.–Feb. 1981, pp. 20–25.

*Opto–22 Protocol*, Author: unknown, *Engineering Report*, No. 93–010, Revised: May 31, 1996, pp. 1–8.

*Phoenix Contact Interfacing*, Author: unknown, *Engineering Report*, No. 94–001, Revised: Jun. 20, 1996, pp. 1–7.

*PLC Direct(Koyo) Interfacing*, Author: unknown, *Engineering Report*, No. 96–001, Revised: Apr. 10, 1996, pp. 1–8.

Postel (ed.), *Internet Protocol*, RFC 791, Publisher: unknown, Sep. 1981, pp. 1–45.

Postel (ed.), *Transmission Control Protocol, Version 4*, RFC793. available at http://www.faqs.org/rfcs/rfc793.html, Sep. 1981, pp. 1–85.

Pottie et al., *Wireless Integrated Network Sensors, Communications of the ACM*, vol. 43, No. 5, May 2000, pp. 51–58.

Power/Perfect Energy Management Systems, Author: unknown, *Johnson Controls*, 1983, pp. 1–4.

Ritter et al., *The Architecture of Metricom's Microcellar Data Network™ (MCDN)and Details of its Implementation as the Second and Third Generation Ricochet™ Wide–Area Mobile Data Service, IEEE*, 2001, pp. 143–152.

Salkintzisa et al., *Design and implementation of a low–cost wireless network for remote control and monitoring applications, Elservier, Microprocessor and Microsystems*, 1997, pp. 79–88.

*Special Poll Feature*, Author: unknown, *Engineering Report*, No. 93–008, Sep. 1993, pp. 1–5.

*Square D Interfacing*, Author: unknown, *Engineering Report*, No. 88–010, Revised: Apr. 18, 1996, pp. 1–9.

*Technology Review: Metricom's Ricochet Radio Network*, Author: unknown, *Virtual Publishing*, 1996, available at http://www.hamradio–online.com/1996/jan/met ricom.html on May 4, 2010, pp. 1–3.

*Texas Instruments Interface*, Author: unknown, *Engineering Report*, No. 91–021, Revised: Nov. 1994, pp. 1–3.

The Institute of Electrical and Electronics Engineers, Inc., *IEEE Std 802.11–1997*, available at www.ieee.org on Jun. 26, 1997.

Theodorides, *Wireless Integrated Network Sensors*, Power Point Presentation, Publisher: unknown, Apr. 15, 2003, pp. 1–19.

*Toshiba Interfacing*, Author:unknown, *Engineering Report*, No. 91–011, Revised: Jun. 19, 1996, pp. 1–4.

*Transtex® Advanced Energy Management System*, Brochure, Author: unknown, *Integrated Communication System, Inc.*, 1990, pp. 1–8.

Iwata et al., *Scalable Routing Strategies for Ad Hoc Wireless Networks, IEEE Journal on Selected Areas in Communications*, vol. 17, No. 8, Aug. 1999, pp. 1369–1379.

Warrock, *School Give Report on Radio–Based FMS, Energy User News*, Nov. 7, 1983, p. 1.

*Welcome to UtiliNet: A Wireless Data Communications Solution from Metricom, Inc.*, Author: unknown, available at http://web.archive.org/web/199806028045812/www.metricom.com/industrial/utilinet.html on May 10, 2010, pp. 1–10.

*What's Behind Ricochet: A Network Overview*, Author: unknown, available at http://web.archive.org/web/2000815090824/www.ricochet.com/ricochet_advantage/tech_overview.html, Aug. 15, 2000, pp. 1–4.

1997 Project Summary, Held Untetered Nodes, University of California at Los Angeles, available at http://web.archive.org/web/199812052324758/http://www.darpa.mil/leaving.asp?url=http://www.janet.ucla.edu/glomo, Jul. 25, 2008, pp. 1–5.

1997 Project Summary, Mobile Versatile Radios (MoVeR), University of California at Los Angeles, available at http://web.archive.org/web/19990222140122/http://www.darpa.mil/leaving.asp?url=http://janet.ucla.edu/, Jul. 25, 2008, pp. 1–4.

1997 Project Summary, Towards a Wireless Overlay Internetworking Architecture, University of California at Berkeley, available at http://web.archive.org/web/19990202065939/http://www.darpa.mil/leaving.asp?url=http://daedalus.cs.berkeley.edu, Jul. 25, 2008, pp. 1–8.

Alwan et al., Adaptive Mobile Multimedia Networks, IEEE Personal Communications, Apr. 1996, pp. 34–51.

Amir et al., An Evaluation of the Metricom Ricochet Wireless Network, CS 294–7 Class Project, Department of Electrical Engineering and Computer Science of the University of California at Berkeley, Publisher: unknown, May 7, 1996, pp. 1–20.

Amir, The Ricochet System Architecture (May 7, 1996), available at http://www.lariat.org/Berkeley/node2.html, Sep. 17, 2009, pp. 1–4.

Ball et al., Reliability of Packet Switching Broadcast Radio Networks, IEEE Transactions on Circuits and Systems, vol. CAS–23, No. 12, Dec. 1976, pp. 806–813.

Brayer, Implementation and Performance of Survivable Computer Communication with Autonomous Decentralized Control, IEEE Communication Magazine, Jul. 1983, pp. 34–41.

Brownrigg et al., Development of a Packet–Switching Network for Library Automation, Proceedings of The National Online Meeting Apr. 12–14, 1983), pp. 67–74.

Brownrigg et al., Electrons, Electronic Publishing, and Electronic Display, Information Technology and Libraries (Sep. 1985), pp. 201–207.

Brownrigg et al., Implementing Library Automation Plans in a University Computing Environment, Planning for Computing in Higher Education 5, EDUCOM Series in Computing and Telecommunications in Higher Education, 1980, pp. 215–225.

Brownrigg et al., Online Catalogues: Through a Glass Darkly, information Technology and Libraries, Mar. 1983, pp. 104–115.

Brownrigg et al., Packet Radio for Library Automation, Information Technology and Libraries 3 (Sep. 1984), pp. 229–244.

Brownrigg et al., Packet Switching and Library Automation: A Management Perspective, Proceedings of the 45th ASIS Annual Meeting Oct. 17–21, 1982, vol. 19, pp. 54–57.

Brownrigg et al., Technical Services in the Age of Electronic Publishing, Library Resource & Technical Services, Jan./Mar. 1984, pp. 59–67.

Brownrigg et al., User Provided Access to the Internet, available at http://web.simmons.edu/~chen/nit/NIT'92/033–bro.htm, Jun. 9, 2005, pp. 1–6.

Brownrigg, Continuing Development of California State Radio Packet Project, Proceedings of the ASIS 1992 Mid-Year Meeting (Silver Spring, MD: American Society for Information Science, 1992) pp. 97–100.

Bruninga, A Worldwide Packet Radio Network, Signal, vol. 42, No. 10, Jun. 1988, pp. 221–230.

Bult et al. Low Power Systems for Wireless Microsensors, UCLA Electrical Engineering Department, 1996 ISLPED, pp. 1–5.

Carlisle, Edison's Netcomm Project (Sep. 1988), 1989 IEEE, pp. B5–1 to B5–4.

Chen et al., Route Optimization and Location Updates for Mobile Hosts, 1996 IEEE, Proceedings of the 16$^{th}$ ICDCS, pp. 319–326.

Cisco Systems, Inc., Enhanced Interior Gateway Routing Protocol, Cisco Systems, Inc., Updated Sep. 9, 2005, pp. 1–44.

Cisco Services, RFC1812–Requirements for IP Version 4 Routers, Fred Baker ed. (Jun. 1995), available at http://www.faqs.org/rfcs/rfc1812.html, Sep. 14, 2009, pp. 1–129.

Cleveland, Performance and Design Considerations for Mobile Mesh Networks, Milcom '96 Conference Proceedings, vol. 1 of 3, Oct. 22–24, 1996, pp. 245–249.

Cohen et al., IP Addressing and Routing in a Local Wireless Network, 1992 IEEE, 1992, pp. 626–632.

Corson et al., Architectural Considerations for Mobile Mesh Networking Milcom '96 Conference Proceedings vol. 1 of 3, Oct. 22–24, 1996, pp. 225–229.

Davies et al., The Application of Packet Switching Techniques to Combat Net Radio, Proceedings of the IEEE, vol. 75, No. 1, Jan. 1987, pp. 43–55.

Davies et al., Internetworking in the Military Environment, Proceedings of IEEE Infocom '82 (1982) pp. 19–29.

Davis et al., Knowledge–Based Management of Cellular Clone Fraud, IEEE (1992), pp. 230–234.

Diaz, Intervehicular System(IVIS): the Basis for a Tactical Information System, SAE International, Mar. 1994, pp. 1–14.

Distributions, Networks, and Networking: Options for Dissemination; Workshop on Electronic Texts, Session III, available at http://palimpsent.standford.edu/byorg/lc/etextw/sess3.html, Jul. 17, 2007, pp. 1–10, Author: unknown.

Dixon et al., Addressing, Bridging and Source Routing, IEEE Network, Jan. 1988, vol. 2, No. 1, pp. 25–32.

Eng et al., Bahama: A Broadband Ad–Hoc Wireless ATM Local–Area Network, 1995 IEEE International Conference on Communications, Jun. 18–22, 1995, pp. 1216–1223.

Estrin et al., RFC1940–Source Demand Routing: Packet Format and Forwarding Specification (Version 1), Network Working Group, May 1996, available at http://www.faqs.org/rfcs/rfc1940.html, Sep. 14, 2009, pp. 1–20.

Estin et al., Source Routing: Packet Format and Forwarding Specification (Version 1), Network Working Group, *Internet Draft*, Jan. 19, 1995, pp. 1–28.

Frank, Transmission of IP Datagrams Over Net/ROM Networks, ARRL Amateur Radio 7$^{th}$ Computer Networking Conference, Oct. 1988, pp. 65–70.

Frankel, Packet Radios Provide Link for Distributed, Survivable C3 in Post–Attack Scenarios, *MSN* (Jun. 1983), pp. 1–17.

Franz, HiperLAN—Der ETSI–Standard fur locale Funknetze, *NTZ*, Sep. 1995, 10 pages.

Fullmer, Collision Avoidance Techniques for Packet–Radio Networks, *Disseration*, University of California at Santa Cruz, Jun. 1998, pp. 1–162.

Gale et al., The Impact of Optical Media on Information Publishing, Bulletin of the American Society For Information Science, vol. 12, No. 6, Aug./Sep. 1986, pp. 12–14.

Garbee, Thoughts on the Issues of Address Resolution and Routing in Amateur Packet Radio TCP/IP Networks, ARRL Amateur Radio 6$^{th}$ Computer Networking Conference, Aug. 1987, p. 56–58.

Garcia–Luna–Aceves et al., Wireless Internet Gateways (Wings), 1997 IEEE, pp. 1271–1276.

Garcia–Luna–Aceves, A Fail–Safe Routing Algorithm for Multishop Packet–Radio Networks, IEEE Infocom '86, Technical Sessions: Apr. 8–10, 1986 pp. 434–442.

Garcia–Luna–Acheves, A Minimum–hop Routing Algorithm Based on Distributed Information, Elsevier Science Publishers, B.V. (North Holland), 1989, pp. 367–382.

Garcia–Luna–Aceves, Routing Management in Very Large Scale Networks, Elsevier Science Publishers, B.V. (North Holland), 1988, pp. 81–93.

Geier et al., Networking Routing Techniques and their Relevance to Packet Radio Networks, ARRL/CRRL Amateur Radio 6$^{th}$ Computer Networking Conference, London, Ontario, Canada, Sep. 1990, pp. 105–117.

Gerla et al., Multicluster, Mobile, Multimedia Radio Network, UCLA Computer Science Department; Baltzer Journals; Wireless Networks; Jul. 12, 1995, pp. 255–265.

Golden Power Manufacturing, 6030 PCT Programmable Communicating Thermostat, Author: unknown, 2007, pp. 1–3.

Golden Power Manufacturing, Ritetemp Universal Wireless Thermostat, Author: unknown, 2007, pp. 1–22.

Gower et al., Congestion Control Using Pacing In A Packet Radio Network, 1982 IEEE Military Communications Conference on Progress in Spread Spectrum Communications, vol. 1, Oct. 17–20, 1982, pp. 23.1–1 to 23.1–6.

Hahn et al., Packet Radio Network Routing Algorithms: A Survey, IEEE Communications Magazine, vol. 22, No. 11, Nov. 1984, pp. 41–47.

Hall, Tactical Internet System Architecture for Task Force XXI, 1996 IEEE, pp. 219–230.

Hamilton et al., Optimal Routing in Multihop Packet Radio Networks, 1990 IEEE, pp. 389–396.

Harrison, Microwave Radio In The British Telecom Access Network, Second IEE National Conference on Telecommunications, Conference Publication No. 300, Date: unknown, pp. 208–213.

Hedrick, An Introduction To IGRP, Rutgers, The State of New Jersey, Center for Computers and Information Services, Laboratory for Computer Science Research, Aug. 22, 1991 (Updated Aug. 10, 2005), pp. 1–21.

Hedrick, Routing Information Protocol (Jun. 1988), RFC 1058, available at Http://Tools.Ietf.Org/Html/Rfc1058. Jun. 24, 2009, pp. 1–34.

Hinden et al., The Darpa Internet Gateway, RFC 823, Publisher: unknown, Sep. 1982, pp. 1–43.

Hruschka et al., Packet Radio, Drahtlose Datenubertragung im Amateurfunk, *Elektor*, Jun. 1991, pp. 54–57 and 84.

Jimenez–Cedeno et al., Centeralized Packet Radio Network: A Communication Approach Suited for Data Collection in a Real–Time Flash Flood Prediction System, ACM–SAC 1993, pp. 709–713.

Johnson et al., Dynamic Source Routing in *Ad Hoc* Wireless Networks, reprinted in Mobile Computing; Tomasz Imielinski and Hank Korth eds., 1996; Kluwer Academic Publishers, pp. 153–181.

Johnson et al., Protocols for Adaptive Wireless and Mobile Networking, IEEE Personal Communications, 3(1), Feb. 1996, pp. 1–18.

Johnson et al., Route Optimization in Mobile IP, *Internet Draft* (Nov. 28, 1994), available at http:www.monarch.cs.rice.edu/internet–drafts/draft–ietf–mobileip–optim–00.txt, Sep. 26, 2009, pp. 1–29.

Johnson, Mobile Host Internetworking Using IP Loose Source Routing, Carnegie Mellon University CMU–CS–93–128, Darpa Order No. 7330, Feb. 1993, pp. 1–18.

Johnson, Routing in *Ad Hoc* Networks of Mobile Hosts, 1995 IEEE, pp. 158–163.

Johnson, Scalable and Robust Internetwork Routing for Mobile Hosts, 1994 IEEE, pp. 1–11.

Jubin et al., The Darpa Packet Radio Network Protocols, Proceedings of the IEEE, vol. 75, No. 1, Jan. 1987, pp. 21–32.

Jubin, Current Packet Radio Network Protocols, Proc. of the IEEE Infocom (Mar. 26–28, 1985), pp. 86–92.

Kaashoek et al., Flip: An Internetwork Protocol for Supporting Distributed Systems, ACM Transactions on Computer Systems, vol. 11, No. 1, Feb. 1993, pp. 73–106.

Kahn et al., Advances in Packet Radio Technology, Proceedings of the IEEE, vol. 66, No. 1978, pp. 1468–1496.

Kahn, The Organization of Computer Resources into a Packet Radio Network, IEEE Transactions on Communications, vol. COM–25, No. 1, Jan. 1977, pp. 169–178.

Kaiser et al., Low Power Wireless Integrated Microsensor (LWIM), *Program Mission, UCLA*, Jan. 1997.

Kaiser et al., Low Power Wireless Integrated Microsensors (LWIM), BAA 94–15 Proposal Abstract, UCLA Electrical Engineering Department, Rockwell Science Center, Date: unknown, 15 pages.

Kaiser et al., Low Power Wireless Integrated Microsensors (LWIM), Request for Support to Project, UCLA Electrical Engineering Department, Rockwell Science Center, Sep. 13, 1994, 71 pages.

Kaiser et al., Low Power Wireless Integrated Micorsensors (LWIM); UCLA; Rockwell Science Center; LWIM Kickoff Meeting, Aug. 8, 1995, Presented to Dr. Ken Gabriel (ARPA), Dr. Elissa Sobolewski (ARPA), and Dr. Joseph Kielman (FBI), 62 pages.

Karn et al., Packet Radio in the Amateur Service, IEEE Journal on Selected Areas in Communications, vol. SAC–3, No. 3, May 1985, pp. 431–439.

Katz et al., The Bay Area Research Wireless Access Network (Barwan) (Jun. 1996) (presentation paper), http://daedalus.cs.berkeley.edu/talks/retreat.6.97/BARWAN.597.ppt, pp. 1–66.

Katz et al., The Bay Area Research Wireless Access Network (Barwan), University of California at Berkeley, available at http://www.cs.berkeley.edu/—randy/Daedalus/BARWAN/BARWAN_index.html, 6 pages.

Kleinrock et al., Hierarchical Routing for Large Networks, Performance Evaluation, and Optimization, *Computer Networks 1* (1977), pp. 155–174.

Lauer et al., Survivable Protocols for Large Scale Packet Radio Networks, IEEE Global Telecommunications Conference, Nov. 26–29, 1984, vol. 1 of 3, pp. 468–471.

Lauer, Packet–Radio Routing, Routing in Communications Networks, Ch. 11 (1995) pp. 351–396.

Lewis et al., Packet–Switching Applique for Tactical VHF Radios, 1987 IEEE Military Communications Conference, Oct. 19–22, 1987, Conference Record vol. 2 of 3, pp. 449–455.

Lougheed et al., A Border Gateway Protocol 3 (BGP–3), RFC 1267, (Oct. 1991), available at http://tools.ietf.org/html/rfc1267, Jun. 24, 2009, pp. 1–36.

Lowe et al., Publishing Bibliographic Data on Optical Disks: A Prototypical Application and Its Implications, Third International Conference on Optical Mass Data Storage, Proceedings of SPIE, vol. 529, pp. 227–236.

Lynch et al., Application of Data Compression Techniques to a Large Bibliographic Database, Proceeding of the Seventh International Conference on Very Large Databases, Cannes, France, Sep. 9–11, 1981 (Washington, DC: IEEE Computer Society Press, 1981), pp. 435–447.

Lynch et al., Beyond the Integrated Library System Concept: Bibliographic Networking at the University of California, Proceedings of the Second National Conference on Integrated Online Library Systems Proceedings, Sep. 1984, pp. 243–252.

Lynch et al., Conservation, Preservation and Digitization, Energies for Transition: Proceedings of the Fourth National Conference of the Association of College and Research Libraries, Baltimore, MD, Apr. 9–12, 1986(Chicago, IL: Association of College and Research Libraries, 1986), pp. 225–228.

Lynch et al., Document Delivery and Packet Facsimile, Proceedings of the 48$^{th}$ ASIS Annual Meeting, vol. 22, Oct. 20–24, 1985, pp. 11–14.

Lynch et al., Electronic Publishing, Electronic Imaging, and Document Delivery, Electronic Imaging '86 (Boston, MA: Institute for Graphic Communication, Inc., 1986), pp. 662–667.

Lynch et al., Library Applications of Electronic Imaging Technology, Information Technology and Libraries, Jun. 1986, pp. 100–105.

Lynch et al., Packet Radio Networks: Architectures, Protocols, Technologies and Applications, Pergamon Press, 1ed., 1987, pp. 1–275.

Lynch et al., Public Access Bibliographic Databases in a Multicampus University Environment, Databases in Humanities and Social Science–4, Proceedings of the International Conference on Databases in the Humanities and Social Sciences, Jul. 1987, Learned Information, Inc., 1989, pp. 411–419.

Lynch et al., The Telecommunications Landscape: 1986, Library Journal, Oct. 1, 1986, pp. 40–46.

MacGregor et al., Multiple Control Stations in Packet Radio Networks, 1982 IEEE Military Communications Conference on Progress in Spread Spectrum Communications, vol. 3 (Oct. 1982) pp. 10.3–1 to 10.3–5.

Mak et al., Design Considerations for Implementation of Large Scale Automatic Meter Reading Systems, IEEE Transactions on Power Delivery, vol. 10, No. 1, Jan. 1995, pp. 97–103.

Malkin, RFC 2453, RIP Version 2 (Nov. 1998), available at http://tools.ietf.org/html/rfc2453,Jun. 24, 2009, pp. 1–40.

Maltz, Experiences Designing and Building a Multi–Hop Wireless *Ad Hoc* Network Testbed, *Paper*, Mar. 5, 1999, School of Computer Science Carnegie Mellon University, pp. 1–20.

Maltz, On–Demand Routing in Multi–Hop Wireless Mobile Ad Hoc Networks, *Thesis*, May 2001, pp. 1–192.

McQuillan et al., The ARPA Network Design Decisions, Computer Networks, vol. 1, No. 5, Aug. 1977 pp. 243–289.

McQuillan et al., The New Routing Algorithm for the ARPANET, IEEE Transactions on Communications, vol. COM–28, No. 5, May 1980, pp. 711–719.

Mills, Exterior Gateway Protocol Formal Specification (Apr. 1984), RFC 904, available at http://tools.ietf.org/html/rfc904, Jun. 24, 2009, pp. 1–32.

Moy, RFC 2328, OSPF Version 2 (Apr. 1998), available at http://tools.ietf.org/html/rfc2328, Jun. 24, 2009, pp. 1–245.

Murthy et al., An Efficient Routing Protocol for Wireless Networks, Mobile Networks and Applications 1 (1996), pp. 183–197.

Nextgen Searches, *IPCOv. The Wireless Sensor Network Industry?* Special Report on *IPCO v. Oncor et al.*, Corporate Manager's Edition, 2009, pp. 1–16.

Oran (ed.), OSI IS–IS Intra–Domain Routing Protocol, RFC 1142 (Feb. 1990), available at http://tools.ietf.org/html/rfc1142, Jun. 24, 2009, pp. 1–665.

Perkins et al., *Ad–Hoc* On–Demand Distance Vector Routing "AODV", http://moment.cs.ucsb.edu/AODU/aodv.html, Aug. 25, 2009, pp. 1–5.

Perkins et al., Continuous, transparent network access for portable users, A Mobile Networking System Based on Internet Protocol, IEEE Personal Communications, First Quarter 1994, pp. 32–41.

Perkins et al., Highly Dynamic Destination–Sequenced Distance–Vector Routing (DSDV) for Mobile Computers; SIGCOM Conference on Communications Architectures, Protocols ans Applications, London England UK (Aug. 1994); pp. 234–244.

Perkins et al., Highly Destination–Sequenced Distance–Vector Routing (DSDV) For Mobile Computers, ACM SIGCOMM Computer Communications Review archive vol. 24, Issue 4 (Oct. 1994), pp. 234–244.

Perkins et al., Mobility Support in IPv6, *Internet Draft*(Sep. 22, 1994), available at http://www.monarch.cs.rice.edu/internet–draft/draft–perkins–ipv6–mobility–sup–oo.txt, Sep. 26, 2009, pp. 1–13.

Perkins et al., RFC3561—*Ad Hoc* On–Demand Distance Vector (AODV) Routing (Jul. 2003), available at http://tools.ietf.org/html?rfc3561, Aug. 25, 2009, pp. 1–38.

Postel (Editor), Internet Protocol, Darpa Internet Program Protocol Specification, RFC 791 (Sep. 1981), Information Sciences Institute, University of So. Cal., pp. 1–45.

Postel (Editor), Internet Protocol, Darpa Internet Program Protocol Specification, RFC 791 (Sep. 1981), Information Sciences Institute, University of So. Cal., available at http://www.rfc–editor.orgrfc//rfc791.txt on Sep. 14, 2009, 51 pages, Pottie et al., Adaptive Wireless Arrays for Interactive RSTA in SUO (AWAIRS), *UCLA, Electrical Engineering Department*; Date: unknown, pp. 1–20.

Pottie et al., Adaptive Wireless Arrays Interactive Recconaissance, Surveillance, and Target Acquisition in Small Unit Operations (AWAIRS); Lower Power Wireless Integrated Microsensors (LWIM), Presented to Dr. E. Carapezza, Dr. D. Lao and Lt. Col. J. Hernazdez, *UCLA, Rockwell Science Center*; Mar. 21, 1997, pp. 1–110.

Pottie, Wireless Sensor Networks, ITW 1998, Jun. 22–26, 1998, available at http://dantzig.ee.ucla.edu/oclab/Pottie.html, 2 pages.

Radlherr, Datentransfer Ohne Draht und Telefon, *Funkschau*, Nov. 1991, pp. 49–52.

Rehkter et al., A Border Gateway Protocol 4 (BGP–4), RFC 1771, (Mar. 1995), available at http://tools.ietf.org/html.rfc1771, Jun. 24, 2009, pp. 1–58.

Rosen, Exterior Gateway Protocol (EGP), RFC 827 (Oct. 1982), available at http://tools.ietf.org/html/rfc827, Jun. 24, 2009, pp. 1–48.

Saltzer et al., Source Routing for Campus–wide Internet Transport (Sep. 15, 1980), available at http://groups.csail.mit.edu/ana/publications/pubPDFs/Sourcerouting.html, Sep. 21, 2009, pp. 1–14.

Schulman et al., SINCGARS Internet Controller—Heart of the Digitized Battlefield, Proceedings of the 1996 Tractical Communications Conference, Apr. 30–May 2, 1996, pp. 417–421.

Shacham et al., A Packet Radio Network for Library Automation; 1987 IEEE Military Communications Conference, vol. 2, at 21.3.1 (Oct. 1987); pp. 456–462.

Shacham et al., Dynamic Routing for Real–Time Data Transport in Packet Radio Networks, IEEE Proceedings of INFOCOM '82, pp. 152–159.

Shacham et al., Future Directions In Packet Radio Architectures and Protocols, Proceedings of the IEEE, vol. 75, No. 1, Jan. 1987, pp. 83–99.

Shacham et al., Future Directions in Packet Radio Technology, Proceedings of IEEE Infocom 85, Mar. 26–28, 1985, pp. 93–98.

Shacham et al., Packet Radio Networking, Telecommunications vol. 20, No. 9, Sep. 1986, pp. 42, 43, 46, 48, 64 and 82.

Shoch, Inter–Network Naming, Addressing and Routing, Internet Experiment Note #19, Notebook section 2.3.3.5, Xerox Palo Alto Research Center, Jan. 29, 1978, Publisher: unknown, pp. 1–9.

Sunshine, Addressing Problems in Multi–Network Systems (Apr. 1981), available at ftp://ftp.isi.edu/in–notes/ien/ien178.txt, Sep. 14, 2009, pp. 1–26.

Sunshine, Addressing Problems in Multi–Network Systems, Proceedings INFOCOM '82, 1982 IEEE, pp. 12–18.

Sunshine, Network Interconnection and Gateways, IEEE Journal on Selected Areas in Communications, vol. 8, No. 1, Jan. 1990, pp. 4–11.

Sunshine, Source Routing in Computer Networks, Information Sciences Department of The Rand Corporation (1977), Publisher: unknown, pp. 29–33.

Technology Review, Metricom's Ricochet Packet Radio Network, Ham Radio Online, 1996, Author: unknown, pp. 1–3.

Tobagi et al, Packet Radio and Satellite Networks, IEEE Communications Magazine, vol. 22, No. 11, Nov. 1984, pp. 24–40.

Toh, A Novel Distributed Routing Protocol to Support Ad–Hoc Mobile Computing, Conference Proceedings of the 1996 IEEE Fifteenth Annual International Phoenix Conference on Computers and Communications, Mar. 27–29, 1996, pp. 480–486.

Varadhan et al., SDRP Route Construction, Internet Draft, available at draft–ietf–sdr–route–construction–01.{ps.txt}, Feb. 27, 2005, pp. 1–12.

Westcott et al., A Distributed Routing Design for a Broadcast Environment, 1982 IEEE Military Communications Conference on Progress in Spread Spectrum Communications, vol. 3, Oct. 17–20, 1982, pp. 10.4.1–10.4.5.

Westcott et al., Hierarchical Routing for Very Large Networks, IEEE Military Communications Conference, Oct. 21–24, 1984, Conference Record vol. 2, pp. 214–218.

Westcott, Issues in Distributed Routing for Mobile Packet Radio Networks, Proceedings of Computer Networks Compcon '82, Sep. 20–23, 1982, pp. 233–238.

Wey et al., Clone Terminator: An Autentication Service for Advanced Mobile Phone System; IEEE (1995); pp. 175–179.
Wikipedia, *Ad Hoc*On–Demand Distance Vector Routing, available at http://en.wikipedia.org/wiki/Ad_Hoc_On–Demand_Distance_Vector_Routing on Aug. 25, 2009, pp. 1–3.
Wikipedia, Bellman–Ford Algorithm, available at http://en.wikipedia.org/Wiki/Bellman–Ford, Jun. 24, 2009, pp. 1–4.
Wikipedia, Border Gateway Protocol, available at http://en.wikipedia.org/wiki/Border_Gateway_Protocol, Jun. 24, 2009, pp. 1–13.
Wikipedia, Distance–Vector Routing Protocol, available at http://en.wikipedia.org/wiki/Distance–Vector_Routing_Protocol, Jun. 24, 2009, pp. 1–4.
Wikipedia, Enhanced Interior Gateway Routing Protocol, available at http://en.wikipedia.org/wiki/EIGRP, Jun. 24, 2009, pp. 1–7.
Wikipedia, Exterior Gateway Protocol, available at http://en.wikipedia.org/wiki/Exterior_Gateway_Protocol, Jun. 24, 2009, p. 1.
Wikipedia, Interior Gateway Routing Protocol, available at http://en.wikipedia.org/wiki/Interior_Gateway_Routing_Protocol, Jun. 24, 2009, pp. 1–2.
Wikipedia, IS–IS, available at http://en.wikipedia.org/wiki/IS–IS, Jun. 24, 2009, pp. 1–3.
Wikipedia, L. R. Ford, Jr., available at http://en.wikipedia.org/wiki/L._R._Ford,_Jr, Jun. 24, 2009, pp. 1.
Wikipedia, Open Shortest Path First, available at http://en.wikipedia.org/wiki/Open_Shortest_Path_First, Jun. 24, 2009, pp. 1–9.
Wikipedia, Richard E. Bellman, available at http://en.wikipedia.org/wiki/Richard_Bellman, Jun. 24, 2009, pp. 1–3.
Wikipedia, Routing Information Protocol, available at http://en.wikipedia.org/wiki/Routing_Information_Protocol, Jun. 24, 2009, pp. 1–4.
Wu, Distributed System Design; CRC Press (1999); pp. 177–180 and 204.
Zander et al., The SOFTNET Project: A Retrospect, 1988 IEEE, pp. 343–345.
3Com Invest in Coactive Networks, *Coactive*(press release), Author: unknown, Dec. 14, 1999, pp. 1–4.
5808 Photoelectric Smoke/Heat Detector with Built–in Wireless Transmitter Installation Instructions, *ADEMCO*; Author: unknown; 1998.
About AES Corporation, *AES IntelliNet*, Author: unknown, available at http://web.archive.org/web.archive.org/web/19990127093116/www.aes–intellinet.com/ae, on Mar. 5, 2009, pp. 1–2.
ADEMCO Group, 4110DL Security System, Installation Instructions, Oct. 1996, *ADEMCO Group*, Author: unknown, pp. 1–15.
ADEMCO Group, 4110XM Security System, Installation Instructions, Jul. 1996, *ADEMCO Group*, Author: unknown, pp. 1–20.
ADEMCO Group, 4120EC Security System, Installation Instructions, Nov. 1990, *ADEMCO Group*, Author: unknown, pp. 1–17.
ADEMCO Group, 4120XM Security System, Installation Instructions, Oct. 1993, *ADEMCO Group*, Author: unknown, pp. 1–80.
ADEMCO Group, 4140XMPT2 Partioned Security System with Scheduling User's Manual, May 1993, *ADEMCO Group*, Author: unknown; pp. 1–54.
ADEMCO Group, 4281, 5881 and 5882 Series RF Receivers Installation Instructions, Oct. 1996, *ADEMCO Group*, Author: unknown; pp. 1–6.
ADEMCO Group, 5330 Alpha Console, Installation Instructions, May 90, *ADEMCO Group*, Author: unknown, pp. 1–24.
ADEMCO Group, 5706 Smoke Detector with Built–in Wireless Built–in Wireless Transmitter, Installation Instructions, Dec. 1991, *ADEMCO Group*, Author: unknown, pp. 1–8.
ADEMCO Group, 5707 Smoke Detector with Built–in Wireless Transmitter, Installation Instructions, Aug. 1992, *ADEMCO Group*, Author: unknown, pp. 1–12.
ADEMCO Group, 5715 Universal Transmitter, Installation Instructions, Mar. 1989, *ADEMCO Group*, Author: unknown, pp. 1–4.
ADEMCO Group, 5775 Passive Infrared Motion Detector/Transmitter, Installation Instructions, Jul. 1991, *ADEMCO Group*; Author: unknown; pp. 1–4.
ADEMCO Group, 58008C Photoelectronic Smoke/Detector with Built–In Wireless Transmitter Installation Instructions, 1998, *ADEMCO Group*, Author: unknown; pp. 1–4.
ADEMCO Group, 5800TM Transmitter Module Installation Instructions, Apr. 1994, *ADEMCO Group*, Author: unknown; pp. 1.
ADEMCO Group, 5801 Remote Wireless Panic Transmitter Installation Instructions, Apr. 1994, *ADEMCO Group*, Author: unknown; pp. 2.
ADEMCO Group, 5802CP Belt Clip Transmitter Installation Instructions, Nov. 1994, *ADEMCO Group*, Author: unknown; pp. 1.
ADEMCO Group, 5802MN Supervised Miniature Transmitter Installation Instructions, jan. 1995, *ADEMCO Group*, Author: unknown; pp. 1.
ADEMCO Group, 5802MN2 Supervised Miniature Transmitter Installation Instructions, Jun. 1997, *ADEMCO Group*, Author: unknown; pp. 1.
ADEMCO Group, 5803 Wireless Key Transmitter Installation Instructions, Nov. 1994, *ADEMCO Group*, Author: unknown; pp. 2.
ADEMCO Group, 5804 Wireless Key Transmitter Installation Instructions, Jul. 1995, *ADEMCO Group*, Author: unknown; pp. 3.
ADEMCO Group, 5804BD Bi–Directional Wireless Key Installation Instructions, Apr. 1997, *ADEMCO Group*, Author: unknown; pp. 4.
ADEMCO Group, 5806 Smoke Detector with Built–In Wireless Transmitter Installation Instructions, May 1998, *ADEMCO Group*, Author: unknown; pp. 1–4.
ADEMCO Group, 5807 Smoke Detector with Built–In Wireless Transmitter Installation Instructions, May 1998, *ADEMCO Group*, Author: unknown; pp. 1–6.
ADEMCO Group, 5808 Photoelectronic Smoke/Heat Detector with Built–In Wireless Transmitter Installation Instructions, 1998, *ADEMCO Group*, Author: unknown; pp. 1–8.
ADEMCO Group, 5808 Wireless Smoke Detector, 1999, available at http://web.archive.org/web/20000118015507/www.ademco.com on Mar. 5, 2009, pp. 1–4.
ADEMCO Group, 5809 Rate–of–Rise Heat Detector/Transmitter installation Instructions, May 1995, *ADEMCO Group*, Author: unknown; pp. 1–2.

ADEMCO Group, 5816 Door/Window Transmitter Installation Instructions, Nov. 1994, *ADEMCO Group*, Author: unknown; pp. 1–2.

ADEMCO Group, 5816TEMP Low Temperature Transmitter Installation Instructions, May 1998, *ADEMCO Group*, Author: unknown; pp. 1–2.

ADEMCO Group, 5818 Recessed Transmitter, Installation Instructions, Jan. 1994, *ADEMCO Group*, Author: unknown; pp. 1–2.

ADEMCO Group, 5819 Shock Processor Transmitter Installation Instructions, May 1998, *ADEMCO Group*, Author: unknown; pp. 1–2.

ADEMCO Group, 5819 WHS Wireless Shock Sensor and Processor, 1997, available at http://web.archive.org/web/19990428164624/www.ademco.com/ademco on Mar. 5, 2009, pp.1–1.

ADEMCO Group, 5819WHS/5819BRS Shock Processor Transmitter Installation Instructions, May 1998, *ADEMCO Group*, Author: unknown; pp. 1–2.

ADEMCO Group, 5827 Remote Wireless Keypad/Transmitter Installation Instructions, Apr. 1994, *ADEMCO Group*, Author: unknown; pp. 1.

ADEMCO Group, 5827BD and 5827BDE Wireless Bi–Directional Keypads Installation Instructions and Operating Guide, Mar. 1996, *ADEMCO Group*, Author: unknown; pp. 1–6.

ADEMCO Group 5849 Glass Break Detector/Transmitter Installation Instructions, Oct. 1997, *ADEMCO Group*, Author: unknown; pp. 1–4.

ADEMCO Group 5850 Glass Break Detector/Transmitter Installation Instructions, May 1998, *ADEMCO Group*, Author: unknown; pp. 1–4.

ADEMCO Group, 5890 Passive Infrared Motion Detector/Transmitter Installation Instructions, May 1998, *ADEMCO Group*, Author: unknown; pp. 1–8.

ADEMCO Group, 5890 Wireless PIR Motion Detector, 1997, available at http://web.archive.org/web/19990429054256/www.ademco.com/asc/ on Mar. 5, 2009, pp. 1–3.

ADEMCO Group, 5890PI Passive Infrared Motion Detector/Transmitter Installation Instructions, Mar. 1998, *ADEMCO Group*, Author: unknown; pp. 1–4.

ADEMCO Group, 6128RF Keypad/Receiver—full wireless capability, 1997, *ADEMCO Group*, Author: unknown, available at http://web.archive.org/web/19981206111450/www.ademco.com/ademcoco on Mar. 5, 2009, pp. 1–2.

ADEMCO Group, 6128RF Keypad/Transceiver, Installation Instructions, Jul. 1998, *ADEMCO Group*, Author: unknown, pp. 1–8.

ADEMCO Group, 6128RF Keypad/Transceiver, User Guide, May 1998, *ADEMCO Group*, Author: unknown, pp. 1.

ADEMCO Group, 6128WL Keypad/Receiver, Installation Instructions, *ADEMCO Group*, Oct. 1998, Author: unknown, pp. 1–8.

ADEMCO Group, 6128WL Keypad/Receiver, User Guide, Oct. 1998, *ADEMCO Group*, Author: unknown, pp. 1.

ADEMCO Group, 7715DF MicroFAST Installation Tool, User Manual, Feb. 1998, *ADEMCO Group*, Author: unknown, pp. 1–32.

ADEMCO Group, 7720 Subscriber Radio, Installation Instructions, *ADEMCO Group*, Jan. 1992, Author: unknown, available at http://www.guardian alarms.net, pp. 1–18.

ADEMCO Group, 7720NX Network Extender, 1997, *ADEMCO Group*, Author: unknown, available at http://web.archive.org/web/199990220035932/www.ademco.com/ademco on Mar. 5, 2009, pp. 1–3.

ADEMCO Group, 7720NX Network Extender, *ADEMCO Group*, Author: unknown, 1998, pp. 1–2.

ADEMCO Group, 7720P Programming Tool, User Guide, Mar. 1992, *ADEMCO Group*, Author: unknown, available at http://www.guardianalarms.net, pp. 1–8.

ADEMCO Group, 7720Plus Subscriber Radio, Installation Instructions, Oct. 1996, *ADEMCO Group*, Author: unknown, available at http://www.guardinaalarms.net, pp. 1–100.

ADEMCO Group, 7720ULF Combination Fire Control and Long Range Radio Transmitter, 1997, *ADEMCO Group*, Author: unknown, available at http://web.archive.org/web/19990501210612/www.ademco.com/ademco on Mar. 5, 2009, pp. 1–1.

ADEMCO Groeup, 7720ULF Subscriber Radio, Installation Instructions, Mar. 1995, *ADEMCO Group*, Author: unknown, available at http://www.guardian alarm.net, pp. 1–20.

ADEMCO Group, 7720V2 Self–Contained Long Ranged Radio Transmitter, 1997, *ADEMCO Group*, Author: unknwon, available at http://web.archive.org/web/199990501212349/www.ademco.com/ademco on Mar. 5, 2009, pp. 1–4.

ADEMCO Group, 7720V2 Subscriber Installation Instructions, Jun. 1996, *ADEMCO Group*, Author: unknown, available at http://www.guardian alarms.net, pp. 1–24.

ADEMCO Group, 7810iR Internet Receiver, Installation and Setup Guide, may 2002, *ADEMCO Group*, Author: unknown, available at http:www.guardian alarms.net, pp. 1–58.

ADEMCO Group, 7820 Integrated Radio Transmitter, Installation Instructions, Aug. 1995, *ADEMCO Group*, Author: unknown, available at http://www.guardian alarms.net, pp. 1–52.

ADEMCO Group, 7825 Outdoor Antenna with Bracket, Installation instructions, Feb. 1995, *ADEMCO Group*, Author: unknown, available at http://www.guardian alarms.net, pp. 1–2.

ADEMCO Group, 7830R SafetyNet Subscriber Radio, Installation Instructions, Jun. 1996, *ADEMCO Group*, Author: unknown, available at http://www.guardian alarms.net, pp. 1–32.

ADEMCO Group, 7830R Subscriber Transmitter, 1997, available at http://web.archive.org/web/19990501215427/www.ademco.com/ademco on Mar. 5, 2009, pp. 1–3.

ADEMCO Group, 7835C Cellular Control Channel Transceiver, Installation and Setup Guide, Sep. 1998, *ADEMCO Group*, Author: unknown, available at http://www.guardian alarms.net, pp. 1–32.

ADEMCO Group, 7835C Cellular SafetyNet Subscriber Radio Transceiver, 1997, *ADEMCO Group*, Author: unknown, available at http://web.archive.org/web/19990801221202/www.ademco.com/ on Mar. 5, 2009, pp. 1–3.

ADEMCO Group, 7845C Cellular Control Channel Transceiver, Installation and Setup Guide, Sep. 1990, *ADEMCO Group*, Author: unknown, available at http://www.guardina alarm.net, pp. 1–104.

ADEMCO Group, 7845CZ Seven Zone Cellular Control Channel Transceiver, Installation and Setup Guide, Sep. 2001, *ADEMCO Group*, Author: unknown, available at http://www.guardian alarms.net, pp. 1–64.

ADEMCO Group, 7845i Internet Communications Module, Installation and Setup Guide, May 2002, *ADEMCO Group*, Author: unknown, available at http://www.guardian alarms.net, pp. 1–42.

ADEMCO Group, 7920SE 900MHz Fully Synthesized Transceiver, 1997, *ADEMCO Group*, Author: unknown, available at http:web.archive.org/web/19990501222636/www.ademco.com/ on Mar. 5, 2009, pp. pp. 1–3.

ADEMCO Group, 7920SE Transceiver, Installation Instructions, Apr. 1995, *ADEMCO Group*, Author: unknown, available at http://www.guardian alarms.net, pp. 1–80.

ADEMCO Group, ADEMCO World Leader in Home Security Products, 1997, *ADEMCO Group*, Author: unknown, available at http://web/archive.org/web/19990428164624/www.ademco.com/ademco on Mar. 5, 2009, pp. 1–2.

ADEMCO Group, AlarmNet Introduces Control Channel Cellular for Commercial Fire/Burglary Applications, *ADEMCO Group*(press release), Aug. 31, 1999, available at http://web.arquive.org/web/20000119053724/www.ademco.com/pr0831 on Mar. 31, 2009, pp. 1.

ADEMCO Group, AlarmNet, 1997, *ADEMCO Group*, Author: unknown, available at http://web.archive.org/web/19990420234130/www/ademco.com/ademco on Mar. 5, 2009, pp. 1–3.

ADEMCO Group, Alpha Vista No. 5130XT Security System, Installation Instructions, Mar. 1989, *ADEMCO Group*, Author: unknown, pp. 1–96.

ADEMCO Group, Compass, 1997, *ADEMCO Group*, Author: unknown, available at http://web.archive.org/web/19990209094401/www.ademco.com/ademco on Mar. 5, 2009, pp. 1–3.

ADEMCO Group, Control/Communicator 5110XM, Installation Instructions, Apr. 1996, *ADEMCO Group*, Author: unknown, pp. 1–76.

ADEMCO Group, Fire Alarm Control/Communicator Model 5110XM User's Manual, Apr. 1996, *ADEMCO Group*, Author: unknown; pp. 1–30.

ADEMCO Group, Fire and Burglary System Model 5120XM User's Manual, Jun. 1996, *ADEMCO Group*, Author: unknown; pp. 1–40.

ADEMCO Group, Home Page, *ADEMCO Group*, Author: unknown, available at http://web.archive.org/web/19961023204954/http://ademco.com/ on Mar. 5, 2009, pp. 1.

ADEMCO Group, LYNX—Quick Install Security System, 1997, *ADEMCO Group*, Author: unknown, available at http://web.archive.org/web/19990116225005/www.ademco.com/ademco on Mar. 5, 2009, pp. 1–3.

ADEMCO Group, Lynx Quick Star Guide, Oct. 1998, *ADEMCO Group*, Author: unknown, pp. 1–4.

ADEMCO Group, Lynx Security System Programming Form & Summary of Connections, Oct. 1998, *ADEMCO Group*, Author: unknown, pp. 1–16.

ADEMCO Group, Lynx Security System User Guide, Oct. 1998, *ADEMCO Group*, Author: unknown; pp. 1–40.

ADEMCO Group, Lynx Security System, Installation and Setup Guide, Oct. 1998, *ADEMCO Group*, Author: unknown, pp. 1–48.

ADEMCO Group, Powerline Carrier Device Modules, 1997, *ADEMCO Group*, Author: unknown, available at http://web.archive.org/web/19990218035115/www.ademco.com/ademco on Mar. 5, 2009, pp. 1–2.

ADEMCO Group, Remote Keypads 6128, 6137, 6137R, 6138, 6139,& 6139R, Installation Guide, Aug. 1998, *ADEMCO Group*, Author: unknown, pp. 1–2.

ADEMCO Group, Security System Model 4110DL Programming Form, Oct. 1996, *ADEMCO Group*, Author: unknown, pp. 1–8.

ADEMCO Group, Security System Model 4110XM Programming Form, Jul. 1996, *ADEMCO Group*, Author: unknown, pp. 1–4.

ADEMCO Group, Security System Model 4120EC Programming Form, Sep. 1993, *ADEMCO Group*, Author: unknown, pp. 1–2.

ADEMCO Group, Security System Model 4120XM Programming Form, Sep. 1992, *ADEMCO Group*, Author: unknown, pp. 1–4.

ADEMCO Group, Security System Model 4130XT/4140/5130XT Programming Form, Jul. 1989, *ADEMCO Group*, Author: unknown, pp. 1–2.

ADEMCO Group, Security System Model 4140XMP Programming Form, Jan. 1992, *ADEMCO Group*, Author: unknown, pp. 1–4.

ADEMCO Group, Security System Model 4140XMPT2 Programming Form, Apr. 1996, *ADEMCO Group*, Author: unknown; pp. 1–4.

ADEMCO Group, Security System Model 5110XM Programming Form, Apr. 1996, *ADEMCO Group*, Author: unknown, pp. 1–4.

ADEMCO Group, Security System Model 5120XM Programming Form, Jun. 1996, *ADEMCO Group*, Author: unknown, pp. 1–4.

ADEMCO Group, Security System Model 5140XM Programming Form, Jun. 1993, *ADEMCO Group*, Author: unknown, pp. 1–4.

ADEMCO Group, Security System Model Vista–10 Programing Form, Sep. 1994, *ADEMCO Group*, Author: unknown, pp. 1–4.

ADEMCO Group, Security System Model Vista–$10_{SE}$Programming Guide, Apr. 1997, *ADEMCO Group*, Author: unknown, pp. 1–24.

ADEMCO Group, Security System Model Vista–128B Commercial Burglary Partitioned Security System with Scheduling, Quick Start Guide, Jul. 1998, *ADEMCO Group*, Author: unknown, pp. 1–39.

ADEMCO Group, Security System User's Manual, Sep. 1996, *ADEMCO Group*, Author: unknown; pp. 1–88.

ADEMCO Group, The Vista–100 Series, 1997, *ADEMCO Group*, Author: unknown, available at http://web.archive.org/web/19970620010543/www.ademco.com/ademco on Mar. 5, 2009, pp. 1–7.

ADEMCO Group, The Visata–10SE, 1997, *ADEMCO Group*, Author: unknown, available at http://web.archive.org/web/1999052214402/www.ademco.com/ademco on Mar. 5, 2009, pp. 1–4.

ADEMCO Group, via16 Programming Form, Jul. 1993, *ADEMCO Group*, Author: unknown, pp. 1–2.

ADEMCO Group, Via–16 Security System, Installation Instructions, Jan. 1992, *ADEMCO Group*, Author: unknown, pp. 1–24.

ADEMCO Group, Via–30+, Vista 10, 4111XM Security System User's Manual, Jul. 1994, *ADEMCO Group*, Author: unknown, pp. 1–44.

ADEMCO Group, Via–30PSE and Vista–10 $_{SE}$Security System User's Manual, Jan. 1997, *ADEMCO Group*, Author: unknown; pp. 1–88.

ADEMCO Group, Via–30P$_{SE}$Security System, Programming Guide, Apr. 1997, *ADEMCO Group*, Author: unknown, pp. 1–24.

ADEMCO Group, Vista 4120XM and 4140MP Security System User's Manual, Jan. 1994, *ADEMCO Group*, Author: unknown; pp. 1–60.

ADEMCO Group, Vista 4130XT Security System, Installation Instructions, Oct. 1988, *ADEMCO Group*, Author: unknown, pp. 1–84.

ADEMCO Group, Vista 4140XMPT2 Partitioned Security System with Scheduling, Installation Instructions, May 1993, *ADEMCO Group*, Author: unknown, pp. 1–68.

ADEMCO Group, Vista 5140XM Commercial Fire and Burglary Alarm System, Installation Instructions, Jun. 1993, *ADEMCO Group*, Author: unknown, pp. 1–74.

ADEMCO Group, Vista AT 4140 Security System, Installation Instructions, Sep. 1988, *ADEMCO Group*, Author: unknown, pp. 1–68.

ADEMCO Group, Vista Series 4120EC Security System User's Manual, Sep. 1992, *ADEMCO Group*, Author: unknown; pp. 1–28.

ADEMCO Group, Vista Series 4130XM, 5130XM, 4140XMP Security System User's Manual, Feb. 1992, *ADEMCO Group*, Author: unknown; pp. 1–32.

ADEMCO Group, Vista Series 4140XMP, Installation Instructions, Jan. 1992, *ADEMCO Group*, Author: unknown, pp. 1–52.

ADEMCO Group, Vista Series 4140MPT/4140XMPT–UL Partitioned Security System User's Manual, Jun. 1993, *ADEMCO Group*, Author: unknown; pp. 1–32.

ADEMCO Group, Vista Series 5140XM User's Manual, Aug. 1992, *ADEMCO Group*, Author: unknown; pp. 1–28.

ADEMCO Group, Vista Series Partitioned Security Systems Model 4140MPT; Installation Instructions, Feb. 1992, *ADEMCO Group*, Author: unknown, pp. 1–60.

ADEMCO Group, Vista XM Series 4140XM, 5130XM, 4130XM, Installation Instructions, Jul. 1990, *ADEMCO Group*, Author: unknown, pp. 1–26.

ADEMCO Group, Vista XM Series, Installation Instructions, *ADEMCO Group*, Author: unknown, Oct. 1991, pp. 1–16.

ADEMCO Group, Vista–10 Security System, Installation Instructions, Sep. 1994, *ADEMCO Group*, Author: unknown, pp. 1–56.

ADEMCO Group, Vista–100 Commercial Fire & Burglary Alarm System User's Manual, Nov. 1995, *ADEMCO Group*, Author: unknown; pp. 1–66.

ADEMCO Group, Vista–100 Commercial Fire & Burglary Alarm System with Scheduling Quick Start, Apr. 1996, *ADEMCO Group*, Author: unknown; pp. 1–24.

ADEMCO Group, Vista–100 Commercial Fire and Burglary Partitioned Security System with Scheduling, Installation Instructions and Programming Guide, Jan. 1998, *ADEMCO Group*, Author: unknown, pp. 1–233.

ADEMCO Group, Vista–10$_{SE}$, Installation Instructions, May 1997, *ADEMCO Group*, Authro: unknown, pp. 1–88.

ADEMCO Group, Vista–128B Commercial Burglary Partitioned Security System with Scheduling, Installation and Setup Guide, Jul. 1998, *ADEMCO Group*, Author: unknown, pp. 1–252.

ADEMCO Group, Vista–128FB Commercial Fire and Burglary Partitioned Security System User Guide, Oct. 1998, *ADEMCO Group*, Author: unknown; pp. 1–80.

ADEMCO Group, Vista–128FB Commercial Fire and Burglary Partitioned Security System with Scheduling, Installation and Setup Guide, Oct. 1998, *ADEMCO Group*, Authro: unknown, pp. 1–220.

ADEMCO Group, Vista–20 2–Partitioned Security System, Installation Instructions, Nov. 1995, *ADEMCO Group*, Author: unknown, pp. 1–120.

ADEMCO Group, Vista–20 2–Partitioned Security System, Programming Form, Apr. 1996, *ADEMCO Group*, Author: unknown, pp. 1–8.

ADEMCO Group, Vista–20 Security System User's Manual, Apr. 1995, *ADEMCO Group*, Author: unknown; pp. 1–52.

ADEMCO Group, Vista–20HW 2–Partioned Security System, Installation Instructions, Apr. 1996, *ADEMCO Group*, Author: unknown, pp. 1–100.

ADEMCO Group, Vista–20HW 2–Partitioned Security System, Programming Form, Apr. 1996, *ADEMCO Group*, Author: unknown, pp. 1–8.

ADEMCO Group, Vista–20HW$_{SE}$2–Partitioned Security System, Installation Instructions, Aug. 1997, *ADEMCO Group*, Author: unknown, pp. 1–84.

ADEMCO Group, Vista–20HW$_{SE}$2–Partitioned System, Programming Form, Aug. 1997, *ADEMCO Group*, Author: unknown, pp. 1–8.

ADEMCO Group, Vista–20$_{SE}$2–Partitioned Security System, Installation Instructions, Aug. 1997, *ADEMCO Group*, Author: unknown, pp. 1–100.

ADEMCO Group, Vista–20$_{SE}$2–Partitioned Security System, Programming Form, Aug. 1997, *ADEMCO Group*, Author: unknown, pp. 1–8.

ADEMCO Group, Vista–20$_{SE}$/Vista–20HW$_{SE}$Security System User's Manual, Jun. 1997, *ADEMCO Group*, Author: unknown; pp. 1–52.

ADEMCO Group, Vista–30P$_{SE}$Security System, Installation Instructions, Apr. 1997, *ADEMCO Group*, Author: unknown, pp. 1–104.

ADEMCO Group, Vista–40 2–Partitioned Security System, Programming Guide, Jul. 1998, *ADEMCO Group*, Author: unknown, pp. 1–24.

ADEMCO Group, Vista–40 2–Partitioned Security System, Installation and Setup Guide, Jul. 1998, *ADEMCO Group*, Author: unknown, pp. 1–380.

ADEMCO Group, Vista–40 Programming Guide, Jun. 1997, *ADEMCO Group*, Author: unknown, available at http://www.guardianalarms.net, pp. 1–20.

ADEMCO Group, Vista–40 Security System User's Guide, Jul. 1998, *ADEMCO Group*, Author: unknown, pp. 1–60.

ADEMCO Group, Vista–50, Vista–50UL Security System, Nov. 1994, *ADEMCO Group*, Author: unknown, pp. 1–66.

ADEMCO Group, Vista–50P, Vista–50PUL Partitioned Security System with Scheduling, Installation Instructions and Programming Guide, Oct. 1997, *ADEMCO Group*, Author: unknown, pp. 1–199.

ADEMCO Group, Vista–50P, Vista–50PUL Security System User's Manual, Jul. 1995, *ADEMCO Group*, Author: unknown, pp. 1–66.

ADEMCO Group, Vista–50P, Vista–50PUL, Partitioned Security System with Scheduling, Quick Start, Aug. 1995, *ADEMCO Group*, Author: unknown, pp. 1–28.

ADEMCO Group, Vista–AT Security System User's Manual, Sep. 1988, *ADEMCO Group*, Author: unknown, pp. 1–56.

ADEMCO Group, V–Link Downloading Software User's Guide, Jun. 1994, *ADEMCO Group*, Author: unknown, available at http://guardianalarms.net, pp. 1–126.

ADEMCO Group, V–Plex Security Technology, 1997, *ADEMCO Group*, Author: unknown, available at http://web.archive.org/web/19990421110527/www.ademco.com/ademco on Mar. 5, 2009, pp. 1–6.

ADEMCO Group, Wireless Transmitters/Receivers: 5700 Wireless Transmitters, 1997, *ADEMCO Group*, Author: unknown, available at http://web.archive.org/web/199901271 20423/www.ademco.com/ademco on Mar. 5, 2009, pp. 1–2.

ADEMCO Group, Wireless Transmitters/Receivers: 5800 Wireless Transmitters, 1997, *ADEMCO Group*, Author: unknown, available at http://web.archive.org/web/1999021818 1254/www.ademco.com/ademco on Mar. 5, 2009, pp. 1–2.

ADEMCO Group, Wireless User Interface Devices, 1997, *ADEMCO Group*, Author: unknown, available at http://web.archive.org/web/19990421190353/www.ademco.com/ademco on Mar. 5, 2009, pp. 1–4.

AES•7700 Central Station, Installation & Operation Manual, Document 40–0551u, *ADEMCO Group*, Author: unknown, Dec. 1996, pp. 1–40.

AES•*Intelli*Guard 7470, *AES IntelliNet*, Author: unknown, Nov. 2003, pp. 1–15.

AES•*IntelliNet*Theory of Operation, *AES IntelliNet*; Author: unknown, Dec. 1996, downloaded from http://www.guardianalarms.net, pp. 1–18.

AES•*Intelli*Net Wireless Network Glossary of Terms, document 40–0551u, *AES IntelliNet*, Authro: unknown, Dec. 96, pp. 1–15.

AES 7000 Smart Central Station InstaCentral Station Installation & Operation Manual, Document No. 40–0551e, *AES Intellinet*, Author: unknown; Nov. 20, 1996, pp. 1–57.

AES 7067 IntelliTap–II Digital Dialer Interface: A Supplemental Alarm Supporting Device, *AES IntellNet*, Author: unknown; Aug. 5, 2004, pp. 1–4.

AES 7099 Central Station Installation & Operation Manual, Document No. 40–0050, *AES Intellinet*, Author: unknown; pp. 1–20.

AES 7450 RF Subscriber Unit Installation Manual, *AES IntelliNet*, Author: unknown; Jun. 21, 2000, pp. 1–8.

AES 7750–F RF SMART Subscriber Unit Version 2, Including 7750–F–4x4 and 7750–F–8, Installation & Operation Manual, *AES IntelliNet*, Author: unknown, Apr. 2001 (Updated Nov. 2003), pp. 1–60.

AES 7750–F RF SMART Subscriber Unit Version 2, Installation & Operation Manual, *AES INtelliNet*, Author: unknown, Aug. 2000, pp. 1–30.

AES Central Alarm Monitoring, Author: unknown, available at http://web.archive.org/web/19990225163745/www.aes–intellinet.com/ae, on Mar. 5, 2009, pp. 1–3.

AES *Intelli*Net Model 7440 & 7440–XL RF Subscriber Unit, *Addendum*, *AES Intellinet*, Author: unknown, Aug. 29, 2002, pp. 1.

AES *Intelli*Net 7450 *Addendum*, *AES Corporation*, Author: unknown, Jul. 9, 2002, pp. 1–2.

AES *Intelli*Net Dealer's List By State, Author: unknown, available at http://web.archive.org/web/20010216234026/www.aes–intellinet.com/list on Mar. 5, 2009, pp. 1–13.

AES *IntelliNet*Model 7003 Central Station, Installation & Operation Manual, *AES IntelliNet, Author: unknown, Jan. 9, 2001*, available at www.guardianalarms.net, pp. 1–25.

AES *Intelli*Net Model 7050, 7750, Subscriber Unit, Version 1.62, Installation & Operation Manual, *AES IntelliNet, Author: unknown, Dec. 1996*, available at www.guardianalarms.net, pp. 1–110.

AES *IntelliNet*Model 7050–E & 7750–E, RF Subscriber Unit, Version 1.71, Installation & Operation Manual, *AES IntelliNet, Author: unknown, Feb. 24, 1997*, available at www.guardianalarms.net, pp. 1–54.

AES *Intelli*Net Model 7050–E Radio Subscriber Unit Installation Manual, *AES IntelliNet, Author: unknown, Jul. 17, 2000*, available at www.guardianalarms.net, pp. 1–4.

AES *Intelli*Net Net 77 Version 1.48.30, Installation & Operation Manual, Document 40–0551u, *AES Corporation*, Author: unknown, Jun. 1999, pp. 1–30.

AES *Intelli*Net Net 77 Version 1.48.4, Installation & Operation Manual, Document 40.0551u, *AES Corporation*, Author: unknown, Nov. 2000, pp. 1–36.

AES *Intelli*Net Net7K Version 1.48.4, Installation & Operation Manual, Document 40–0551, *AES Corporation*, Nov. 2000, pp. 1–36.

AES *Intelli*Net Net7K Version 3, Installation & Operation Manual, Document 40–0551, *AES Corporation*, Jun. 1999, pp. 1–30.

AES *Intelli*Net Radio Communication Subscriber Unit 7050, Sep. 16, 1997, available at http://web.archive.org/web/19990203061203/www.ase–intellinet.com/sp on Mar. 5, 2009, pp. 1–2.

AES *Intelli*Notes Universal Serial Data Interface/ USDI, Bulletin No. 55, *AES Corporation*, Author: unknown, Apr. 5, 2001, pp. 1–12.

AES *IntelliTAP*Model 7068, Version 1.08, Installation Guide, *AES IntelliNet*, Author: unknown, Jun. 15, 2000, pp. 1–11.

AES *Intelli*TRAK 7555–RT GPS Based Vehicle Tracking Unit, Version 2.12, *AES IntelliNet, Author: unknown, Nov. 6, 2002, pp. 1–16*.

AES *IntelliTRAk*7555–RT GPS Based Vehicle Tracking Unit, Version 2.0a, *AES IntelliNet, Author: unknown, Feb. 20, 2001*, pp. 1–16.

AES Net7000, Installation & Operation Manual, *AES IntellNet*, Author: unknown, Nov. 24, 1996, pp. 1–76.

AES Net77 Wireless Network Management Software Installation & Operation ManuCentral Station Manual, Section 3, *AES Intellinet*; Author: unknown, Dec. 1996, pp. 1–87.

AES UL/ULC System Configuration, *AES Corporation*, Author: unknown, May 1, 2003, p. 1.

Agre et al., Autoconfigurable Distributed Control Systems, *ISADS*, Apr. 25–27, 1995, pp. 162–168.

AlarmLink, Inc., *A Brief History*, available at http://www.alarmlink.com/default.aspx?tabid=28, on Mar. 23, 2009, pp. 1.

AlarmLink, Inc., *Alarm Over IP Products*, available at http://www.alarmlink.com/Default.aspx?tabid=38, on Mar. 24, 2009, pp. 1.

AlarmLink, Inc., *Central Stations*, available at http://www.alarmlink.com/Default.aspx?tabid=35, on Mar. 24, 2009, pp. 1–3.

AlarmLink, Inc., *Home Page*, available at http://www.alarmlink.com/, on Mar. 24, 2009, pp. 1–2.

AlarmLink, Inc., *MeshWorks of Los Angeles*, available at http://www.alarmlink.com/Default.aspx?tabis=39, on Mar. 24, 2009, pp. 1.

Asada et al., Low Power Wireless Communication and Signal Processing Circuits for Distributed Microsensors; Proceedings of the Internationasl Circuits and Systems Symposium, ISCAS '97; *UCLA Rockwell Science Center*; Jun. 1997, pp. 1–5.

Asada, Wireless Integrated Network Sensors (WINS), *UCLA*, *SPIE*vol. 3673, Mar. 1999, pp. 11–18.

Atlanta Building News, The Voice of the Greater Altanta Home Builders Association, vol. 7, No. 5, May 2006, pp. 1–60.

Baker et al., The Architectural Organization of a Mobile Radio Network via a Distributed Algorithm, *IEEEE*; Nov. 1981, pp. 1694–1701.

Bhatnagear et al., Layer netNet: A New Self–Organizing Network Protocol, *Dept. of Electrical Engineering, SUNY*; 1990, pp. 1–5.

Black, Lutron RF Technology, Reliable, First, Forward Thinking, *Lutron Electronics Co. Inc.*, Aug. 2006, pp. 1–16.

Blaney, HomeRF™ Working Group 4$^{th}$Liaison Report, *IEEE*, 802.11–98/360, Nov. 1998, Slides 1–12.

Brownrigg et al., Packet Radio Networks; Architectures, Protocols, Technologies and Applications (1987), (introduction pp. ix–xviii); pp. 3–274.

Brownrigg, The Organization of Computer Resources into a Packet Radio Network, *IEEE*, Jan. 1977, vol. Com–25 No. 1, pp. 169–178.

Bult et al., A Distributed, Wireless MEMS Technology for Condition Based mMaintenance, *EED, Defense Technical Information Center, UCLA, Electrical Engineering Department, Rockwell Science Center*; Apr. 22–26, 1996.

Bult et al., Low Power Systems for Wireless Microsensors, EED, *UCLA*; *ILSPED*; 1996, pp. 1–15.

Bult et al., Low Power Wireless Integrated Microsensors (LWIM), *EED, UCLA; ARPA–LPE PI Meeting*, Apr. 27–28, 1995, pp. 1–30.

Bult et al., Wireless Integrated Microsensors, *EED, UCLA Electrical Engineering Department, Rockwell Science Center, TRF*; Jun. 6, 1996, pp. 205–210.

CADDX Controls, Inc., NetworX CADDX NetworX NX–8 Control/Communicator Installation Manual, *Caddx Controls*; Author: unknown; 1996Jul. 15, 1999, pp. 1–116.

Caddx Installation Instructions Package, document No. 466–1786, *CADDX Installation Controls, Inc., Caddx Controls*; Author: unknown; Aug.Aug. 1998, pp. 1–58, CADDX–CADDI Controls, Inc., Ranger 9000E, *User's Manual*, downloaded from http://www.guardian alarms.net, May 17, 1996, pp. 1–9.

Case Study: Genentech Uses Coactive's Technology to Centralize Monitor and Control Functions in a Mixed Legacy and New Equipment Environment, Coactive, Author: unknown, 1998, pp. 1–4.

Case Study: Ingham Regional Medical Center Uses Coactive Technology to Monitor and Control Critical Power Generations in a Multi–Campus Environment, *Coactive*, 1998, pp. 1–4.

Circon Systems Partners with Coactive Networks to Deliver Ciron WebControl™, *Coactive*(press release), Author: unknown; Feb. 7, 2000, pp. 1–4.

CIRCON Technology Connects Building Management Systems to the Internet Using Coactive Routers, *Coactive*, (press release); Author: unknown; May 20, 1997.

CIRCON Technology Connects Building Management Systems to the Internet Using Coactive Routers, *Coactive*, (press release), Author: unknown, May 20, 1997, pp. 3.

CISCO's John Chambers Discusses the Internet Consumer Revolution at CES Using Demo Based on Echelon's LonWorks Technology, *Home Toys*(press release); Author: unknown; Jan. 8, 1999, available at http://hometoys.com/htinews/dec98/releases/echelon04.htm on Apr. 22, 2009, pp. 1–6.

Coactive Bridges Gap between Control Systems and Corporate Data Networks with New Off–the–Shelf Router Family, *Coactive*(press release); Author: unknown; Jun. 8, 1998.

Coactive Enhances Residential Getaway to Enable Multiple Home Networks, *Coactive*(press release), Author: unknown, Jan. 6, 2000, pp. 1–4.

Coactive Joins 3Com to Demonstrate Convergence of Control and Enterprise Networks at Retail Systems '98, *Coactive*(press release), Author: unknown, Jun. 16, 1998, pp. 1–4.

Coactive Launches First Architecture to Support the Convergence Between Control and IP Networks, *Coactive*(press release), Author: unknown, May 20, 1998, pp. 1–4.

Coactive Leads Standardization Effort for LonTalk Routers, *Coactive*(press release); Author: unknown; May 20, 1997.

Coactive Leads Standardization Effort for LonTalk/IP Routers, *Coactive*(press release), Author: unknown, May 20, 1997, pp. 3.

Coactive Networks and Diverse Networks Team to Deliver End–to–End Infrastructure for Enabling the Digital Home, *Coactive*(press release), Author: unknown, Aug. 28, 2000, pp. 1–4.

Coactive Networks and Innovex Technologies Deliver Internet Access to Home Security, Lighting and Climate Control, *Coactive*(press release), Author: unknown, Feb. 29, 2000, pp. 1–4.

Coactive Networks and Silicon Energy Partner to Deliver and End–to–End Solution for Internet–Based Energy Monitoring and Analysis, *Coactive*(press release), Author: unknown, Sep. 19, 2000, pp. 1–4.

Coactive Networks and Vicinium Systems Team to Deliver a Complete Television–Based Interface to Digital Homes and Neighborhoods, *Coactive*(press release), Author: unknown, Jun. 19, 2000, pp. 1–4.

Coactive Networks Announces First Shipments of Internet Gateway to Home Control Systems, *Coactive*(press release), Author: unknown, May 3, 1999, pp. 1–4.

Coactive Networks Announces Formation of Technical Advisory Board, *Coactive*(press release), Author: unknown, Oct. 5, 1998, pp. 1–4.

Coactive Networks Announces System Provider Partner Program, *Coactive*(press release), Author: unknown, Jan. 25, 1999, pp. 1–4.

Coactive Networks Bridges Gap between Control Systems and Corporate Data Networks with New Off–the–Shelf Router Family, *Coactive*(press release), Author: unknown, Jun. 8, 1998, pp. 1–6.

Coactive Networks Expands Support for Management and HMI Applications, *Coactive*(press release), Author: unknown, Nov. 2, 1998, pp. 1–4.

Coactive Networks Introduces Multi–Service Home Control Network Access to U.S. Market, *Coactive*(press release), Author: unknown, Feb. 16, 1999, pp. 1–4.

Coactive Networks Names Gus Ezcurra Vice President of Sales, *Coactive*(press release), Author: unknown, Jul. 20, 1998, pp. 2.

Coactive Networks names Janice Roberts, 3Com Senior VP, to Board of Directors, *Coactive*(press release), Author: unknown, Jun. 2, 1998, pp. 2.

Coactive Networks Powers Innovative Energy Management Solutions, *Coactive*(press release), Author: unknown, Jan. 5, 2001, pp. 1–4.

Coactive Networks President Named to LonMark Board of Directors;, *Coactive*(press release), *(coactive*(press release); Author: unknown; Jun. 14, 1998, pp. 1–3.

Coactive Networks Shatters Price Barriers with IP Gateway to Home Control Systems, *Coactive*(press release), Author: unknown,Oct. 26, 1998, pp. 1–4.

Coactive Networks to Supply Internet–Based Home Gateways for up to 400,000 Customers; First Phase of Deliveries Valued at US$22 Million, *Coactive*(press release), Author: unknown, Oct. 25, 1999, pp. 1–8.

Coactive Networks Unveils the First Full–Service Residential Gateway, *Coactive*(press release), Author: unknown, May 3, 2000, pp. 1–4.

Coactive Networks, Inc., A New Solution for Offering Multiple Telemetry Services to the Home, *Coactive*, 1999, pp. 1–8.

Coactive Networks, Inc., Coactive Connector® 1000 Series, *Coactive*, 2000, pp. 1–4.

Coactive Networks, Inc., Corporate Backgrounder, *Coactive*2001, pp. 1–6.

Coactive Networks, Inc., Corporate Fact Sheet, *Coactive*, 2001, pp. 2.

Coactive Networks, Inc., Router–LE: Remote Access to Lon Works Over Ethernet, *Coactive*, 1998, pp. 1–4.

Coactive Networks, Inc., Router–LL: Connect LonWOrks Networks Across Internet Protocol, *Coactive*, 1998, pp. 1–4.

Coactive Receives $2 Million in Funding, *Coactive*(press release), *Coactive*(press release); Author: unknown; Oct. 15, 1997, pp. 3.

Coactive Receives First Round of Venture Funding Investors Embrace Control Network Connectivity Technology, *Coactive*(press release), Author: unknown, Dec. 1, 1997, p. 2.

Corcoran et al., Browser–Style Interfaces to a Home Automation Network, *IEEE Transactions on Consumer Electronics*, vol. 43, No. 4, Nov. 1997, pp. 1063–1069.

Corcoran et al., CEBus Network Access via the World–Wide–Web, available at http://ieeexplore.ieee.org/xpl/freeabs_all.jsp?arnumber=517285, on Mar. 29, 2009, *Paper*published on *Consumer Electronics*, 1996, Digest of Technical Papers, pp. 236.

Corson et al., Internet–Based Mobile *Ad Hoc*Networking, *IEEE Internet Computing*, Jul.–Aug. 1999, pp. 63–70.

Custom Solutions, Inc., Acessories available at http://web.archive.org/web/19981206221844/www.csi3.com/hv_p4.htm on Feb. 27, 2009, pp. 1–3.

Custom Solutions, Inc., HomAtion 2000 for HomeVision, *Press Release*, available at http://web.archive.org/web/19981207075734/www.csi3.com/HV_PR_0 on Feb. 27, 2009, pp. 1–2.

Custom Solutions, Inc., HomeVision 2.7 "How To" Information, Date: unknown; pp. 1–146.

Custom Solutions, Inc., Home Vision 2.7, Date: unknown; pp. 1–42.

Custom Solutions, Inc., HomeVision Description, available at http://web.archive.org/web/19981206004955/http://www.csi3.com/HV.htm on Mar. 2, 2009, pp. 1–14.

Custom Solutions, Inc., HomeVision–PC Description, available at http://web.archive.org/web/19981205094024/http://www.csi3.com/hv_pc.htm on Mar. 2, 2009, pp. 1–6.

Custom Solutions, Inc., HomeVision–PC Software., available at http://web.archive.org/web/19990224053817/http://www.csi3.com/hv_p3ps.htm on Feb. 27, 2009, pp. 1–2.

Custom Solutions, Inc., HomVision–PC Version 2.62, *Owner's Manual*(1997) pp. 1–234.

Custom Solutions, Inc., Media Information, Feb. 16, 1999, available at http://web.archive.com/web/19990502073249/www.csi3.com/hv_media.htm on Feb. 27, 2009, pp. 1.

Custom Solutions, Inc., Using Enerzone StatNet Thermostats with HomeVision (1998) pp. 1–16.

DTE Energy Technologies Selects Coactive Networks Internet Getaways to Roll Out New Class of E–Services to Businesses, *Coactive*(press release), Author: unknown, May 3, 2000, pp. 1–4.

DTE Energy Technologies Selects Coactive Networks to Power Distributed Generation Solutions Worldwide, *Coactive*(press release), Author: unknown, Aug. 1, 2001, pp. 1–4.

Echelon Corporation Demonstrates Internet Connectivity in Digital Home Applications at 1999 International Consumer Electronics Show, *Home Toys*(press release); Author: unknown; Dec. 15, 1998, available at http://hometoys.com/htinews/dec98/releases/echelon03.htm on Apr. 22, 2009, pp. 1–4.

Eight Leading Controls Companies Join Coactive Partner Program, *Coactive*(press release), Author: unknown, Aug. 21, 2000, pp. 1–4.

Elson et al., Fine–Grained Nnetwork Time Synchronization Using Reference Broadcasts; *UCLA Computer Science Department*; May 17, 2002, pp. 1–14.

Ephremides et al., A Design Concept for Reliable Mobile Radio Networks with a Frequency Hopping Signaling, *IEEE*; 1987, pp. 56–73.

Estrin et al., Next Century Challenges: Scalable Coordination in Sensor Networks, *ACM*, 1999, pp. 263–270.

Frankel, Packet Radios Provide Link for Distributed Survivable Command Control Communications in Post–Attack Scenarios, Microwave System News, Jun. 1983, Circle Reader Service No. 77, pp. 80–108.

GE Security, NetworX NX–4, 2004, pp. 1–2.

GE Security, NetworX NX–548E, 2006, pp. 1–2.

Gerla et al., Multicluster, mobile, multimedia radio network, *CSD, UCLA; Baltzer Journals*; Jul. 12, 1995, pp. 1–26.

Guardian Alarms, Inc., Home Security System—Model 7068 Digital Dialer Interface, Author: unknown, available at www.guardianalarms.net, 2007, pp. 1.

Guardian Alarms, Inc., Security Company—Home Alarm System Monitoring—AES 7067 IntelliTap–II Digital Dialer Interface, Author: unknown, available at www.guardianalarms.net, 2007, pp. 1.

Guardian Alarms, Inc., Security System—Alarm System Monitoring—7160 EZ Router, Author: unknown, available at www.guardianalarms.net, 2007, pp. 1.

Guardian Alarms, Inc., Security System—Alarm System Monitoring—NET 7000, Author: unknown, available at http://guardianalarms.net 2007, pp. 1.

Guardian Alarms, Inc., Security System—Alarm System Monitoring—Radionics FDX, Author: unknown, available at www.guardianalarms.net, 2007, pp. 1.

HAI Omni, Features & Specifications, *Home Automation, Inc.*, available at http://web.archive.org/web/19970216055832/www.homeauto.com/omni on Feb. 17, 2009, pp. 1–6.

Home Automation, Inc., *Home Page*, HAI Omni: Features & Specifications, *Home Automation, Inc.*available at http://web.arquive.org/web/19961219004403/http://www.homeauto.com (archived web page) on Feb. 17, 2009; Author: unknown; pp. 1.

Home Toys, Inc., HTINews Review, available at http://www.hometoys.com/htinews/aug97/reviews/homevis/homvisl.htm on Mar. 2, 2009, pp. 1–26.

Honeywell, Inc., Honeywell Home Control Version 2.0 Demonstration, available at http://web.arquive.org/web/19980630195929/www.hbc.honeywell.com/ on Mar. 5, 2009, ( 7 pages).

Hong et al., U.S. Lighting Market Characterization, vol. II: Energy Efficient Lighting Technology Options, Sep. 30, 2005, *Report*prepared for Building Technologies Program, Office of Energy Efficiency and Renewable Energy, pp. 1–36.

Hotel Technology Next Generation, *A Guide for Understanding Wireless in Hosptlality, An HTNG White Paper*, Jun. 2006, (Jayne O'Neill, ed.), pp. 1–77.

How Does the New Power Company Deliver on the Promise of Energy Reconstructing?, *NewPower*(press release), Author: unknown, May 31, 2001, pp. 1–6.

Important Dealer Notification—Honneywell AlarmNet–M Network Alert, Source: unknown; Author: unknown; Apr. 2007, pp. 1.

IOConnect Architecture®, *Coactive*, 2001, pp. 1–4.

Jacobsen, The Building Blocks of a Smart Sensor for Distributed Control Networks, *IEEE Technical Applications Conference Northcon*, Nov. 4–6, 1998, pp. 285–290.

JDS Technologies, Stargate Interactive Automation System, 1998, pp. 1–2.

JDS Technologies, Stargate, *Operation Manual*, Mar. 2000, pp. 1–114.

JDS Technologies, *Support: Protocol Specifications*, available at http://jdstechnologies.com/protocol.htm, on Feb. 16, 2009, pp. 1–32.

JDS Technologies, TimeCommander, TimeCommander Plus, *User Guide*, Jun. 1998, pp. 1–95.

JDS Technologies, Web Xpander, Installation and Operation Manual, Feb. 2004, pp. 1–34.

Johnson Controls, Inc., LonWorks®Digital Controller, 1998, pp. 1–12.

Keltron's Home Page with Frames, *Index*, available at httm://web.archive.org/web/19990831161957//http://www.keltroncorp.com, on Mar. 24, 2009, pp. 1.

Kemp, Home Automation Application Guide, Applications for Home Automation in Any Home, vol. 1, 2000, pp. 1–106.

Khan et al., Advances in Packet Radio Technology, IEEE Nov. 1978, vol. 66, No. 11, pp. 1468–1496.

Khan, Robert E., Issues in Distributed Routing for Mobile Packet Radio Network, IEEE 1982, pp. 233–238.

Kohno et al., An Adaptive Sensor Network System for Complex Environments, in Intelligent Autonomous Systems (Kakazu et al., eds.), *IOS Press*, 1998, pp. 21–28.

Lee et al., Distributed Measurement and Control Based on the IEEE 1451 Smart Transducer Interface Standards, Proceedings of the 16[th]IEEE Instrumentation and Measurement Technology Conference, vol. 1, May 24–26, 1999, *IEEE*, pp. 608–613.

Leviton Manufacturing Co., Inc., *The DECORA©Collection of Designer Devices*, 2006, pp. 1–85.

Lin et al., CMOS Front End Components for Micropower RF Wireless Systems; EED, *UCLA Electrical Engineering Department*; 1998, pp. 1–5.

Linear Corporation, Supervised Digital Security Transmitters TX–91, TX–92, TX–94, *Operation Instructions*, 1993, pp. 1.

Linear Corporation, Supervised Digital Security Transmitter T–90, *Installation Instructions*, 2006, pp. 1–2.

Linear Corporation, Supervised Wireless Receiver and Zone Expander SRX–64A, *Installation Instructions*, 2003, pp. 1–2.

Local and Metropolitan Area Networks: Wireless Medium Access Control (MAC) and Physical (PHY) Specifications, Annex A: Protocol Implementation Conformance Statement (PICS) Proforma, Author: unknown; IEEE, Nov. 1997, pp. 1–75.

Local and Metropolitan Area Networks: Wireless Medium Access Control (MAC) and Physical (PHY) Specifications, Author: unknown; IEEE, Nov. 1997, pp. 1–98.

Pottie, Awairs Mini–Site Review [Presentation], *Rockwell Science Center*; Feb. 23, 1998, pp. 1–58.

LonTalk Protocol, LonWorks® Engineering Bulletin, *Echelon Corp.*; Author: unknown; Apr. 1993, pp. 1–27.

LonWork® Products, 1998, *Version A, Echelon Corp.*, pp. 1–21.

LonWorks® Router User's Guide, *Echelon Corp.*; Author: unknown; 1995, pp. 1–136.

LonWorks® SMX™ Transceiver, datasheet, *Echelon Corp.*; Author: unknown; 1997, pp. 1–18.

Lutron Electronics Co. Inc., *Homeowner's Guide for the RadioRA® Quick Start Package*, 2004, pp. 1–8.

Lutron Electronics Co. Inc., *How to retrofit RadioRA® Wall–Mounted Master Control into an existing home*, Application #41, 2004, pp. 1–2.

Lutron Electronics Co. Inc., IR/RS232 *Interface for Bang & Olufsen ® Beo4® Remote Control and RadioRA®*, Application Note #119, 2004, pp. 1–3.

Lutron Electronics Co. Inc., *Level Capture with a RadioRA® Master Control*, Application Note#73, 2003, pp. 1–3.

Lutron Electronics Co. Inc., *Modem Installation for HomeWorks®*, Application Note#9, 1998, pp. 1–4.

Lutron Electronics Co. Inc., *RadioRA® RA–IR–KIT Installation Instructions*, Application Note#61, 2000, pp. 1–4.

Lutron Electronics Co. Inc., *RadioRA® RF Signal Repeater*, 1998, pp. 1–2.

Lutron Electronics Co. Inc., *RadioRA® Single–Location Switch, Controls for Permanently Installed Lighting Loads*, 1998, pp. 1–2.

Lutron Electronics Co. Inc., *RadioRA® Table Lamp Controls, Dimming and Switching Controls for Table and Floor Lamps*, 1999, pp. 1–2.

Lutron Electronics Co. Inc., *Using a Photocell with the RadioRA® System*, Application Note#45, 1998, pp. 1–4.

Lutron Electronics Co. Inc., *Using an Astronomic Timeclock with the RadioRA® System*, Application Note#42, 1998, pp. 1–2.

Lutron Electronics Co. Inc., *Using the RadioRA® System to Activate Scenes 5–16 on a GRAFIK Eye® Control Unit*, Application Note #48, 1998, pp. 1–4.

Lutron Electronics Co. Inc., *Using the RadioRA® Telephone Tinterface*, Application Note#46, 1998, pp. 1–2.

Maltz et al., Experiences Designing and Building a Multi–Hop Wireless *Ad Hoc*, Network Testbed, *Paper*, Mar. 5, 1999, available at http://reportsarchive.adm.cs.cmu.edu/anon/1999/CMU–C–99–116.pdf, pp. 1–20.

Maltz et al., Experiences Designing and Building a Multi–Hop Wireless *Ad Hoc*Network Testbed, *Paper*, Mar. 5, 1999, pp. 1–22.

Markie et al., LonWorks and PC/104: A winning combination, *PC/104 Embedded Solutions*, Summer 1998, pp. 1–8.

Martel et al., Home Automation Report: A Modular Minimum Complexity, High–Resolution and Low Cost Field Device Implementation for Home Automation and Healthcare, *MIT*: Publisher: unknown; Mar. 31, 1998; pp. 1–29.

Mozer et al., The Neural Network House: An Overview, in L. Niklasson & Boden (Eds.), *Current trends in connectionism*(pp. 371–380); Hillsdale: Erlbaun, 1995; pp. 1–9.

MTC Teams with Coactive Networks to Deliver an Advanced Energy Communications and Management Solution, *Coactive*(press release), Author: unknown, Feb. 5, 2001, pp. 1–4.

Negus et al, HomeRF® and SWAP: Wireless Networking for the Connected Home, *ACM Sigmobile Mobile Computing and Communications Review*, vol. 2, Issue 4, Oct. 1998, available at http://portal.acm.org/citation.cfm?id=1321400.1321401, on Mar. 29, 2009, pp. 1–2.

NewPower and Coactive Networks Announces Strategic Alliance to Deliver the Connected Home, *Coactive*(press release), Author: unknown, Mar. 14, 2001, pp. 1–4.

NX–480 Wireless Motion Sensor, document No. 466–1479 Rev. D;, *Caddx Controls*; AuAuthor: unknown; CADDX Controls, Inc.; May 1, 1998, pp. 1.

Omni Instalation Manual, Author: unknown; *Home Automation, Inc.*, Oct. 1997, pp. 1–88.

Omni user manual, *Home Automation, Inc.*; Author: unknown; 1997.

Park et al., SensorSim: A Simulation Framework for Sensor Networks, *ACM*, 2000, pp. 104–111.

Pittway Corporation, Company History, available at http://www.fundingunniverse.com/company–histories/Pittway–Corporation Mar. 6, 2009, pp. 1–5.

Pottie et al., Wireless Integrated Network Sensors: Towards Low Cost and Robust Self–Organizing Security Networks; *EED, UCLA*; *Rockwell Science Center*; *SPIE*vol. 3577, Nov. 1, 1998, pp. 86–95 (20 pages).

Pottie et al., Wireless Integrated Network Sensors, *UCLA*; *Communications of the ACM*, vol. 43, No. 5, May 2000, pp. 51–58.

Pottie, Awairs: Mini–Site Review, *Project Status*, UCLA: Rockwell Science Center, Feb. 23, 1998, pp. 1–58.

Rabaey et al., PicoRadio Supports *Ad Hoc*Ultra–Low Power Wireless Networking, *Computer*; IEEE, Jul. 2000, pp. 42–48.

Raji, Control Networks and the Internet, *Echelon Corp.*; 1998, pp. 1–39.

Raji, End–to–End Solutions with LonWorks® Control Technology: Any Point, Any Time, Any Where, *Echelon Corp.*; 1998, pp. 1–30.

Smart Home Technology Leader Intelli Selects Coactive Networks Internet Getaways, *Coactive*, (press release), Author: unknown, Sep. 11, 2000, pp. 1–4.

Sohrabi et al., Protocols for Self–Organization of a Wireless Sensor Network, *IEEE Personal Communications*, Oct. 2000, pp. 16–27.

Subramanian et al., An Architectural for Building Self–Configurable Systems, *IEEE*, 2000, pp. 63–73.

The New Power Company Announces Revolutionary Energy–Saving Program that Gives Consumers Remote Control of their Thermostats via the Internet, *NewPower*, (press release), Author: unknown, Apr. 24, 2001, pp. 1–6.

The SNVT Master Master List and Programmer's Guide, *Echelon Corp.*; Author: unknown; Mar. 1996, pp. 1–23.

Totolo, HomeRF, A New Protocol on the Horizon, Feb. 1999, available at http://www.hometoys.com/htinews/feb99/articles/totolo/totolo.htm, on Mar. 2, 2009, pp. 1–3.

Vardhan et al., Wireless Integrated Network Sensors (WINS): Distributed In Situ Sensing for Mission and Flight Systems, *2000 IEEE Aerospace Conference Proceedings*; 2000, pp. 459–463 (12 pages).

Vista–40 2–Partition Security System Installation and Setup Guide; *Ademco*, Author: unknown; Jul. 1, 1998.

Weiser, Some Computer Science Issues in Ubiquitous Computing, Mar. 23, 1993, *Communications of the ACM*; Jul. 1993, pp. 1–13.

Weiser, The Computer for the 21$^{st}$Century, *Scientific American*; Sep. 1991, available at http:www.ubiq.com/hypertext/weiser/SciAmDraft3.html on Apr. 20, 2009, pp. 1–9.

Wilson, Lexicon 700t Touchscreen Remote, Jan. 1, 1999, available at http://avrev.com/home–theater–remotes–system–control/remotes–system on Mar. 2, 2009, pp. 1–3.

Wireless Accessories, catalog pages, *Home Automation, Inc.*; available at http://web.archive.org/web/19970216060056/www.homeauto.com/ on Feb. 17, 2009 (archived web page);, Author: unknown; pp. 1–2.

Wunna et al., Web Based Remote Security System (WRSS) Model Development, *IEEE*, Apr. 7–9, 2000, pp. 379–382.

X10, CK11A ActiveHome, Home Automation System, *Owner's Manual*, Oct. 23, 1997, pp. 1–56.

X10.com: The Supersite for Home Automation, *What's in the Kit*, available at http://web.archive.org/web/19991111133653/www.com/products/x, on Mar. 2, 2009, pp. 1–2.

X10.com: The Supersite for Home Automation, *Wireless Remote Control System(RC5000)*, available at http://web.archive.org/web/1999111453227/www.x10.com/products/x1, on Mar. 2, 2009, pp. 1.

X10: The Supersite for Home Automation, *Transceiver Module*, available at http://web.archive.org/web/20000229141517/www.x10.com/products/x, on Mar. 2, 2009, pp. 1.

Young, A Unifying Dynamic Distributed Multichannel TDMA Slot Assignment Protocol, working paper, *Rockwell International*; Oct. 25, 1995, pp. 1–29.

Young, USAP: A Unifying Distributed Multichannel TDMA Slot Assignment Protocol, *Rockwel International Communication Systems Division; IEEE*; 1996, pp. 235.

Agre et al., *Development Platform for Self–Organizing Wireless Sensor Networks*, SPIE, vol. 3713, Apr. 1999, pp. 257–268.

Corcoran et al., CEBus *Network Access via the World–Wide–Web*, IEEE, 1996, pp. 236–237.

Deering et al., *Internet Protocol, Version 6(IPv6)*, RFC1883, Publisher:unknown, Dec. 1995, pp. 1–37.

Deering et al., *Internet Protocol, Version 6(IPv6)*, RFC2460, *The Internet Society*, Dec. 1998, pp. 1–39.

Dong et al., *Low Power Signal Processing Architectures for Network Microsensors*, ACM, 1997, pp. 173–177.

Estrin et al., *Next Century Challenges: Scallable Coordination in Sensor Networks*, ACM, 1999, pp. 263–270.

Kaiser, *Circuits and Systems for Embedded Wireless Devices: Low Power Sensor, Interface, Signal Processing, Communication, and Network Systems*, École Polytecnique Fédérale de Lausanne, pp. 1–40, Jun. 30, 1999.

Postel (ed.), *Internet Protocol: DARPA Internet Program*, RFC 791, Publisher: unknown, Sep. 1981, pp. 1–45.

Pottie, *Hierarchical Information Processing in Distributed Sensor Networks*, ISIT, Aug. 16–21, 1998, IEEE, 1998, pp. 163.

Pottie, *Wireless Sensor Networks*, ITW, Jun. 22–26, 1998, IEEE, 1998, pp. 139–140.

Theorides, *Wireless Integrated Network Sensors*, Power Point Presentation, Publisher: unknown, Apr. 15, 2003, pp. 1–19.

Will et al., *Wireless Networking for Control and Automation of Off–road Equipment*, ASAE, Jul. 18–21, 1999, pp. 1–10.

Yu, *Target Identification Processor for Wireless Sensor Network*, Dissertation, *Los Angeles: University of California*, 1999, pp. 1–110.

US 6,891,838 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-38 are cancelled.

New clams 39-59 are added and determined to be patentable.

*39. A distributed data monitoring and control system suitable for distinct residential automation applications, comprising:*
- *at least one sensor suitably integrated with a residential system configured to provide a sensor data signal; and*
- *at least one wireless communication device communicatively coupled with the at least one sensor, and configured to receive the sensor data and format a first encoded data signal,*
- *wherein the first encoded data signal comprises a communication device identifier and comprises a predetermined function code responsive to the received sensor data signal,*
- *wherein the at least one wireless communication device is configured to broadcast the first encoded data signal over a wireless transmission media to a gateway communicatively coupled to a wide area network,*
- *wherein the gateway is configured to receive and translate the first encoded data signal into a wide area network data transfer protocol for transmission to a computing device configured to collect, process, and store, the first encoded data signal,*
- *wherein the at least one wireless communication device is configured to broadcast the first encoded data signal to a computing device configured to execute a computer program having a second segment for evaluating the first encoded data signal to identify a parameter value associated with the sensor, and*
- *wherein the at least one wireless communication device is configured to broadcast the first encoded data signal to a computing device configured to execute a computer program having a third segment for evaluating the relative health of the at least one wireless communication device.*
- *wherein the computer program is configured to evaluate the relative health of the at least one wireless communication device based on an algorithm that monitors elapsed time between a pinging message and a return ping message.*

*40. A distributed data monitoring and control system suitable for distinct residential automation applications, comprising:*
- *a first sensor configured to provide a first sensor data signal from a first local control system; and*
- *a first wireless communication device communicatively coupled to the first sensor, configured to receive the first sensor data signal from the first sensor, and configured to format and transmit a first encoded data signal;*
- *wherein the first encoded data signal comprises a first wireless communication device identifier, and comprises a first function code mapped from the received first sensor data signal,*
- *wherein the first function code is selected from a generic set of function codes configured for distinct applications, such that the first sensor data signal from the first local control system is mapped to a corresponding function code of the generic set of function codes,*
- *wherein the first wireless communication device is configured to transmit the first encoded data signal over a wireless transmission media to a gateway communicatively coupled to a wide area network, and*
- *wherein the gateway is configured to receive and translate the first encoded data signal into a wide area network data transfer protocol for transmission to a computing device configured to collect, process, and store, the first encoded data signal.*

*41. The distributed data monitoring and control system of claim 40, further comprising:*
- *a second sensor configured to provide a second sensor data signal from a second local control system; and*
- *a second wireless communication device communicatively coupled to the second sensor, configured to receive the second data signal from the second sensor, and configured to format and transmit a second encoded data signal,*
- *wherein the second encoded data signal comprises a second wireless communication device identifier, and comprises a second function code mapped from the received second sensor data signal,*
- *wherein the second function code is selected from a generic set of function codes, such that the second sensor data signal from the first local control system is mapped to a corresponding function code of the generic set of function codes,*
- *wherein the second wireless communication device is configured to transmit the second encoded data signal over the wireless transmission media to the first wireless communication device,*
- *wherein the first wireless communication device is configured to receive the second encoded data signal, and to format and transmit a composite encoded data signal, and*
- *wherein the composite encoded data signal comprises the second wireless communication device identifier, the second function code, the first wireless communication device identifier, and the first function code.*

*42. The distributed data monitoring and control system of claim 41, wherein the composite encoded data signal comprises the second wireless communication device identifier and the second function code concatenated with the first wireless communication device identifier and the first function code.*

*43. The distributed data monitoring and control system of claim 40, further comprising:*
- *a second sensor configured to provide a second sensor data from a second local control system; and*
- *a second wireless communication device communicatively coupled to the second sensor, configured to receive the second sensor data signal from the second sensor, and configured to format and transmit a second encoded data signal,* wherein the second encoded data signal comprises a second wireless communication device identifier, and comprises a second function code mapped from the received second sensor data signal, wherein the second function code is selected from a generic set of function codes, such that the second sensor data signal from the second local control system is mapped to a corresponding function code of the generic set of function codes, wherein the second wireless communication device is configured to transmit the second encoded data signal over the wireless transmission media, and wherein the second local control system is configured to use control system signals which are distinct from control signals of the first local control system.

44. The distributed data monitoring and control system of claim 40, wherein the gateway is configured to review received encoded data signals, is configured to identify duplicate versions of the same encoded data signal, and is configured transmit a single instance of the duplicate versions.

45. The distributed data monitoring and control system of claim 40, wherein the first wireless communication device is configured to review received encoded data signals, is configured to identify duplicate versions of the same encoded data signal, and is configured to transmit a single instance of the duplicate versions.

46. The distributed data monitoring and control system of claim 40, wherein the mapping is performed by using a first lookup table which maps the first sensor data signal from the first local control system into the corresponding function code of the generic set of function codes.

47. The distributed data monitoring and control system of claim 46, further comprising:

a second sensor configured to provide a second sensor data signal from a second local control system; and a second wireless communication device communicatively coupled to the second sensor, configured to receive the second sensor data signal from the second sensor, and configured to format and transmit a second encoded data signal, wherein the second encoded data signal comprises a second wireless communication device identifier, and comprises a second function code mapped from the received second sensor data signal, wherein the second function code is selected from a generic set of function codes, such that the second sensor data signal from the second local control system is mapped to a corresponding function code of the generic set of function codes, wherein the second wireless communication device is configured to transmit the second encoded data signal over the wireless transmission media, wherein the second local control system is configured to use control system signals which are distinct from control signals of the first local control system, wherein the mapping of the second sensor data signal is performed by using a second lookup table which maps the second sensor data signal from the second local control system into a corresponding function code of the generic set of function codes, and wherein the second lookup table is different from the first lookup table to account for distinctions between the first local control system and the second local control system.

48. The distributed data monitoring and control system of claim 46, wherein the first lookup table maps at least the following four parameters into the generic set of function codes: temperature set, on/off, actual temperature, and air/heat.

49. The distributed data monitoring and control system of claim 46, wherein the first lookup table maps parameters into the generic set of function codes, and wherein the parameters are associated with at least the following devices: an appliance, a utility meter, a shade, irrigation, security, interior lights, exterior lights, and a heating, ventilation, and air conditioning (HVAC) system.

50. The distributed data monitoring and control system of claim 40, wherein the computing device is configured to use a first interpretive lookup table to interpret the first function code from the first encoded data signal, and wherein the first interpretive lookup table is associated with the first wireless communication device identifier of the first wireless communication device.

51. The distributed data monitoring and control system of claim 40, wherein the first encoded data signal has a message structure comprising the following portions: to address; from address; packet number; maximum packet number; packet length; and command.

52. The distributed data monitoring and control system of claim 40, wherein the first encoded data signal has a scalable message structure comprising the following portions in the following order: to address of from 1 to 6 bytes; from address of from 1 to 6 bytes; packet number of 1 byte; maximum packet number of 1 byte; packet length of 1 byte; command of 1 byte; optional data of from 0 to 238 bytes; packet checksum hi byte of 1 byte; and packet checksum low byte of 1 byte.

53. The distributed data monitoring and control system of claim 40, wherein the first wireless communication device is configured to receive a message comprising the following portions: to address; from address; packet number; maximum packet number; packet length; command; and data, wherein the to address portion of the received message contains the address of the first wireless communication device, wherein the data portion of the received message contains data identifying a target wireless communication device, and wherein the first wireless communication device is configured to generate and transmit a message with a to address portion including the address of the target wireless communication device.

54. The distributed data monitoring and control system of claim 40, wherein the first wireless communication device is configured to receive a message comprising the following portions: to address; from address; packet number; maximum packet number; packet length; command; and data, wherein the to address portion of the received message contains the address of the first wireless communication device, wherein the data portion of the received message contains data identifying a target wireless communication device and identifying an intermediary wireless communication device, and wherein the first wireless communication device is configured to generate and transmit a message with a to address portion including the address of the intermediary wireless communication device.

55. The distributed data monitoring and control system of claim 40,
wherein the first wireless communication device is configured to receive a ping request message from a second device comprising the following portions: to address including the address of the first wireless communication device; from address including the address of the second device; and command from the second device requesting a ping, and
wherein the first wireless communication device is configured to generate and transmit a ping response message comprising the following portions: to address including the address of the second device; from address including the address of the first wireless communication device; and command from the first wireless communication device responding to the ping request message.

56. The distributed data monitoring and control system of claim 55, wherein the second device is configured to: send the ping request message; receive the ping response message; calculate a delay between when the ping request message was sent and the ping response message was received; determine whether the system may be adequately monitored and controlled with the delay; and upon a determination that the system may not be adequately monitored and controlled, generate an error signal indicating poor health.

57. The distributed data monitoring and control system of claim 40, wherein the computing device is configured to generate a GUI (Graphical User Interface) comprising the following portions: thermostat mode status; thermostat temperature set; thermostat temperature actual; security system status; interior lighting foyer status; interior lighting living room status; interior lighting kitchen status; interior lighting first bedroom status; smoke detector mode status; smoke detector battery health status; gas usage; electricity usage; and water usage.

58. The distributed data monitoring and control system of claim 57, wherein the GUI includes pull down menus for setting the statuses of the thermostat, of the security system, and of the interior lighting.

59. The distributed data monitoring and control system of claim 40, wherein the first wireless communication device is configured to receive a command signal transmission from the computing device via the gateway, and wherein the command signal transmission includes a command portion.

* * * * *